United States Patent
Okamoto

(10) Patent No.: US 10,427,339 B2
(45) Date of Patent: Oct. 1, 2019

(54) METHOD OF MANUFACTURING RESIN MOLDED PRODUCT, MOLD FOR INJECTION MOLDING, INJECTION MOLDING MACHINE AND RESIN MOLDED PRODUCT

(71) Applicant: UBE MACHINERY CORPORATION, LTD., Yamaguchi (JP)

(72) Inventor: Akio Okamoto, Yamaguchi (JP)

(73) Assignee: UBE MACHINERY CORPORATION, LTD., Ube-shi, Yamaguchi (JP)

( * ) Notice: Subject to any disclaimer, the term of this patent is extended or adjusted under 35 U.S.C. 154(b) by 122 days.

(21) Appl. No.: 15/315,377

(22) PCT Filed: Jan. 13, 2015

(86) PCT No.: PCT/JP2015/050688
§ 371 (c)(1),
(2) Date: Nov. 30, 2016

(87) PCT Pub. No.: WO2015/182162
PCT Pub. Date: Dec. 3, 2015

(65) Prior Publication Data
US 2017/0197345 A1  Jul. 13, 2017

(30) Foreign Application Priority Data

May 30, 2014 (JP) .................................. 2014-111996
May 30, 2014 (JP) .................................. 2014-111997

(51) Int. Cl.
*B29C 45/16* (2006.01)
*B29C 44/12* (2006.01)
(Continued)

(52) U.S. Cl.
CPC ........ *B29C 45/1635* (2013.01); *B29C 44/086* (2013.01); *B29C 44/1219* (2013.01);
(Continued)

(58) Field of Classification Search
CPC . B29C 45/1635; B29C 45/0055; B29C 45/03; B29C 45/37; B29C 45/372;
(Continued)

(56) References Cited

U.S. PATENT DOCUMENTS

| | | | | |
|---|---|---|---|---|
| 2004/0056382 | A1* | 3/2004 | Shaver | B29C 45/1676 264/255 |
| 2013/0095287 | A1* | 4/2013 | Suzuki | B29C 45/1657 428/136 |
| 2015/0352761 | A1* | 12/2015 | Okamoto | B29C 45/1635 264/45.2 |

FOREIGN PATENT DOCUMENTS

| | | |
|---|---|---|
| JP | 11-77711 A | 3/1999 |
| JP | 11-216741 A | 8/1999 |

(Continued)

OTHER PUBLICATIONS

International Search Report and Written Opinion for PCT/JP2015/050688 dated Mar. 31, 2015.
(Continued)

*Primary Examiner* — Anthony Calandra
*Assistant Examiner* — Jamel M Nelson
(74) *Attorney, Agent, or Firm* — Womble Bond Dickinson (US) LLP; Joseph Bach, Esq.

(57) ABSTRACT

A mold for injection molding includes a design-surface-side mold which is capable of forming a design surface of a resin molded product and a non-design-surface-side mold which is capable of forming a mold cavity with the design-surface-side mold. A convex portion is provided in any one of the design-surface-side mold and the non-design-surface-side (Continued)

mold so as to protrude toward the other one. The mold for injection molding is configured to be capable of switching a first mold closing state in which the convex portion is present from any one of the design-surface-side mold and the non-design-surface-side mold over the other one and a second mold closing state in which the convex portion is not present from any one of the design-surface-side mold and the non-design-surface-side mold over the other one.

8 Claims, 20 Drawing Sheets

(51) Int. Cl.
  *B29C 45/00*     (2006.01)
  *B29C 45/03*     (2006.01)
  *B29C 45/37*     (2006.01)
  *B29C 44/08*     (2006.01)
  *B29C 44/58*     (2006.01)
  *B29K 105/04*      (2006.01)
  *B29L 31/30*       (2006.01)
(52) U.S. Cl.
  CPC .......... *B29C 44/58* (2013.01); *B29C 45/0055* (2013.01); *B29C 45/03* (2013.01); *B29C 45/37* (2013.01); *B29C 45/372* (2013.01); *B29C 45/1676* (2013.01); *B29K 2105/04* (2013.01); *B29L 2031/3005* (2013.01)
(58) Field of Classification Search
  CPC ... B29C 45/1676; B29C 44/086; B29C 44/08; B29C 44/083; B29C 44/1219; B29C 44/58; B29C 44/585
  See application file for complete search history.

(56) References Cited

FOREIGN PATENT DOCUMENTS

| | | | |
|---|---|---|---|
| JP | 2007-253456 | A | 10/2007 |
| JP | 2007253456 | A * | 10/2007 |
| JP | 2012-139967 | A | 7/2012 |
| JP | 2013-86369 | A | 5/2013 |
| JP | 2014-8707 | A | 1/2014 |
| WO | 2014/103655 | A1 | 7/2014 |

OTHER PUBLICATIONS

Office Action in Japanese Patent Application No. 2015-224674 dated Jan. 15, 2019.

* cited by examiner

METHOD OF MANUFACTURING RESIN MOLDED PRODUCT, MOLD FOR INJECTION MOLDING, INJECTION MOLDING MACHINE AND RESIN MOLDED PRODUCT

RELATED APPLICATIONS

The present application is the national phase of International Application No. PCT/JP2015/050688, filed on Jan. 13, 2015, which claims the benefit of priority to Japanese Patent Application No. 2014-111996, filed on May 30, 2014, and Japanese Patent Application No. 2014-111997, filed on May 30, 2014, the disclosures of all of which are hereby incorporated herein by reference in their entireties.

TECHNICAL FIELD

The present invention relates to a method of manufacturing a resin molded product, a mold for injection molding, an injection molding machine and a resin molded product configured to manufacture a resin molded product having an artificial stitch (seam) pattern on a design surface.

BACKGROUND ART

Conventionally, leather is used in interior of transportation such as an automobile, an aircraft, a train and a ship, furniture and the like in order to engender a luxurious feeling. In addition, a seam (stitch) made of a twisted yarn, a leather yarn (string) and the like is sometimes arranged in a leather surface. This seam (stitch) can engender a feeling of manual work, and this feeling of manual work can engender a more luxurious feeling in combination with the own appearance of the leather and texture such as a sense of touch.

A product employing such leather is manufactured by a skilled person through manual work, different from a general industrial product, and thus, mass production thereof is difficult and high cost is required. Thus, the leather is currently being employed only in luxury goods or a part of a special interior and sheet of transportation.

Meanwhile, there is a demand for various types of differentiation in furniture or the interior of transportation along with recent diversification in consumer preferences. Recently, resin molded products in which an artificial stitch pattern (seam) is formed in a front surface (design surface) thereof have been developed as an artificial leather member capable of engendering the luxurious feeling in spite of low price in accordance with the above-described circumstance.

A method of manufacturing such resin molded products is disclosed in Patent Literature 1. The method of manufacturing the resin molded product disclosed in Patent Literature 1 first forms a first cavity between a common mold portion and a primary mold portion. Next, a resin raw material is injected into the first cavity, and a first member, which includes a plurality of cord seam portions formed to protrude and be arrayed on the front side and a hole portion formed in accordance with each of the cord seam portion, is molded in the first cavity. Next, a second cavity is formed between a secondary mold portion, which seals a protruding end portion of the cord seam portion, and the common mold portion by interchanging the primary mold portion with the secondary mold portion in a state in which the first member remains in the common mold portion. Finally, the resin raw material is injected into the second cavity, and a second member is molded on the front side of the first member in the second cavity. The resin molded product manufactured by the above-described method includes an artificial stitch pattern (seam) formed of the plurality of cord seam portions which protrude from a front surface of the second member and are exposed.

CITATION LIST

Patent Literature

Patent Literature 1: JP 2014-008707 A

SUMMARY OF INVENTION

Technical Problem

In the method of manufacturing the resin molded product of Patent Literature 1, the second member is molded on the design surface side (protruding end portion side) of the first member as the resin material is injected into the second cavity formed between the first member remaining in the common portion and the secondary mold portion in a state in which the protruding end portion of the cord seam portion of the first member is sealed by a molding surface (cavity surface) of the secondary mold portion. Thus, it is necessary to maintain a shape and a position of the cord seam portion (protruding end portion) of the first member, which is molded first, against resin heat of resin flow or resin flow pressure caused by injection (injection-filling) of the resin material for the second member, which has a far large volume in relation to a volume of the cord seam portion, in a state in which a base portion of the first member is supported by a convex portion of the common mold portion via the second member and the protruding end portion is sealed by the molding surface of the secondary mold portion in the method disclosed in Patent Literature 1.

Here, the protruding end portion of the cord seam portion that protrudes from the first member is sealed as being abut on the molding surface of the secondary mold portion which is different from the primary mold portion obtained by molding a delicate design (irregularities imitating a twisted seam) of the protruding end portion. It is considered that this seal is caused as fine streaky irregularities are provided also in the molding surface of the secondary mold portion to be engaged with the delicate design of the protruding end portion of the cord seam portion (paragraph 0022 or the like in Patent Literature 1). However, it is general that the cord seam portion imitating the stitch pattern itself is fine and small, and practically, it is difficult to cause the delicate irregularities of the protruding end portion of the cord seam portion and the irregularities provided on the molding surface of the other mold (secondary mold portion) different from the mold on which the irregularities are molded to be engaged with each other after performing the molding to a level of allowing the seal of another resin flow considering solidification shrinkage of the resin after performing the injection-filling, accuracy in changing (replacing) of molds, and mechanical accuracy in mold opening and closing of an injection molding machine. In addition, even if it is possible to cause the delicate irregularities of the protruding end portion of the cord seam portion and the irregularities provided in the molding surface of the secondary mold portion to be engaged with each other, the strength of the cord seam portion in a mold changing direction is weak, and there is a high possibility that the protruding end portion of the cord seam portion is crushed by mold-clamping of the common mold portion and the secondary mold portion, which causes the collapse of design.

In addition, the cord seam portion is fine and small, and thus, has a risk of being melted again by the resin heat of the resin flow of the resin material for the second member having the far larger volume in relation to the volume of the cord seam portion, thereby losing a convex shape as the stitch pattern. Further, even if the cord seam portion is not lost, there is a risk that the shape of the cord seam portion is deformed or a positional deviation thereof is caused by the resin flow pressure of the resin flow of the resin material for the second member. As a result thereof, the resin material intrudes between the protruding end portion of the cord seam portion of the first member and the molding surface of the secondary mold portion when the second member is molded, the resin of the second member (design surface) overflows on the stitch pattern formed on the protruding end portion of the cord seam portion, which is molded first, and further, the melting damage, the deformation, and the positional deviation are caused in the cord seam portion itself, and there occurs a fundamental problem that it is difficult to form the stitch pattern on the second member serving as the design surface.

The present invention has been made in view of the above-described problems, and an object thereof is to provide a method of manufacturing a resin molded product, a mold for injection molding, and an injection molding machine capable of accurately manufacturing a resin molded product having an artificial stitch pattern on a design surface thereof. In addition, another object of the present invention is to provide a resin molded product which is accurately manufactured.

Solution to Problem

A method of manufacturing a resin molded product according to the present invention is characterized by including: a step of preparing a mold for injection molding which is provided with a design-surface-side mold capable of forming the design surface of the resin molded product and a non-design-surface-side mold capable of forming a mold cavity with the design-surface-side mold, includes a convex portion in any one of the design-surface-side mold and the non-design-surface-side mold to protrude toward the other one, and is configured to be capable of forming a through-hole portion penetrating the design surface of a first molded component, the first molded component molded in the mold cavity, to a surface on a non-design surface side by the convex portion; a first molding step of injection-filling a first resin into the mold cavity and molding the first molded component which includes the design surface formed by the design-surface-side mold and the surface on the non-design surface side formed by the non-design-surface-side mold; a second molding preparation step of moving the convex portion with respect to the first molded component so as to form a space inside the through-hole portion, and expanding a volume of the mold cavity to form a non-design-surface-side space, which communicates with the space inside the through-hole portion, on the non-design-surface side of the first molded component after the first molding step; and a second molding step of injection-filling a second resin into the space inside the through-hole portion via the non-design-surface-side space formed in the second molding preparation step, and molding a second molded component which includes a non-design-surface portion to be layered on the non-design surface side of the first molded component and a stitch portion exposed to the design surface of the first molded component via the through-hole portion from the non-design-surface portion.

In the method of manufacturing the resin molded product according to the present invention, any one of the design-surface-side mold and the non-design-surface-side mold may include a movable portion in which the convex portion is formed and which is configured to be movable in a direction of moving closer to or moving away from the other one of the design-surface-side mold and the non-design-surface-side mold, the first molding step may be executed in a state in which the movable portion moves closer to the other one of the design-surface-side mold and the non-design-surface-side mold, and the second molding preparation step may be a step of moving the movable portion away from the other one of the design-surface-side mold and the non-design-surface-side mold and expanding the volume of the mold cavity such that the space inside the through-hole portion and the non-design-surface-side space are formed.

In addition, in the method of manufacturing the resin molded product according to the present invention, the design-surface-side mold may include a first movable portion in which the convex portion is formed and which is configured to be movable in a direction of moving closer to or moving away from the non-design-surface-side mold, the non-design-surface-side mold may include a second movable portion in which a concave portion capable of housing a distal end portion of the convex portion and which is configured to be movable in a direction of moving closer to or moving away from the design-surface-side mold, the first molding step may be executed in a state in which the first movable portion moves closer to the non-design-surface-side mold and the second movable portion moves closer to the design-surface-side mold, and the second molding preparation step may be a step of moving the first movable portion away from the non-design-surface-side mold, further moving the second movable portion away from the design-surface-side mold, and expanding the volume of the mold cavity such that the space inside the through-hole portion and the non-design-surface-side space are formed.

Further, in the method of manufacturing the resin molded product according to the present invention, the non-design-surface-side mold may be provided with: a first mold which includes the convex portion and is capable of forming the mold cavity when being paired with the design-surface-side mold; and a second mold which is capable of forming the space inside the through-hole portion and the non-design-surface-side space when being paired with the design-surface-side mold instead of the first mold, the first molding step may be a step of molding the first molded component in the mold cavity which is formed between the design-surface-side mold and the first mold, and the second molding preparation step may be a step of switching a mold to be paired with the design-surface-side mold from the first mold to the second mold in a state in which the first molded component is held on the design-surface-side mold, and expanding the volume of the mold cavity such that the space inside the through-hole portion and the non-design-surface-side space are formed.

In these cases, it is preferable that the non-design-surface-side mold or the second mold include a pressing portion which presses the first molded component molded in the first molding step toward the design-surface-side mold in the second molding step, and the second molding step be executed in a state in which the first molded component is pressed toward the design-surface-side mold by the pressing portion.

In addition, a mold for injection molding according to the present invention is a mold for injection molding used in manufacturing a resin molded product having a stitch pattern on a design surface, characterized by including a design-surface-side mold which is capable of forming the design surface of the resin molded product; and a non-design-surface-side mold which is capable of forming a mold cavity with the design-surface-side mold. A convex portion is provided in any one of the design-surface-side mold and the non-design-surface-side mold so as to protrude toward the other one. It is configured to be capable of switching a first mold closing state in which the convex portion is present from any one of the design-surface-side mold and the non-design-surface-side mold over the other one and a second mold closing state in which the convex portion is not present from any one of the design-surface-side mold and the non-design-surface-side mold over the other. It is configured such that a first mold cavity, capable of molding a first molded component including the design surface and a through-hole portion penetrating from the design surface to a surface on a non-design surface side, is formed between the design-surface-side mold and the non-design-surface-side mold in the first mold closing state. It is configured such that a mold cavity expansion portion, capable of molding a second molded component including a non-design-surface portion layered on the non-design surface side of the first molded component and a stitch portion capable of being exposed to the design-surface side of the first molded component via the through-hole portion of the first molded component from the non-design-surface portion, is formed between the design-surface-side mold and the non-design-surface-side mold in the second mold closing state.

In the mold for injection molding according to the present invention, any one of the design-surface-side mold and the non-design-surface-side mold may include a movable portion in which the convex portion is formed and which is configured to be movable in a direction of moving closer to or moving away from the other one of the design-surface-side mold and the non-design-surface-side mold. It may be configured to be capable of switching the first mold closing state and the second mold closing state by moving the movable portion in a direction of moving closer to or moving away from the other one of the design-surface-side mold and the non-design-surface-side mold. It may be configured such that the first mold cavity is formed between the design-surface-side mold and the non-design-surface-side mold by moving the movable portion closer to the other one of the design-surface-side mold and the non-design-surface-side mold. It may be configured such that the first mold cavity is expanded by moving the movable portion away from the other one of the design-surface-side mold and the non-design-surface-side mold, and the mold cavity expansion portion is formed between the design-surface-side mold and the non-design-surface-side mold.

In addition, in the mold for injection molding according to the present invention, the design-surface-side mold may include a first movable portion in which the convex portion is formed and which is configured to be movable in a direction of moving closer to or moving away from the non-design-surface-side mold. The non-design-surface-side mold may include a second movable portion in which a concave portion capable of housing a distal end portion of the convex portion and which is configured to be movable in a direction of moving closer to or moving away from the design-surface-side mold. It may be configured to be capable of switching the first mold closing state and the second mold closing state by moving the first movable portion in a direction of moving closer to or moving away from the non-design-surface-side mold. It may be configured such that the first mold cavity is formed between the design-surface-side mold and the non-design-surface-side mold by moving the first movable portion closer to the non-design-surface-side mold and moving the second movable portion closer to the design-surface-side mold. It may be configured such that the first mold cavity is expanded by moving the first movable portion away from the non-design-surface-side mold and moving the second movable portion away from the design-surface-side mold, and the mold cavity expansion portion is formed between the design-surface-side mold and the non-design-surface-side mold.

Further, in the mold for injection molding according to the present invention, the non-design-surface-side mold may include: a first mold which includes the convex portion and is capable of forming the first mold cavity when being paired with the design-surface-side mold; and a second mold which is capable of forming the mold cavity expansion portion when being paired with the design-surface-side mold instead of the first mold. It may be configured to be capable of switching the first mold closing state and the second mold closing state by switching a mold to be paired with the design-surface-side mold from the first mold to the second mold.

In these cases, it is preferable that the non-design-surface-side mold or the second mold include a pressing portion which is capable of pressing the first molded component toward the design-surface-side mold in the second mold closing state.

In addition, an injection molding machine according to the present invention is characterized by including: the above-described mold for injection molding; a fixed platen which is capable of mounting any one of the design-surface-side mold and the non-design-surface-side mold; a movable platen which is capable of mounting the other one of the design-surface-side mold and the non-design-surface-side mold, and is provided to be capable of moving closer to or moving away from the fixed platen along a mold opening and closing direction; a first injection unit which is capable of injection-filling a first resin into the first mold cavity; and a second injection unit which is capable of injection-filling a second resin into the mold cavity expansion portion.

In addition, a resin molded product according to the present invention is a resin molded product having a stitch pattern on a design surface, characterized by including: a first molded component which includes the design surface on a front surface thereof and in which a through-hole portion penetrating from the front surface to a rear surface is formed; and a second molded component which includes a non-design-surface portion layered on the rear surface side of the first molded component and a stitch portion exposed to the design surface side via the through-hole portion of the first molded component from the non-design-surface portion. The stitch pattern is formed using the stitch portion of the second molded component. A concave portion, which reaches the rear surface of the first molded component from the non-design surface, is formed on a non-design surface of the resin molded product.

The resin molded product according to the present invention may be manufactured using a mold for injection molding which includes a design-surface-side mold capable of forming the design surface and a non-design-surface-side mold capable of forming a mold cavity with the design-surface-side mold. The mold for injection molding may include a convex portion provided in any one of the design-surface-side mold and the non-design-surface-side mold so as to protrude toward the other one, be configured to be capable of switching a first mold closing state in which the convex portion is present from any one of the design-surface-side mold and the non-design-surface-side mold over the other one and a second mold closing state in which the convex portion is not present from any one of the design-surface-side mold and the non-design-surface-side mold over the other, be configured such that a first mold cavity capable of molding the first molded component is formed between the design-surface-side mold and the non-design-surface-side mold in the first mold closing state, and be configured such that a mold cavity expansion portion capable of molding the second molded component is formed between the design-surface-side mold and the non-design-surface-side mold in the second mold closing state. The non-design-surface-side mold may include a pressing portion which is capable of pressing the first molded component toward the design-surface-side mold in the second mold closing state. The concave portion formed in the non-design surface may be a pressing trace caused by the pressing portion of the non-design-surface-side mold.

Advantageous Effects of Invention

According to the present invention, it is possible to provide a method of manufacturing a resin molded product, a mold for injection molding, and an injection molding machine capable of accurately manufacturing a resin molded product having an artificial stitch pattern on a design surface thereof. In addition, it is possible to provide the accurately manufactured resin molded product.

DESCRIPTION OF EMBODIMENTS

Hereinafter, modes for carrying out the present invention will be described in detail with reference to the appended drawings.

Injection Molding Machine According to First Embodiment

Figure 1A:
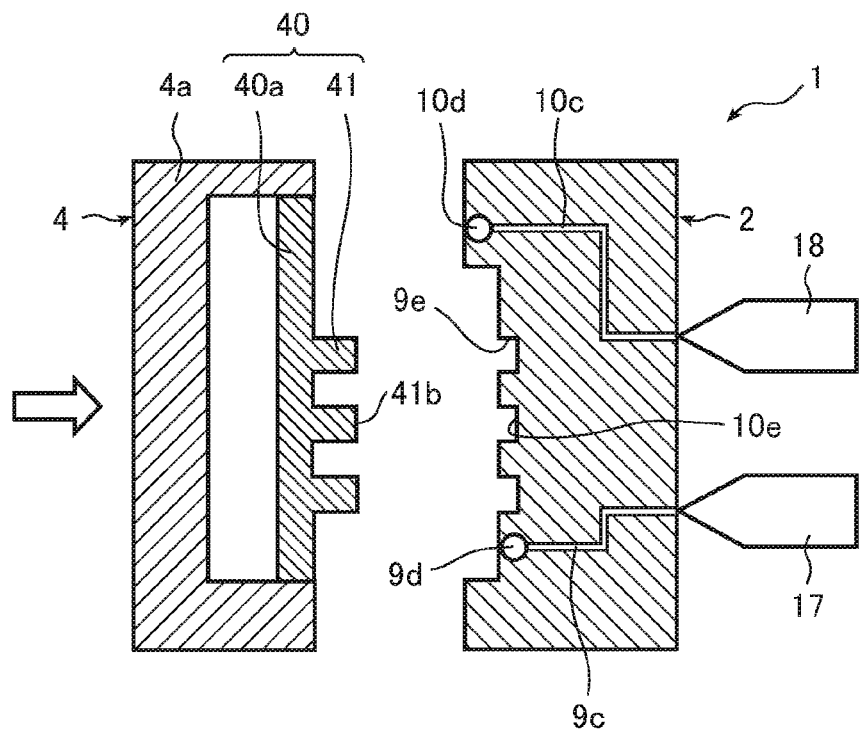
FIG. 1A is a schematic cross-sectional view illustrating a mold opening state of a mold for injection molding according to a first embodiment.
Figure 1B:
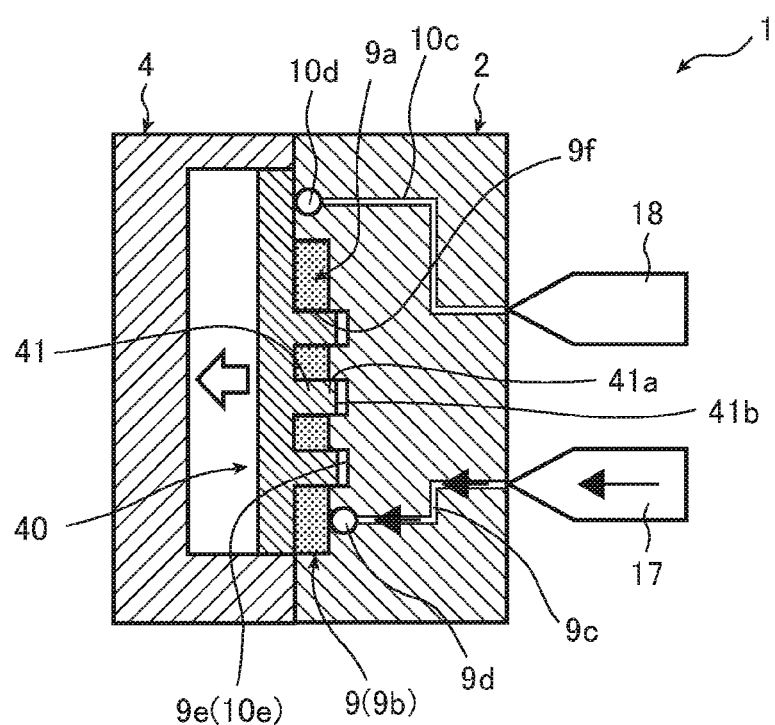
FIG. 1B is a schematic cross-sectional view illustrating a first molding step in a manufacturing method according to the first embodiment which is performed using the mold for injection molding according to the first embodiment.
Figure 1C:
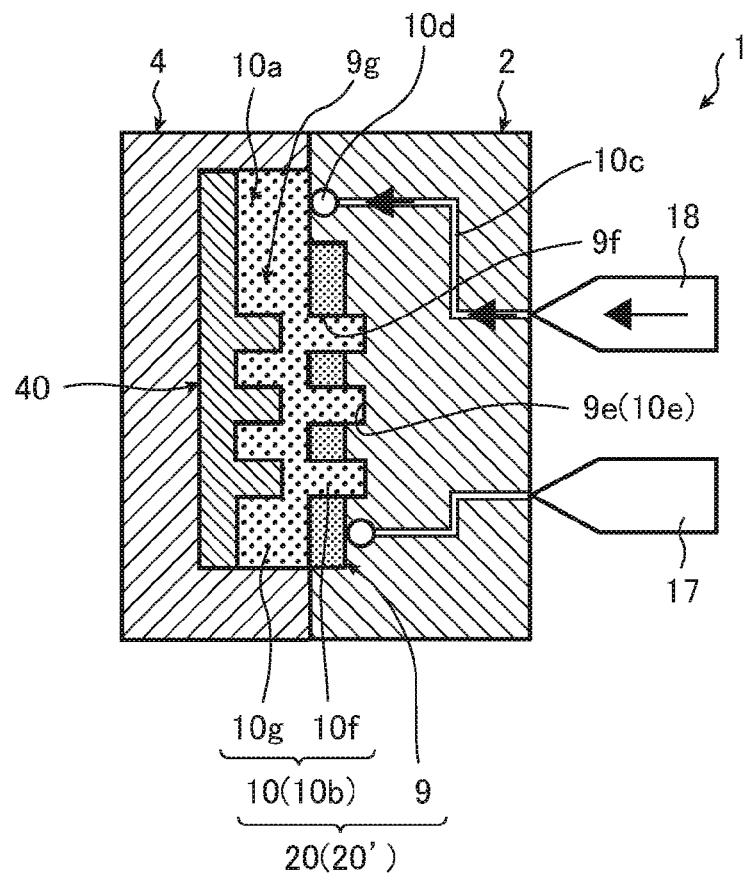
FIG. 1C is a schematic cross-sectional view illustrating a second molding step in the manufacturing method according to the first embodiment which is performed using the mold for injection molding according to the first embodiment.

First, an injection molding machine according to a first embodiment will be described with reference to FIGS. 1A to 1C. FIG. 1A is a schematic cross-sectional view illustrating a state in which a mold 1 for injection molding of the injection molding machine according to the first embodiment is opened (mold opening state). FIG. 1B is a schematic cross-sectional view illustrating a state in which a first molding step is performed in a first mold cavity 9a which is formed as the mold 1 for injection molding is mold-closed. FIG. 1C is a schematic cross-sectional view illustrating a state in which a second molding step is performed in a mold cavity expansion portion 10a which is formed as a movable portion 40 to be described later moves after the first molding step.

Incidentally, in the description of the first embodiment, the first mold cavity 9a indicates a space which is formed between an inner surface of a fixed mold 2 and an inner surface of the movable portion 40 of a movable mold 4 as the fixed mold 2 and the movable mold 4 are mold-clamped in a state in which the movable portion 40 of the movable mold 4 approaches the fixed mold 2 the closest as illustrated in FIG. 1B. The first mold cavity 9a includes a design surface imitating a leather surface on a front surface thereof, and a first molded component 9 is molded with a plurality of through-hole portions 9f formed to penetrate from the front surface to a rear surface.

Figure 2A:
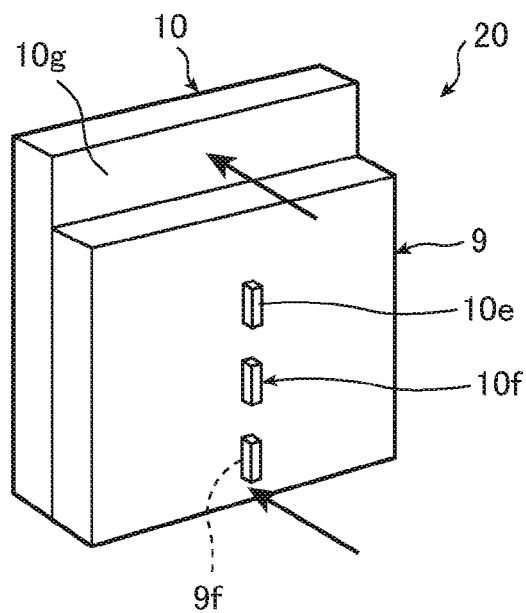
FIG. 2A is a schematic perspective view illustrating an example of a resin molded product which is manufactured using the manufacturing method according to the first embodiment.
Figure 2B:
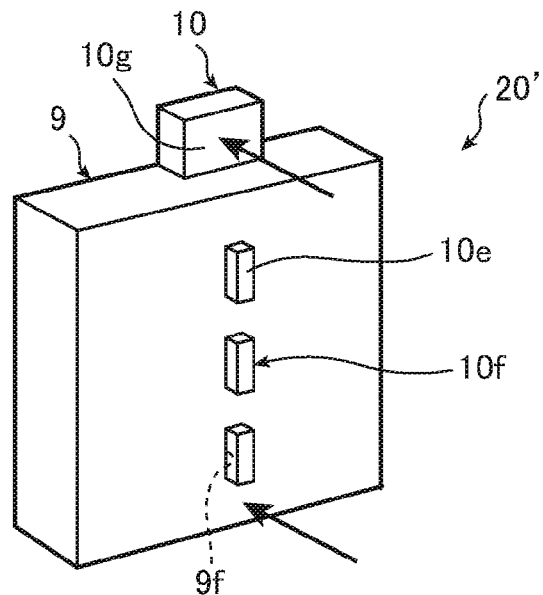
FIG. 2B is a schematic perspective view illustrating another example of the resin molded product which is manufactured using the manufacturing method according to the first embodiment.

Incidentally, the mold cavity expansion portion (second mold cavity) 10a indicates a space which is newly formed by moving the movable portion 40 of the movable mold 4 in a direction of moving away from the fixed mold 2 after the molding of the first molded component 9 as illustrated in FIG. 1C in the description of the first embodiment. To be specific, the mold cavity expansion portion 10a is configured of spaces inside a plurality of concave portions 9e formed in the fixed mold 2, spaces inside a plurality of through-hole portions 9f formed in the first molded component 9, and a non-design-surface-side space 9g which is formed between the rear surface (surface on the non-design surface side) of the first molded component 9 and the inner surface of the movable portion 40 of the movable mold 4. As illustrated in FIGS. 2A and 2B, for example, a second molded component 10, which is formed of a non-design-surface portion 10g layered on the rear surface (surface on the non-design surface side) of the first molded component 9 and a stitch portion 10f which is exposed to the front surface (design surface) of the first molded component 9 from the non-design-surface portion 10g via the through-hole portion 9f of the first molded component 9, is molded in the mold cavity expansion portion 10a.

As illustrated in FIG. 1A, the injection molding machine according to the first embodiment is provided with: a fixed platen (not illustrated) erected on a base (not illustrated); a movable platen (not illustrated) which is movable in a direction of moving closer to or moving away from the fixed platen (mold-opening or closing direction); the mold 1 for injection molding provided between the fixed platen and the movable platen; a first injection unit 17 which can perform plasticization (melting) and injection-filling of a first resin 9b into the first mold cavity 9a; a second injection unit 18 which can perform plasticization and injection-filling of a second resin 10b into the mold cavity expansion portion 10a; and a mold clamping mechanism (not illustrated) which moves the movable platen in the mold opening and closing direction. Incidentally, it is possible to employ a known configuration which is employed in general-purpose injection molding machines regarding a general configuration of the injection molding machine according to the first embodiment that is not stated in the following description.

The mold 1 for injection molding according to the first embodiment is provided with the fixed mold (common mold) 2 attached to the fixed platen and the movable mold 4 attached to the movable platen as illustrated in FIG. 1A.

The fixed mold 2 is a design-surface-side mold which is configured to form a design surface of a resin molded product 20 or 20'. A mold cavity surface of the fixed mold 2 is decorated with the design surface imitating the leather surface and the plurality of concave portions 9e decorated with a stitch-shaped design 10e imitating a seam is formed at certain positions of the design surface. The number of the concave portions 9e and positions thereof can be arbitrarily set depending on the desired number of the stitch-shaped design 10e and desired positions thereof. In addition, a back surface (surface on the opposite side of the mold cavity surface) of the fixed mold 2 is fixed to the fixed platen by various types of fixing means.

A first resin flow passage 9c in which the first resin 9b injected from the first injection unit 17 flows inside the first mold cavity 9a, and a second resin flow passage 10c in which the second resin 10b injected from the second injection unit 18 flows inside the mold cavity expansion portion 10a are formed in the fixed mold 2. Further, the fixed mold 2 includes a first gate valve (resin blocking-and-opening switching valve) 9d which is provided in a gate portion communicating inside the first mold cavity 9a of the first resin flow passage 9c and a second gate valve (resin blocking-and-opening switching valve) 10d which is provided in a gate portion communicating inside the mold cavity expansion portion 10a of the second resin flow passage 10c. Incidentally, the first resin flow passage 9c and the second resin flow passage 10c are formed as hot runner in the injection molding machine according to the first embodiment.

The movable mold 4 is a non-design-surface-side mold which is configured to form a non-design surface of the resin molded product 20 or 20'. The movable mold 4 is provided with a movable mold main body 4a fixed to the movable platen and the movable portion 40 which is supported by the movable mold main body 4a in a relatively movable manner so as to be movable in the direction of moving closer to or moving away from the fixed mold 2 (the mold opening and closing direction).

A housing portion capable of housing the movable portion 40 is formed on a side of the movable mold main body 4a opposing the fixed mold 2, and an opposite side thereof is fixed to the movable platen by various types of fixing means.

The movable portion 40 includes a movable plate portion 40a forming the surface on the non-design surface side of the first molded component 9 and a plurality of convex portions 41 provided to protrude from the movable plate portion 40a toward the fixed mold 2. The movable plate portion 40a is configured to be movable in the mold opening and closing direction by driving means (not illustrated). This driving unit may be configured such that the movable portion 40 itself serves as a pressure ram inside a mold or may be an actuator such as a cylinder, and a driving source thereof may be appropriately selected among hydraulic pressure, pneumatic pressure, electricity and the like as long as it is possible to secure a desired driving force.

The plurality of convex portions 41 are provided to be equal to the number of the concave portions 9e of the fixed mold 2, and are arranged at positions to be aligned with the concave portions 9e of the fixed mold 2 such that the single convex portion 41 is associated with the single concave portion 9e. As illustrated in FIG. 1B, each of the convex portions 41 has a shape and a length in a protruding direction such that each distal end portion 41a of the convex portions 41 is housed inside each of the concave portions 9e of the fixed mold 2 at a position (forward limit position) at which the movable portion 40 approaches the fixed mold 2 the closest. Here, each of the convex portions 41 preferably has the length in the protruding direction such that a distal end surface 41b of the distal end portion 41a does not abut on a concave surface of the concave portion 9e when the distal end portion 41a is housed in each of the concave portions 9e of the fixed mold 2. In this manner, each of the convex portions 41 is configured such that the distal end surface 41b of the distal end portion 41a does not abut on the concave surface of the concave portion 9e, and accordingly, it is possible to prevent damage of the stitch-shaped design 10e which is decorated on the concave surface of the concave portion 9e.

In addition, a clearance of about 5/100 mm (that is, 0.05 mm) is preferably provided between an opening portion of the concave portion 9e and the distal end portion 41a. This numeric value of 5/100 mm is a numeric value which is employed for a clearance between an extrusion pin of the mold for injection molding and a hole for the extrusion pin, a clearance between mold mating surfaces and the like, and it is known that it is possible to prevent intrusion of a molten resin as long as the clearance of this numeric value is provided. In this manner, the clearance of about 5/100 mm is provided between the opening portion of the concave portion 9e and the distal end portion 41a, and accordingly, it is possible to prevent the first resin 9b in the molten state from intruding into the concave portion 9e and smoothly perform housing and moving of the distal end portion 41a in or away from the concave portion 9e.

The mold 1 for injection molding according to the first embodiment is configured such that a mold opening operation, a mold closing operation and a mold clamping operation are executed between the fixed mold 2 and the movable mold 4 by moving the movable platen in the mold opening and closing direction using the mold clamping mechanism (not illustrated). This mold clamping mechanism is preferably a toggle-type mold clamping mechanism which can execute the mold opening and closing operations and the mold clamping operation. In addition, this toggle-type mold clamping mechanism is more preferably an electric toggle-type mold clamping mechanism employing a linear motion actuator obtained by combining a driving source with a rotation and linear motion converting means such as a servomotor and a ball screw mechanism. It is possible to execute the highly accurate mold opening and closing operations according to such an electric toggle-type mold clamping mechanism.

In addition, the mold 1 for injection molding is configured to expand the first mold cavity 9a to form the mold cavity expansion portion 10a by moving the movable portion 40 of the movable mold 4 in the mold opening direction using the driving means (not illustrated) in a state in which the fixed mold 2 and the movable mold 4 are mold-closed. That is, the mold 1 for injection molding is configured to be capable of switching a first mold closing state in which the convex portion 41 of the movable portion 40 is present over the fixed mold 2 from the movable mold 4 and a second mold closing state in which the convex portion 41 of the movable portion 40 is not present over the fixed mold 2 from the movable mold 4 as the movable portion 40 is moved in the direction of moving closer to or moving away from the fixed mold 2. Further, the mold 1 for injection molding is configured such that the first mold cavity 9a, which can mold the first molded component 9 including the design surface and the through-hole portion 9f penetrating from the design surface to the surface on the non-design surface side, is formed between the fixed mold 2 and the movable mold 4 in the first mold closing state. In addition, the mold 1 for injection molding is configured such that the mold cavity expansion portion 10a, which can mold the second molded component 10 including the non-design-surface portion 10g layered on the non-design surface side of the first molded component 9 and the stitch portion 10f that can be exposed to the first molded component 9 on the design surface side via the through-hole portion 9f of the first molded component 9 from the non-design-surface portion 10g, is formed between the fixed mold 2 and the movable mold 4 in the second mold closing state.

The first injection unit 17 is arranged on the fixed mold 2 side so as to be capable of injecting the first resin 9b to the first resin flow passage 9c. The second injection unit 18 is arranged on the fixed mold 2 side so as to be capable of injecting the second resin 10b to the second resin flow passage 10c.

Incidentally, the first injection unit 17 and the second injection unit 18 may be arranged to be capable of an injection-filling resin into the first mold cavity 9a or the mold cavity expansion portion 10a, and are not limited to the illustrated arrangement. Examples of the arrangement of the first injection unit 17 and the second injection unit 18 can include various types of arrangement such as orthogonal arrangement, V-shaped arrangement and oblique arrangement in addition to parallel arrangement illustrated in FIG. 1A.

Herein, the parallel arrangement is a form in which both the first injection unit 17 and the second injection unit 18 are arranged to be parallel to the mold opening and closing direction on the back surface of the fixed mold 2. The orthogonal arrangement is a form in which one of the first injection unit 17 and the second injection unit 18 is arranged to be parallel to the mold opening and closing direction on the back surface of the fixed mold 2 and the other thereof is arranged to be orthogonal to the mold opening and closing direction on a side surface of the fixed mold 2. The V-shaped arrangement is a form in which both the first injection unit 17 and the second injection unit 18 are arranged to have a slight angle to the mold opening and closing direction on the back surface of the fixed mold 2. The oblique arrangement is a form in which one of the first injection unit 17 and the second injection unit 18 is arranged to be parallel to the mold opening and closing direction on the back surface of the fixed mold 2 and the other thereof is arranged to be oblique to one of the injection units on the back surface of the fixed mold 2.

The above-described types of arrangement may be appropriately selected according to an injection-filling specification such as a kind of a molten resin to be used and an injection-filling amount thereof. In addition, the first injection unit 17 and the second injection unit 18 are preferably arranged to approach and separated from the fixed mold 2 that is immovable. Further, when it is possible to secure a required injection-filling amount even in the case of commercially available retrofitting-type injection units, the arrangement may be a form in which those retrofitting-type injection units may be added to a general-purpose injection molding machine.

Manufacturing Method According to First Embodiment

Next, a description will be given regarding a manufacturing method according to the first embodiment which is performed using the injection molding machine according to the first embodiment with reference to FIGS. 1A to 1C. The manufacturing method according to the first embodiment is schematically a method of molding the first molded component 9 using a typical non-foamable resin, then forming the mold cavity expansion portion 10a by moving the movable portion 40 inside the movable mold 4, and molding the second molded component 10 using a typical non-foamable resin in the mold cavity expansion portion 10a. Hereinafter, the manufacturing method according to the first embodiment will be described in detail.

Incidentally, FIGS. 1B and 1C illustrate the first molded component 9 (the first resin 9b) and the second molded component 10 (the second resin 10b) using black circular dots in order to differentiate them from a cross section of the mold and the movable portion inside the mold, but the dots indicating these molded bodies (resins) are provided only for indicating the respective molded bodies (resins) and do not suggest any type or state of a resin to form the respective molded bodies. The same description is also applied to FIGS. 5B, 6 to 8, 12, 15B to 15E, 17B to 17E, 18 and 19.

In the manufacturing method according to the first embodiment, first, the movable platen is moved to the fixed platen side by the mold clamping mechanism (not illustrated) as illustrated in FIG. 1B from the mold opening state of FIG. 1A so that the fixed mold 2 and the movable mold 4 are mold-closed, and thereafter, a certain mold clamping force is applied (a mold clamping step). At this time, the movable portion 40 of the movable mold 4 is held in the closest approach state toward the fixed mold 2. Accordingly, the first mold cavity 9a is formed between the fixed mold 2 and the movable mold 4.

Next, the first resin 9b is injection-filled into the first mold cavity 9a from the first injection unit 17 via the first resin flow passage 9c as illustrated in FIG. 1B (a primary injection-filling step). Of course, the first gate valve 9d is in an opened state at this time. In addition, the first resin 9b does not intrude into the concave portion 9e as described above. Further, the mold cavity expansion portion 10a is not formed between the fixed mold 2 and the movable mold 4, and thus, there is no risk that the second resin 10b intrudes into the first mold cavity 9a through the second resin flow passage 10c.

Further, the first resin 9b with which the inside of the first mold cavity 9a is filled in the primary injection-filling step is cooled and solidified, and accordingly, the first molded component 9 is molded inside the first mold cavity 9a (the first molding step). The first molded component 9 includes the design surface formed on the front surface thereof using the inner surface of the fixed mold 2. In addition, the plurality of through-hole portions 9f, which penetrate from the front surface (design surface) to the rear surface (surface on the non-design surface side), are formed in the first molded component 9 using the convex portion 41 of the movable portion 40 of the movable mold 4.

After the molding of the first molded component 9, the movable portion 40 is retracted by the driving means (not illustrated), as illustrated in FIG. 1C, from the state of FIG. 1B, and the mold cavity expansion portion 10a, which is configured of the spaces formed by the plurality of concave portions 9e of the fixed mold 2, the spaces formed by the plurality of through-hole portions 9f of the first molded component 9, and the non-design-surface-side space 9g formed between the rear surface of the first molded component 9 and the inner surface of the movable portion 40 of the movable mold 4, is formed (a second molding preparation step). Further, in this state, the second resin 10b is injection-filled into the mold cavity expansion portion 10a from the second injection unit 18 via the second resin flow passage 10c and the second gate valve 10d (a secondary injection-filling step). Of course, the second gate valve 10d is in an opened state. In addition, the fixed mold 2 and the movable mold 4 are continuously in a mold clamping state in which the certain mold clamping force is applied thereto.

The second resin 10b, injection-filled into the mold cavity expansion portion 10a in the secondary injection-filling step, flows in the non-design-surface-side space 9g and further flows inside each of the concave portions 9e via each of the through-hole portions 9f by filling pressure (flow pressure) of the resin, thereby filling the mold cavity expansion portion 10a. Thereafter, the second resin 10b with which the mold cavity expansion portion 10a is filled is cooled and solidified, thereby molding the second molded component 10 layered on the non-design surface side of the first molded component 9 (the second molding step). The second molded component 10 is configured of the non-design-surface portion 10g, which is layered on the rear surface (surface on the non-design surface side) of the first molded component 9, and the stitch portion 10f which is exposed to the first molded component 9 on the front surface (design surface) side via the through-hole portion 9f of the first molded component 9 from the non-design-surface portion 10g. The stitch-shaped design 10e decorated on the concave portion 9e of the fixed mold 2 is transferred to a distal end portion of the stitch portion 10f.

Further, the movable platen is moved in the direction of being moved away from the fixed platen by the mold clamping mechanism (not illustrated) after the second molded component 10 is completely cooled and solidified, and accordingly, the fixed mold 2 and the movable mold 4 are mold-opened. Thereafter, the resin molded product 20 or 20' formed of the first molded component 9 and the second molded component 10 is taken outside the injection molding machine by product take-out means (not illustrated), and the molding cycle is ended.

According to the manufacturing method according to the first embodiment, it is possible to successively manufacture the resin molded products 20 and 20' including an artificial stitch pattern (seam) formed on the front surface (design surface) thereof by repeating the above-described steps as illustrated in an example of FIG. 2A and another example of FIG. 2B. That is, the second molded component 10 is molded to be layered on the non-design surface side of the first molded component 9 such that the distal end portion of the stitch portion 10f (the stitch-shaped design 10e) is exposed to the design-surface side thereof via the through-hole portion 9f of the first molded component 9 (that is, can be visibly recognized from the design-surface side), and accordingly, it is possible to manufacture the resin molded products 20 and 20' in which the stitch-shaped design 10e imitating the seam is formed on the design surface to be visibly recognizable. Here, the stitch-shaped design 10e to be formed on the design surface of the resin molded product 20 or 20' refers to a three-dimensional (convex) design which imitates a twisted yarn or a leather yarn (string) that can be visibly recognized from the design surface in addition to the design surface imitating the leather surface. The stitch-shaped design 10e may include a surface design in which each of irregularities of the twisted yarn or a cross-sectional shape of the leather yarn (string) is expressed on a surface of the three-dimensional design. As illustrated in FIGS. 2A and 2B, a pattern of the artificial stitch pattern, which imitates the twisted yarn or the leather yarn (string), protruding more than the design surface will be referred to as a convex stitch hereinafter.

Incidentally, the second molded component 10 may be configured such that the non-design-surface portion 10g is layered entirely on the rear surface (surface on the non-design surface side) of the first molded component 9, for example, as illustrated in FIG. 2A or may be configured such that the non-design-surface portion 10g is layered partially on the rear surface (surface on the non-design surface side) of the first molded component 9, for example, as illustrated in FIG. 2B. When the non-design-surface portion 10g is layered partially on the rear surface (surface on the non-design surface side) of the first molded component 9, the design thereof is preferably performed based on arrangement of the plurality of through-hole portions 9f such that the non-design-surface-side space 9g serves as a resin flow passage (runner portion) which is configured to guide the second resin 10b to the plurality of through-hole portions 9f of the first molded component 9. Incidentally, a lower arrow in FIGS. 2A and 2B represents an injection-filling direction in the first molding step, and an upper arrow thereof represents an injection-filling direction in the second molding step.

As illustrated in FIG. 2A, the second molded component 10 employs a resin (highly rigid resin) having rigidity at a level that enables holding of a product shape as the second resin 10b to form the second molded component 10 when the non-design-surface portion 10g is configured to be layered entirely on the rear surface (surface on the non-design surface side) of the first molded component 9, and accordingly, it is possible to sufficiently secure the rigidity of the resin molded product 20, and thus, it is possible to employ a flexible resin, for example, a TPO soft resin or the like, which can provide a design surface with soft tactile sensation, as the first resin 9b to form the first molded component 9.

On the other hand, the second molded component 10 employs a resin (highly rigid resin) having rigidity at a level that enables holding of a product shape as the first resin 9b to form the first molded component 9 as illustrated in FIG. 2B when the non-design-surface portion 10g is configured to be layered partially on the rear surface (surface on the non-design surface side) of the first molded component 9, and accordingly, it is possible to sufficiently secure the rigidity of the resin molded product 20', and thus, it is possible to employ a flexible resin, for example, a TPO soft resin or the like, which can provide a stitch pattern with soft tactile sensation, as the second resin 10b to form the second molded component 10.

Figure 3A:
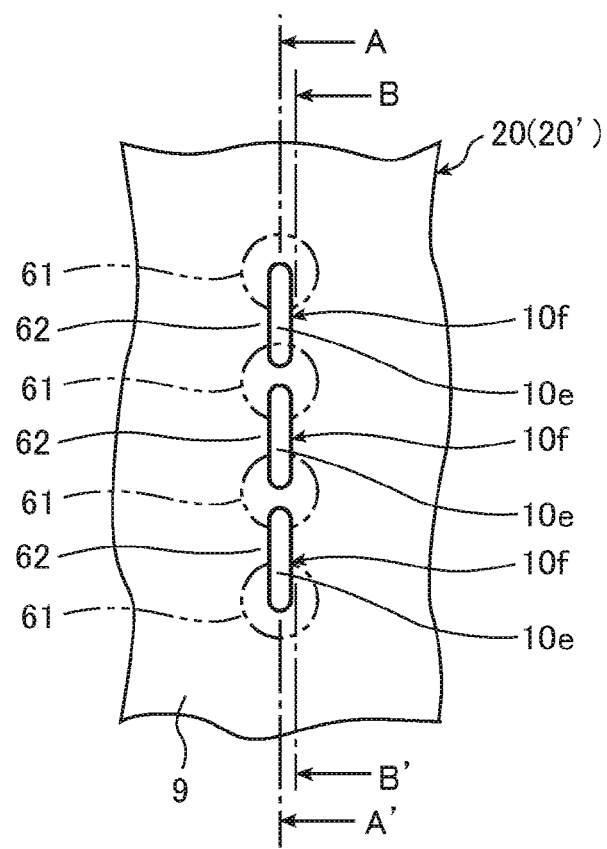
FIG. 3A is a schematic plan view illustrating an example of each shape of a stitch-shaped design and a design surface in the vicinity thereof.
Figure 3B:
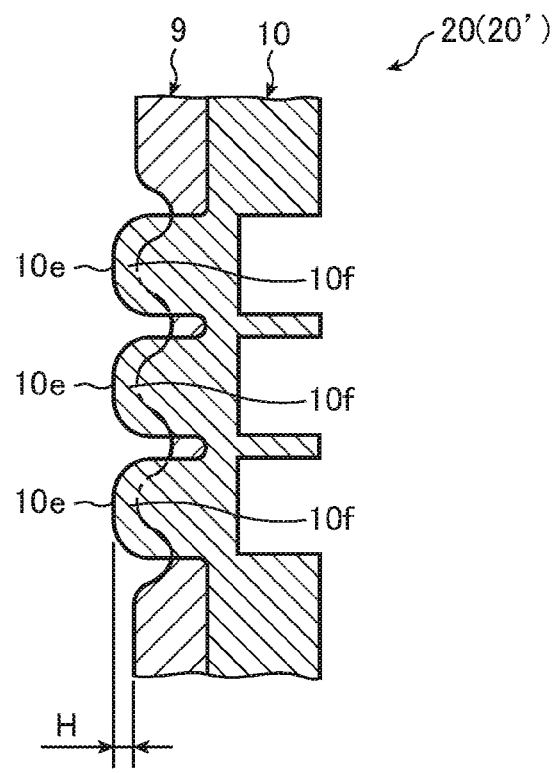
FIG. 3B is a schematic cross-sectional view taken along a line A-A' of FIG. 3A.
Figure 3C:
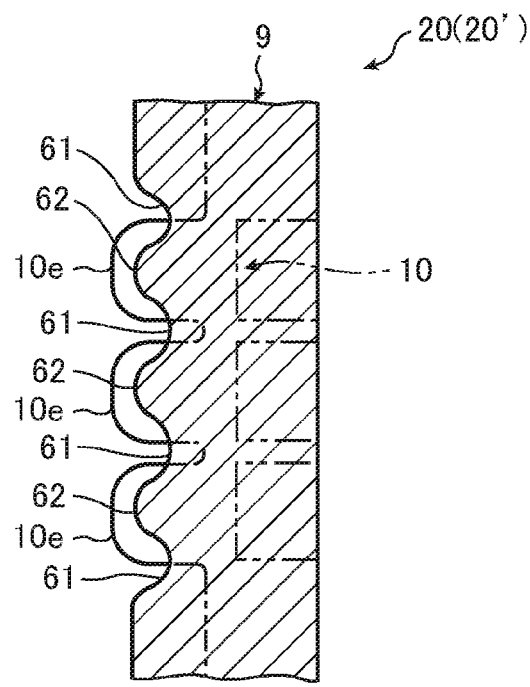
FIG. 3C is a schematic cross-sectional view taken along a line B-B' of FIG. 3A.

Incidentally, FIGS. 1A to 1C, 2A and 2B illustrate the concave portion 9e and the stitch-shaped design 10e as simple concave-convex shapes in order to facilitate understanding, but each shape of the stitch-shaped design 10e and the design surface in the vicinity thereof can have shapes as illustrated in, for example, FIGS. 3A to 3C. FIG. 3A is a schematic plan view illustrating an example of each shape of the stitch-shaped design 10e and the design surface in the vicinity thereof. FIG. 3B is a schematic cross-sectional view taken along a line A-A' of FIG. 3A, and FIG. 3C is a schematic cross-sectional view taken along a line B-B' of FIG. 3A.

To be specific, the shape of the design surface in the vicinity of the stitch-shaped design 10e is formed as a valley shape 61 such that a part which is penetrated by the yarn is expressed as stitching of the yarn against the stitch-shaped design 10e of the twisted yarn and the leather yarn (string) protruding from the design surface. In addition, a mountain shape 62 is formed between the neighboring valley shapes 61, that is, at a central portion in a longitudinal direction of the twisted yarn or the leather yarn (string) protruding from the design surface. Further, the valley shape 61 and mountain shape 62 are smoothly and successively formed. The valley shape 61 and the mountain shape 62 can be formed by forming a concave portion and a convex portion to express irregularities in the vicinity of the seam around the concave portion 9e formed on the mold cavity surface of the fixed mold 2. In this manner, it is possible to express the stitch-shaped design 10e like a more genuine one by forming the valley shape 61 and the mountain shape 62 in the vicinity of the stitch-shaped design 10e.

Incidentally, FIGS. 3B and 3C illustrate an example in which a vertex of the mountain shape 62 substantially matches the design surface and the stitch-shaped design 10e protrudes slightly from the design surface (by a height H), but the invention is not limited thereto. For example, there may be a case in which the mountain shape 62 protrudes from the design surface depending on a height of the stitch-shaped design 10e protruding from the design surface. In addition, the mountain shape 62 may be formed to protrude with a height which is substantially the same as a protruding height of the stitch portion 10f (the stitch-shaped design 10e) (H=0 in FIG. 3B). In this case, it is possible to form the stitch pattern as a flat stitch such that the stitch-shaped design 10e is substantially flush with the design surface on the outward appearance thereof. In addition, the mountain shape 62 may be formed to protrude higher than the protruding height of the stitch portion 10f (the stitch-shaped design 10e) (H=a negative value in FIG. 3B, wherein a protruding height of the stitch-shaped design from the design surface is set to a positive value). In this case, it is possible to form the stitch pattern as a concave stitch such that the stitch-shaped design 10e is retracted from the design surface on the outward appearance thereof.

As described above, the resin molded product 20 or 20' is manufactured by molding the first molded component 9, which forms the design surface of the resin molded product 20 or 20' first, and thereafter, molding the second molded component 10 to be layered on the non-design surface side of the first molded component 9 such that the stitch-shaped design 10e is exposed to the design surface side via the through-hole portion 9f of the first molded component 9 (that is, can be visibly recognized from the design surface side) in the manufacturing method according to the first embodiment.

According to the above-described manufacturing method according to the first embodiment, it is unnecessary to engage a protruding end portion (the stitch-shaped design 10e) of a cord seam portion (the stitch portion 10f) of a first member (the second molded component 10) with a molding surface (the concave portion 9e) of a secondary mold portion to form a seal so as to prevent intrusion of a resin material into an engaged portion as in a manufacturing method disclosed in Patent Literature 1. In addition, the concave portion 9e is filled with the second resin 10b via the through-hole 9f of the first molded component 9 formed in advance even when the stitch-shaped design 10e (corresponding to the cord seam portion of Patent Literature 1) is fine and small, and thus, there is no risk of losing the stitch-shaped design 10e due to melting caused by resin heat or causing shape deformation or positional deviation due to resin flow pressure as in Patent Literature 1. Further, a heat insulating property and a heat retaining property of the through-hole 9f, which is formed using a resin (the first resin 9b) having a lower thermal conductivity than the mold cavity, as the resin flow passage is higher than that of Patent Literature 1 in which the entire cord seam portion is formed using the mold cavity. Thus, both a resin filling property of the second resin 10b into the concave portion 9e in which the stitch-shaped design 10e is molded, and a propagation property of injection-filling pressure and holding pressure toward the second resin 10b inside the concave portion 9e are excellent in the injection-filling in the second molding step, and thus, the above-described method is suitable for molding of the detailed stitch-shaped design 10e.

Accordingly, it is possible to accurately manufacture the resin molded product including the artificial stitch pattern formed on the design surface thereof according to the manufacturing method according to the first embodiment.

Alternative Example of Manufacturing Method According to First Embodiment

The first molded component 9 is molded using the typical non-foamable resin, then, the mold cavity expansion portion 10a is formed by moving the movable portion 40 in the movable mold 4, and the second molded component 10 is molded using the typical non-foamable resin in the above-described manufacturing method according to the first embodiment, but the invention is not limited thereto.

For example, the second molded component 10 may be molded by an injection press molding method or an injection compression method in the above-described manufacturing method according to the first embodiment. To be specific, first, the mold cavity expansion portion 10a is formed to be larger than a desired volume in the second molding preparation step in the injection press molding method. Further, the second resin 10b is injection-filled into the mold cavity expansion portion 10a, formed to be large, in the secondary injection-filling step, and thereafter, the movable portion 40 is moved in the mold closing direction at a suitable timing by the driving means (not illustrated) to decrease the mold cavity expansion portion 10a to a desired volume. In addition, the mold cavity expansion portion 10a is expanded to be larger than a desired volume using resin pressure at the time of the injection-filling of the second resin 10b into the mold cavity expansion portion 10a, and thereafter, the movable portion 40 is moved in the mold closing direction at a suitable timing by the driving means (not illustrated) to decrease the mold cavity expansion portion 10a to a desired volume in the injection compression method. According to these injection press molding method and injection compression method, it is possible to compress the second resin 10b with which the inside of the mold cavity expansion portion 10a is filled along with the decrease in volume of the mold cavity expansion portion 10a.

When the second molded component 10 is molded using the injection press molding method or the injection compression method in this manner, it is possible to cause a more uniform and stable compression force, caused by the movable portion 40, to act on the second resin 10b in the mold cavity expansion portion 10a compared with a deviation in resin pressure (resin flow force) caused by the injection-filling, and thus, it is possible to expect improvement of the transfer property of a more delicate stitch-shaped design or improvement of the resin filling property into fine cavities having a small distance among neighboring seams. That is, the stitch-shaped design 10e imitating the seam of the second molded component 10 is smaller and finer and has a more complex shape as compared to the first molded component 9 including the design surface. Thus, a flow resistance at the time of flowing the resin to the concave portion 9e of the fixed mold 2 via the through-hole 9f of the first molded component 9 is greater than a flow resistance of the resin flowing in the non-design-surface-side space 9g. Accordingly, there is a possibility that it is difficult to secure a required resin pressure and moldability of the stitch-shaped design 10e and the transfer property of the surface design deteriorates in the plurality of through-holes 9f or concave portions 9e depending on flow characteristics of resins to be used. In addition, the deviation in resin pressure caused by the injection-filling is greatly affected by a gate position. For example, a resin leakage occurs as the resin pressure is too high in the vicinity of the gate position, and conversely, it is difficult to secure a required resin pressure in a part far from the gate position, and as a result, it is difficult to obtain the uniform stitch-shaped design 10e. However, when the second molded component 10 is molded using the injection press molding method or the injection compression method, it is possible to cause the more uniform and stable compression force, caused by the movable portion 40, to act on the second resin 10b in the mold cavity expansion portion 10a compared with a deviation in resin pressure (resin flow force) caused by the injection-filling, and thus, it is possible to secure a sufficient resin pressure in the through-hole 9f and the concave portion 9e. Accordingly, it is possible to maintain or improve the moldability of the stitch-shaped design 10e and the transfer property of the surface design even in the of the fine stitch pattern.

In addition, the second molded component 10 may be molded using a foaming molding method in the above-described manufacturing method according to the first embodiment. To be specific, first, the mold cavity expansion portion 10a is molded to be smaller than a desired volume in the second molding preparation step. Further, the second resin 10b made of a foamable resin is injection-filled into the mold cavity expansion portion 10a, formed to be small, in the secondary injection-filling step, and thereafter, the movable portion 40 is moved in the mold opening direction at a suitable timing by the driving means (not illustrated) to expand the mold cavity expansion portion 10a to a desired volume. According to this foaming molding method, it is possible to foam the second resin 10b with which the inside of the mold cavity expansion portion 10a is filled along with the expansion in volume of the mold cavity expansion portion 10a.

In this manner, it is possible to form the stitch portion 10f (the stitch-shaped design 10e), exposed to the design surface, as a three-dimensional design having a foam layer by molding the second molded component 10 using the foaming molding method, and thus, it is possible to give the soft tactile sensation to the stitch portion 10f (the stitch-shaped design 10e).

Further, the first molded component 9 may be molded by an injection press molding method or an injection compression method in the above-described manufacturing method according to the first embodiment. To be specific, first, the first mold cavity 9a is formed to be larger than a desired volume in the mold clamping step in the injection press molding method. Further, the first resin 9b is injection-filled into the first mold cavity 9a, formed to be large, in the primary injection-filling step, and thereafter, the movable portion 40 is moved in the mold closing direction at a suitable timing by the driving means (not illustrated) to decrease the first mold cavity 9a to a desired volume. In addition, the first mold cavity 9a is expanded to be larger than a desired volume using resin pressure at the time of the injection-filling of the first resin 9b into the first mold cavity 9a, and thereafter, the movable portion 40 is moved in the mold closing direction at a suitable timing by the driving means (not illustrated) to decrease the first mold cavity 9a to a desired volume in the injection compression method.

According to these injection press molding method and injection compression method, it is possible to compress the first resin 9b with which the inside of the first mold cavity 9a is filled along with the decrease in volume of the first mold cavity 9a. When the first molded component 9 is molded using the injection press molding method or the injection compression method in this manner, it is possible to maintain or improve the resin filling property inside the first mold cavity 9a due to the action of the compression force caused by the movable portion 40 as described above even in the case of employing the resin with a low fluidity (for example, the TPO soft resin or the like) as the first resin 9b, for example. In addition, it is possible to reduce a thickness of the first molded component 9 by molding the first molded component 9 using the injection press molding method or the injection compression method, and accordingly, it is possible to acquire reduction in weight of the product.

Incidentally, it is possible to mold the second molded component 10 using the injection press molding method or the injection compression method or to mold the second molded component 10 using the foaming molding method according to the same method described above even in the case of molding the first molded component 9 using the injection press molding method or the injection compression method. When both the first molded component 9 and the second molded component 10 are molded using the injection press molding method or the injection compression method, it is possible to maintain or further improve the moldability of the resin molded product 20 or 20' and the transfer property of the surface design. In addition, when the second molded component 10 is molded using the foaming molding method, it is possible to give the soft tactile sensation to the stitch portion 10f (the stitch-shaped design 10e) as described above.

Further, the first molded component 9 may be molded using the foaming molding method in the above-described manufacturing method according to the first embodiment. To be specific, first, the first mold cavity 9a is molded to be smaller than a desired volume in the mold clamping step. Further, the first resin 9b made of a foamable resin is injection-filled into the first mold cavity 9a, formed to be small, in the primary injection-filling step, and thereafter, the movable portion 40 is moved in the mold opening direction at a suitable timing by the driving means (not illustrated) to expand the first mold cavity 9a to a desired volume. According to this foaming molding method, it is possible to foam the first resin 9b with which the inside of the first mold cavity 9a is filled along with the expansion in volume of the first mold cavity 9a. When the first molded component 9 is molded using the foaming molding method in this manner, it is possible to give the soft tactile sensation to the design surface of the resin molded product 20 or 20' and further to reduce the weight of the resin molded product 20 or 20'.

Incidentally, it is possible to mold the second molded component 10 using the injection press molding method or the injection compression method or to mold the second molded component 10 using the foaming molding method according to the same method described above even in the case of molding the first molded component 9 using the foaming molding method. When the second molded component 10 is molded using the injection press molding method or the injection compression method, it is possible to maintain or improve the moldability of the stitch-shaped design 10e and the transfer property of the surface design even in the case of the fine stitch pattern as described above. In addition, when both the first molded component 9 and the second molded component 10 are molded using the foaming molding method, it is possible to give the soft tactile sensation to the entire resin molded product 20 or 20'.

Alternative Example of Injection Molding Machine According to First Embodiment

Although the injection molding machine according to the first embodiment has been described as above, various types of modification or reformation can be added to the injection molding machine according to the first embodiment. Although the description has been given with the injection molding machine according to the first embodiment in which the movable portion 40 is arranged in the movable mold 4 (the non-design-surface-side mold), for example, the movable portion 40 may be arranged in the fixed mold 2 (the design-surface-side mold) without being limited thereto.

Figure 4:
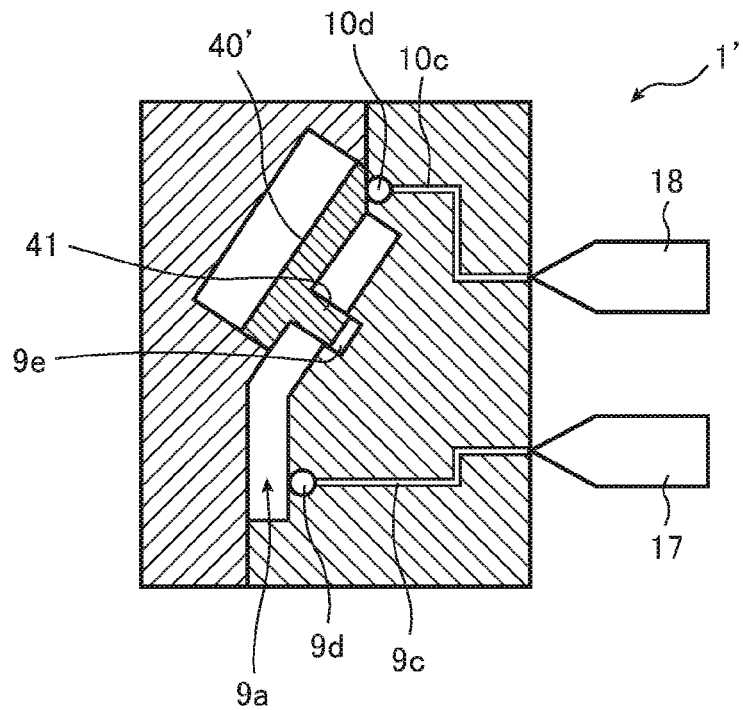
FIG. 4 is a schematic cross-sectional view illustrating an alternative example of the mold for injection molding according to the first embodiment.

In addition, FIGS. 1A to 1C illustrate the example in which the movable portion 40 is configured to move in parallel with the mold opening and closing direction, but the moving direction of the movable portion 40 may be appropriately designed in accordance with arrangement of a design surface of a resin molded product to be molded inside a mold without being limited thereto. For example, it is also possible to arrange a movable portion 40' to move in a direction of intersecting the mold opening and closing direction as in a mold 1' for injection molding according to another example illustrated in FIG. 4. According to the above-described mold 1' for injection molding of the other example, the stitch-shaped design 10e can be decorated in the direction of intersecting the mold opening and closing direction.

Injection Molding Machine According to Second Embodiment

Figure 5A:
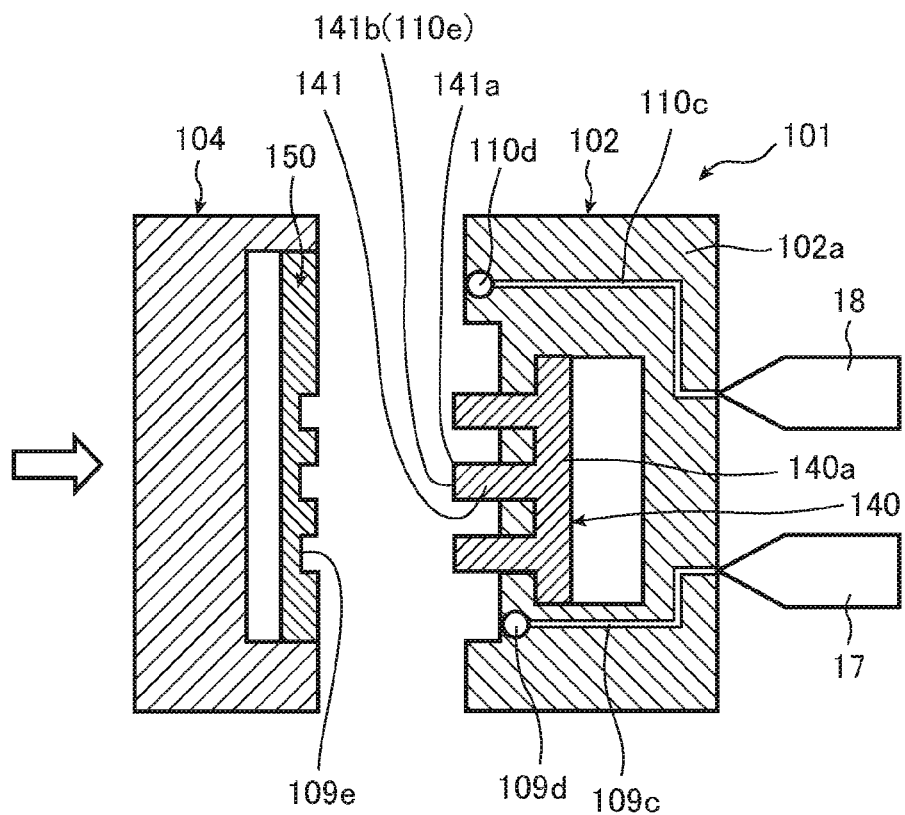
FIG. 5A is a schematic cross-sectional view illustrating a mold opening state of a mold for injection molding according to a second embodiment.
Figure 5B:
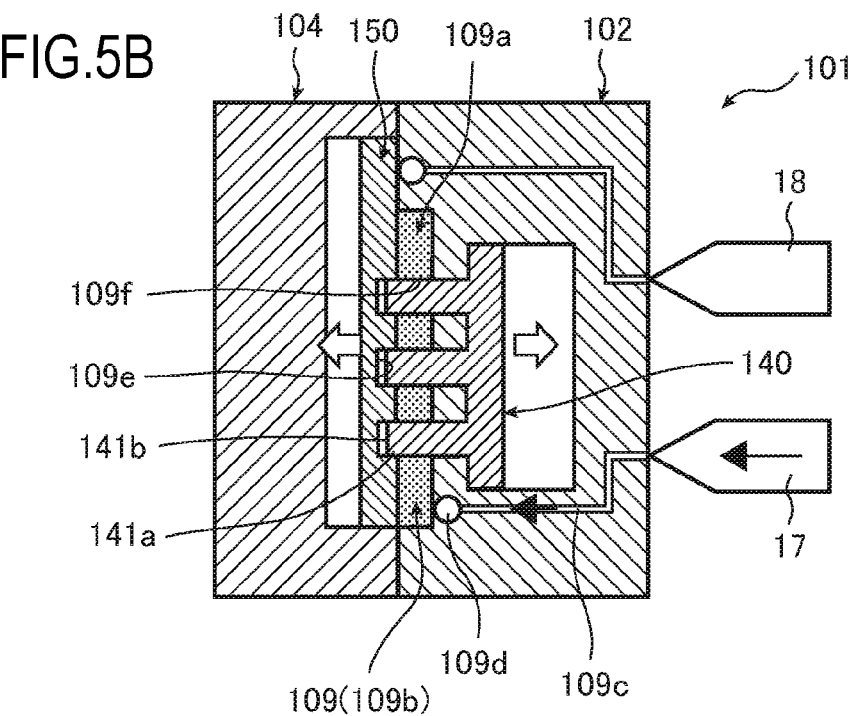
FIG. 5B is a schematic cross-sectional view illustrating a first molding step in a manufacturing method according to the second embodiment which is performed using the mold for injection molding according to the second embodiment.
Figure 6:
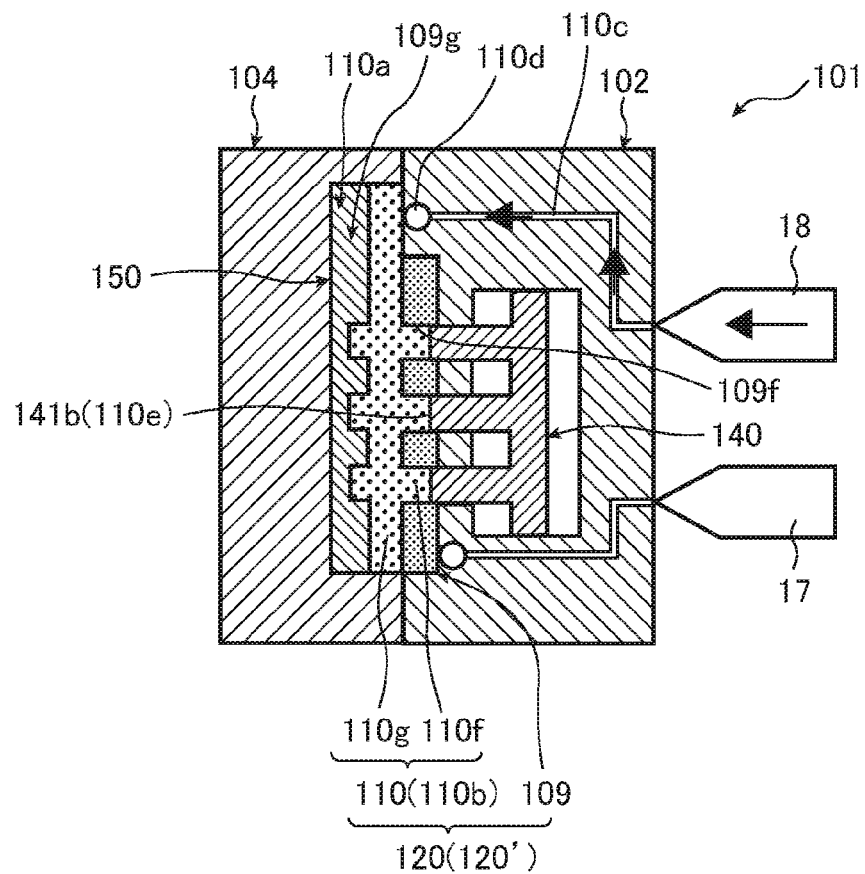
FIG. 6 is a schematic cross-sectional view illustrating a second molding step in the case of molding a concave stitch in the manufacturing method according to the second embodiment which is performed using the mold for injection molding according to the second embodiment.
Figure 7:
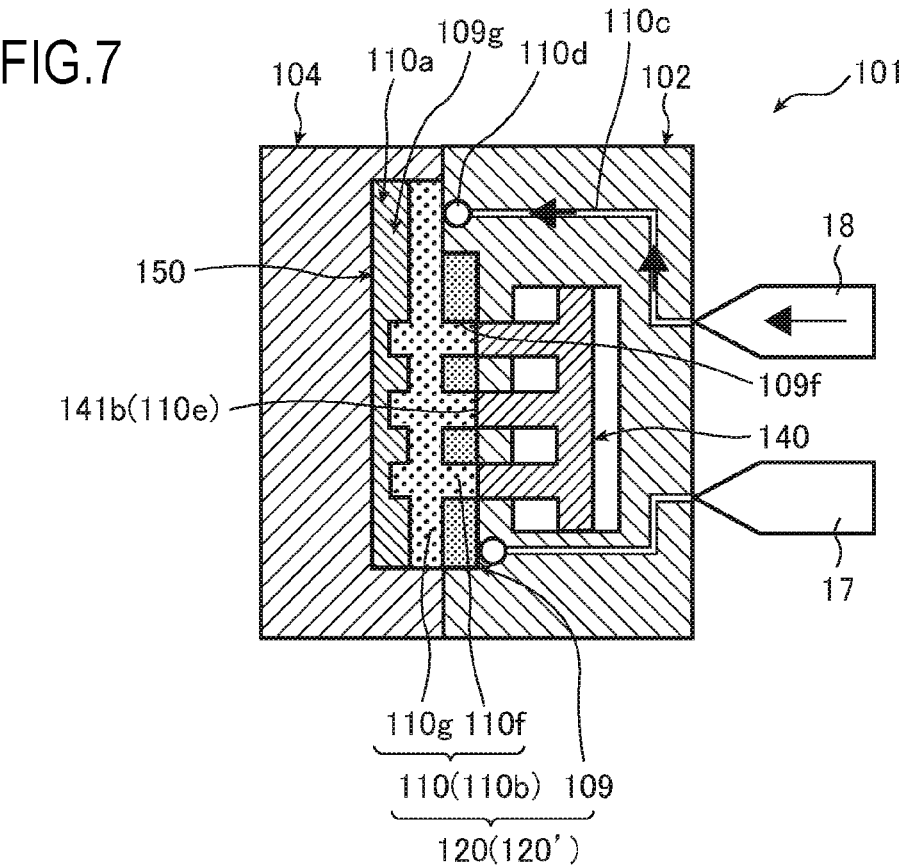
FIG. 7 is a schematic cross-sectional view illustrating the second molding step in the case of molding a flat stitch in the manufacturing method according to the second embodiment which is performed using the mold for injection molding according to the second embodiment.
Figure 8:
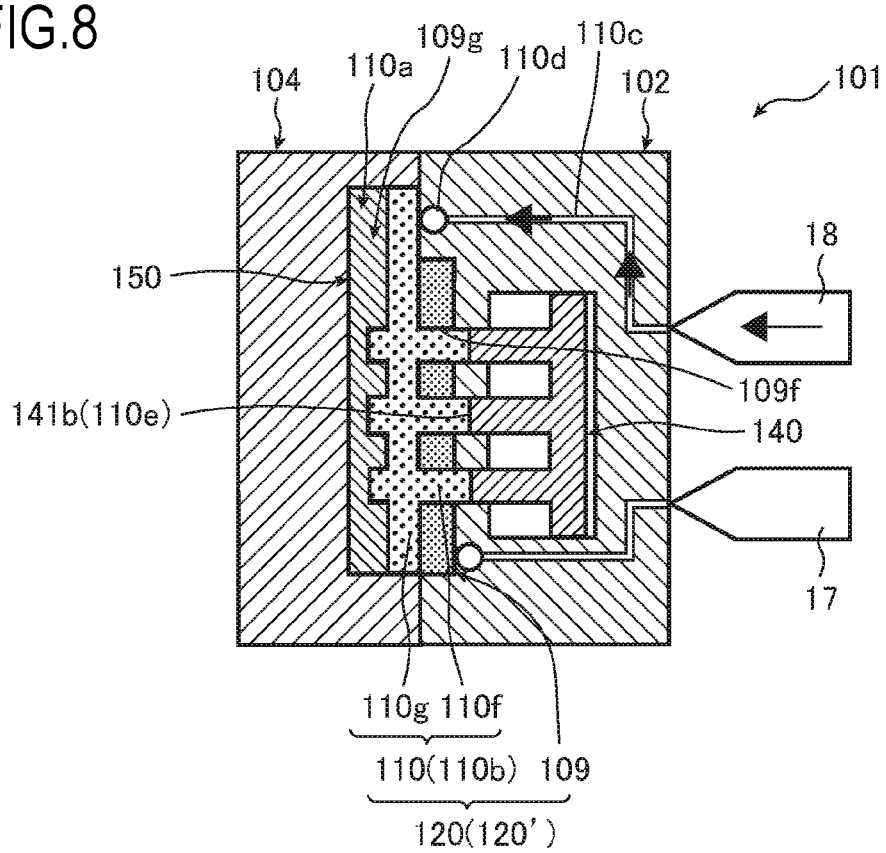
FIG. 8 is a schematic cross-sectional view illustrating the second molding step in the case of molding a convex stitch in the manufacturing method according to the second embodiment which is performed using the mold for injection molding according to the second embodiment.

Next, an injection molding machine according to a second embodiment will be described with reference to FIGS. 5A, 5B and 6 to 8. FIG. 5A is a schematic cross-sectional view illustrating a state in which a mold 101 for injection molding of the injection molding machine according to the second embodiment is opened (mold opening state). FIG. 5B is a schematic cross-sectional view illustrating a state in which a first molding step is performed in a first mold cavity 109a which is formed as the mold 101 for injection molding is mold-closed. Each of FIGS. 6 to 8 is a schematic cross-sectional view illustrating a state in which a second molding step is performed in a mold cavity expansion portion 110a which is formed as first and second movable portions 140 and 150 to be described later move after the first molding step. To be specific, FIG. 6 is the schematic cross-sectional view illustrating the second molding step in the case of molding a concave stitch. FIG. 7 is the schematic cross-sectional view illustrating the second molding step in the case of molding a flat stitch. FIG. 8 is the schematic cross-sectional view illustrating the second molding step in the case of molding a convex stitch.

A difference of the injection molding machine according to the second embodiment from the injection molding machine according to the first embodiment is that the mold cavity expansion portion 110a is formed not by movement of a movable portion (the movable portion 40 according to the first embodiment) inside a mold in one direction, but by movement of two types of opposing movable portions (the first and second movable portions 140 and 150) in the respective directions of moving away from each other.

Due to such a difference, it is possible to mold not only the convex stitch (see FIG. 8), which can be molded by the injection molding machine according to the first embodiment, but also the flat stitch (see FIG. 7) which has a stitch-shaped design being substantially flush with a design surface and the concave stitch (see FIG. 6) which has a stitch-shaped design lower than the design surface as actual designs not just in terms of outward appearance in the injection molding machine according to the second embodiment. That is, it is possible to mold any one among the concave stitch illustrated in FIG. 6, the flat stitch illustrated in FIG. 7, and the convex stitch illustrated in FIG. 8 by changing the amount of movement of the first movable portion 140 of a fixed mold 102 in the direction of moving away from a movable mold 104 according to the injection molding machine according to the second embodiment.

Incidentally, in the description of the second embodiment, the first mold cavity 109a indicates a space between an inner surface of the fixed mold 102 and an inner surface of the second movable portion 150 of the movable mold 104 which is formed as the fixed mold 102 and the movable mold 104 are mold-clamped in a state in which the first movable portion 140 of the fixed mold 102 approaches the movable mold 104 the closest and the second movable portion 150 of the movable mold 104 approaches the fixed mold 102 the closest as illustrated in FIG. 5B. Similarly to the first embodiment, the first mold cavity 109a includes a design surface imitating a leather surface on a front surface thereof, and a first molded component 109 is molded with a plurality of through-hole portions 109f formed to penetrate from the front surface to a rear surface.

Figure 9A:
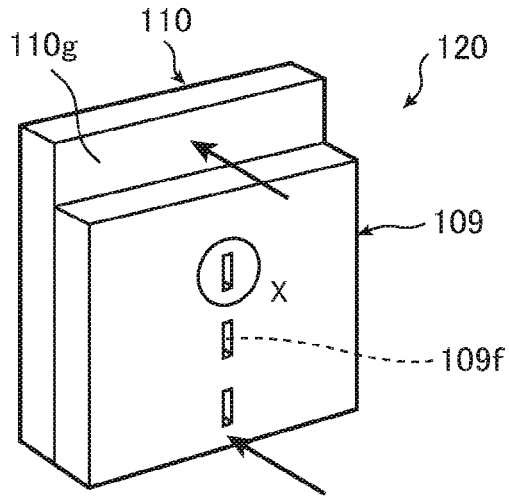
FIG. 9A is a schematic perspective view illustrating an example of a resin molded product which is manufactured using the manufacturing method according to the second embodiment.
Figure 9B:
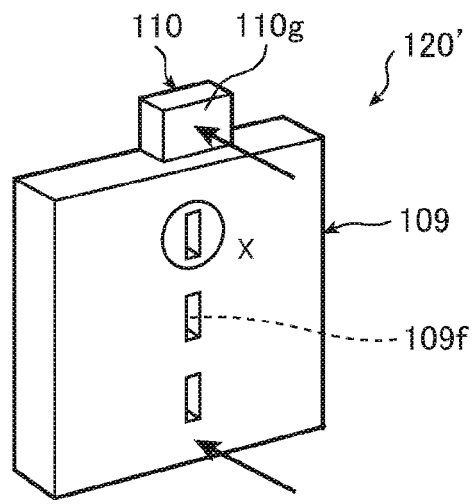
FIG. 9B is a schematic perspective view illustrating another example of the resin molded product which is manufactured using the manufacturing method according to the second embodiment.
Figure 9C:
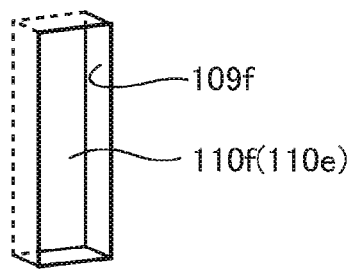
FIG. 9C is a schematic view illustrating a part X in FIGS. 9A and 9B in an enlarged manner.

In addition, in the description of the second embodiment, the mold cavity expansion portion (the second mold cavity) 110a indicates a space which is newly formed by moving the first movable portion 140 of the fixed mold 102 in a direction of moving away from the movable mold 104 and by moving the second movable portion 150 of the movable mold 104 in a direction of moving away from the fixed mold 102 after the molding of the first molded component 109 as illustrated in FIGS. 6 to 8. To be specific, the mold cavity expansion portion 110a is configured of spaces inside a plurality of concave portions 109e formed in the second movable portion 150 of the movable mold 104, spaces inside the plurality of through-hole portions 109f formed in the first molded component 109, and a non-design-surface-side space 109g which is formed between the rear surface (surface on the non-design surface side) of the first molded component 109 and the inner surface of the fixed mold 102, and the inner surface of the second movable portion 150 of the movable mold 104. As illustrated in FIGS. 9A to 9C, for example, a second molded component 110, which is formed of a non-design-surface portion 110g layered on the rear surface (surface on the non-design surface side) of the first molded component 109 and a stitch portion 110f which is exposed to the front surface (design surface) of the first molded component 109 from the non-design-surface portion 110g via the through-hole portion 109f of the first molded component 109, is molded in the mold cavity expansion portion 110a.

Similarly to the injection molding machine according to the first embodiment, the injection molding machine according to the second embodiment is provided with a fixed platen (not illustrated), a movable platen (not illustrated), a mold 101 for injection molding which is provided between the fixed platen and the movable platen, the first injection unit 17, the second injection unit 18, and a mold clamping mechanism (not illustrated). Incidentally, it is possible to employ the same one of the fixed platen, the movable platen, the first injection unit 17, the second injection unit 18, and the mold clamping mechanism of the injection molding machine according to the first embodiment as each one of the fixed platen, the movable platen, the first injection unit 17, the second injection unit 18, and the mold clamping mechanism of the injection molding machine according to the second embodiment, and thus, the same reference signs will be used and the description thereof will be omitted.

The mold 101 for injection molding according to the second embodiment is provided with the fixed mold (common mold) 102 attached to the fixed platen and the movable mold 104 attached to the movable platen as illustrated in FIG. 5A.

The fixed mold 102 is a design-surface-side mold which is configured to form the design surface of a resin molded product 120 or 120'. The fixed mold 102 is provided with a fixed mold main body 102a fixed to the fixed platen and the first movable portion 140 which is supported by the fixed mold main body 102a in a relatively movable manner so as to be movable in a direction of moving closer to or moving away from the movable mold 104 (mold opening and closing direction).

The fixed mold main body 102a includes a mold cavity surface (inner surface) which is decorated with the design surface imitating the leather surface, and an internal space which can house the first movable portion 140. A through-hole is formed in the mold cavity surface of the fixed mold main body 102a to allow a distal end portion 141a of the first movable portion 140 housed inside the internal space to protrude toward the movable mold 104 and be inserted therein. A back surface (surface on the opposite side of the mold cavity surface) of the fixed mold main body 102a is fixed to the fixed platen by various types of fixing means. In addition, the fixed mold main body 102a includes a first resin flow passage 109c and a second resin flow passage 110c formed as a hot runner, a first gate valve 109d, and a second gate valve 110d, which is similar to the fixed mold 2 according to the first embodiment.

The first movable portion 140 includes a movable plate portion 140a, which is housed inside the internal space of the fixed mold main body 102a to be movable in the mold opening and closing direction, and a plurality of convex portions 141 which are provided to protrude from the movable plate portion 140a toward the movable mold 104.

The movable plate portion 140a is configured to be movable in the mold opening and closing direction by arbitrary driving means (not illustrated).

The number of the plurality of convex portions 141 and positions thereof can be arbitrarily set depending on the desired number of stitch-shaped designs 110e and desired positions thereof. Each of distal end surfaces 141b of the convex portions 141 is decorated with the stitch-shaped design 110e imitating a seam. As illustrated in FIG. 5B, each of the convex portions 141 has a shape and a length in a protruding direction such that each distal end portion 141a of the convex portions 141 is housed inside each of the concave portions 109e of the second movable portion 150 at a position (forward limit position) at which the first movable portion 140 and the second movable portion 150 approach each other the closest. Similarly to the mold 1 for injection molding according to the first embodiment, it is also preferable that each of the distal end surfaces 141b of the convex portions 141 have the length in the protruding direction so as not to abut on a concave surface of the opposing concave portion 109e, and a clearance of about 5/100 mm (that is, 0.05 mm) be provided between an opening portion of the concave portion 109e and the distal end portion 141a in the mold 101 for injection molding according to the second embodiment.

The movable mold 104 is a non-design-surface-side mold which is configured to form a non-design surface of the resin molded product 120 or 120'. As illustrated in FIG. 5A, the movable mold 104 is provided with a movable mold main body 104a fixed to the movable platen and the second movable portion 150 which is supported by the movable mold main body 104a in a relatively movable manner so as to be movable in the direction of moving closer to or moving away from the fixed mold 102 (the mold opening and closing direction).

A housing portion capable of housing the second movable portion 150 is formed on a side of the movable mold main body 104a opposing the fixed mold 102, and an opposite side thereof is fixed to the movable platen by various types of fixing means.

The second movable portion 150 is configured as a movable plate portion to form a surface on the non-design surface side of the first molded component 109 and a non-design surface of the second molded component 110, and includes the concave portion 109e formed at a certain position on the surface opposing the fixed mold 102 so as to receive the distal end portion 141a of the first movable portion 140 of the fixed mold 102. This concave portion 109e is provided to be equal to the number of the convex portions 141 of the first movable portion 140, and is arranged at positions to be aligned with the convex portions 141 of the first movable portion 140 such that the single convex portion 141 is associated with the single concave portion 109e. The second movable portion 150 is configured to be movable in the mold opening and closing direction by arbitrary driving means (not illustrated).

The mold 101 for injection molding according to the second embodiment is configured such that a mold opening operation, a mold closing operation and a mold clamping operation are executed between the fixed mold 102 and the movable mold 104 by moving the movable platen in the mold opening and closing direction using the mold clamping mechanism (not illustrated).

In addition, the mold 101 for injection molding is configured to expand the first mold cavity 109a to form the mold cavity expansion portion 110a as illustrated in FIGS. 6 to 8 by moving the first movable portion 140 of the fixed mold 102 in the mold opening direction (rightward direction in FIG. 5B) and the second movable portion 150 of the movable mold 104 in the mold opening direction (leftward direction in FIG. 5B) using the driving means (not illustrated) in a state in which the fixed mold 102 and the movable mold 104 are mold-closed. That is, the mold 101 for injection molding is configured to be capable of switching a first mold closing state in which the convex portion 141 of the first movable portion 140 is present over the movable mold 104 from the fixed mold 102 and a second mold closing state in which the convex portion 141 of the first movable portion 140 is not present over the movable mold 104 from the fixed mold 102 as the first movable portion 140 is moved in the direction of moving closer to or moving away from the movable mold 104. Further, the mold 101 for injection molding is configured such that the first mold cavity 109a, which can mold the first molded component 109 including the design surface and the through-hole portion 109f penetrating from the design surface to the surface on the non-design surface side, is formed between the fixed mold 102 and the movable mold 104 in the first mold closing state. In addition, the mold 101 for injection molding is configured such that the mold cavity expansion portion 110*a*, which can mold the second molded component 110 including the non-design-surface portion 110*g* layered on the non-design surface side of the first molded component 109 and the stitch portion 110*f* that can be exposed to the first molded component 109 on the design surface side via the through-hole portion 109*f* of the first molded component 109 from the non-design-surface portion 110*g*, is formed between the fixed mold 102 and the movable mold 104 in the second mold closing state.

Manufacturing Method According to Second Embodiment

Next, a description will be given regarding a manufacturing method according to the second embodiment which is performed using the injection molding machine according to the second embodiment with reference to FIGS. 5A, 5B and 6 to 8. The manufacturing method according to the second embodiment is schematically a method of molding the first molded component 109 using a typical non-foamable resin, then forming the mold cavity expansion portion 110*a* by moving the first movable portion 140 inside the fixed mold 102 and the second movable portion 150 inside the movable mold 104, and molding the second molded component 110 using a typical non-foamable resin in the mold cavity expansion portion 110*a*. Hereinafter, the manufacturing method according to the second embodiment will be described in detail.

In the manufacturing method according to the second embodiment, first, the movable platen is moved to the fixed platen side by the mold clamping mechanism (not illustrated) as illustrated in FIG. 5B from the mold opening state of FIG. 5A so that the fixed mold 102 and the movable mold 104 are mold-closed, and thereafter, a certain mold clamping force is applied (a mold clamping step). At this time, each of the first movable portion 140 inside the fixed mold 102 and the second movable portion 150 inside the movable mold 104 is held in the state of approaching each other the closest. Accordingly, the first mold cavity 109*a* is formed between the fixed mold 102 and the movable mold 104.

In this state, the first molded component 109 is molded in the first mold cavity 109*a* according to the same step of the manufacturing method according to the first embodiment as illustrated in FIG. 5B (a first molding step). The first molded component 109 includes the design surface formed on the front surface thereof using the inner surface of the fixed mold 102. In addition, the plurality of through-hole portions 109*f*, which penetrate from the front surface (design surface) to the rear surface (surface on the non-design surface side), are formed in the first molded component 109 using the convex portion 141 of the first movable portion 140 of the fixed mold 102.

After the molding of the first molded component 109, each of the first movable portion 140 and the second movable portion 150 are moved (retracted) from the state of FIG. 5B in the direction of moving away from each other by the driving means (not illustrated) as illustrated in any one of FIGS. 6 to 8. Accordingly, the mold cavity expansion portion 110*a*, which is configured of spaces formed by the plurality of through-hole portions 109*f* of the first molded component 109 and the non-design-surface-side space 109*g* formed between the rear surface (surface on the non-design surface side) of the first molded component 109 and the inner surface of the second movable portion 150 of the movable mold 104, is formed between the fixed mold 102 and the movable mold 104 (a second molding preparation step).

Further, in this state, a second resin 110*b* is injection-filled into the mold cavity expansion portion 110*a* from the second injection unit 18 as illustrated in any one of FIGS. 6 to 8 according to the same step of the manufacturing method according to the first embodiment (a secondary injection-filling step). Accordingly, the second molded component 110 layered on the non-design surface side of the first molded component 109 is molded (a second molding step). The second molded component 110 is configured of the non-design-surface portion 110*g*, which is layered on the rear surface (surface on the non-design surface side) of the first molded component 109, and the stitch portion 110*f* which is exposed to the first molded component 109 on the front surface (design surface) side via the through-hole portion 109*f* of the first molded component 109 from the non-design-surface portion 110*g*. The stitch-shaped design 110*e* decorated on the distal end surface 141*b* of the first movable portion 140 of the fixed mold 102 is transferred to a distal end portion of the stitch portion 110*f*.

Further, the movable platen is moved in the direction of being moved away from the fixed platen by the mold clamping mechanism (not illustrated) after the second molded component 110 is completely cooled and solidified, and accordingly, the fixed mold 102 and the movable mold 104 are mold-opened. Thereafter, the resin molded product 120 or 120' formed of the first molded component 109 and the second molded component 110 is taken outside the injection molding machine by product take-out means (not illustrated), and the molding cycle is ended.

According to the manufacturing method according to the second embodiment, it is possible to successively manufacture the resin molded products 120 and 120' including an artificial stitch pattern (seam) formed on the front surface (design surface) thereof by repeating the above-described steps.

Here, a difference from the manufacturing method according to the first embodiment is that the stitch-shaped design 110*e* imitating the seam is formed using a movable part such as the distal end surface 141*b* of the first movable portion 140 instead of a part which is immovable such as the concave portion 9*e* in the first embodiment. In the manufacturing method according to the second embodiment, it is possible to mold the concave stitch illustrated in FIG. 6 and the flat stitch illustrated in FIG. 7 as well as the convex stitch illustrated in FIG. 8 due to the above-described difference.

That is, it is possible to mold the concave stitch on the design surface of the resin molded product 120 or 120' as illustrated in an example of FIG. 9A and another example of FIG. 9B by moving the first movable portion 140 in the mold opening direction in the second molding preparation step such that the distal end surface 141*b* remains inside the through-hole portion 109*f* of the first molded component 109 as illustrated in FIG. 6. Incidentally, FIG. 9A is a schematic view illustrating an example of the resin molded product 120 in which the non-design-surface portion 110*g* of the second molded component 110 is layered entirely on the rear surface of the first molded component 109. FIG. 9B is a schematic view illustrating an example of the resin molded product 120' in which the non-design-surface portion 110*g* of the second molded component 110 is layered partially on the rear surface of the first molded component 109. FIG. 9C is a schematic view illustrating a part X in FIGS. 9A and 9B in an enlarged manner.

That is, it is possible to mold the flat stitch (not illustrated) on the design surface of the resin molded product 120 or 120' by moving the first movable portion 140 in the mold opening direction in the second molding preparation step such that the distal end surface 141b becomes substantially flush with the mold cavity surface of the fixed mold 102 as illustrated in FIG. 7.

Further, it is possible to mold the convex stitch (not illustrated) on the design surface of the resin molded product 120 or 120', which is similar to the manufacturing method according to the first embodiment, by moving the first movable portion 140 in the mold opening direction in the second molding preparation step such that the distal end surface 141b is positioned on the fixed mold 102 side than the mold cavity surface of the fixed mold 102 as illustrated in FIG. 8. Incidentally, although the example of FIG. 8 illustrates a form in which the convex stitch is formed inside a space formed by the inner surface of the through-hole of the fixed mold 102 and the distal end surface 141b of the first movable portion 140, the distal end surface 141b of the first movable portion 140 may be formed in a concave shape and a three-dimensional design of the convex stitch may be entirely formed using the stitch-shaped design 110e of the distal end surface 141b of the first movable portion 140 without being limited thereto.

Incidentally, FIGS. 5A, 5B, 6 to 8, and 9A to 9C illustrate the shapes of the stitches as simple concave-convex shapes in order to facilitate understanding, but a valley shape and a mountain shape may be formed on the stitch-shaped design 110e and the design surface in the vicinity thereof as it has been already described in the first embodiment. In this manner, it is possible to express the stitch-shaped design 110e like a more genuine one by forming the valley shape and the mountain shape in the vicinity of the stitch-shaped design 110e.

As described above, the resin molded product 120 or 120' is manufactured by molding the first molded component 109, which forms the design surface of the resin molded product 120 or 120' first, and thereafter, molding the second molded component 110 to be layered on the non-design surface side of the first molded component 109 such that the stitch-shaped design 110e is exposed to the design surface side via the through-hole portion 109f of the first molded component 109 (that is, can be visibly recognized from the design surface side) in the manufacturing method according to the second embodiment, which is similar to the manufacturing method according to the first embodiment. Thus, it is possible to accurately manufacture the resin molded product including the artificial stitch pattern formed on the design surface thereof according to the manufacturing method according to the second embodiment due to the same reason in the above-described manufacturing method according to the first embodiment.

Alternative Example of Manufacturing Method According to Second Embodiment

The above-described manufacturing method according to the second embodiment has been described as the method of molding the first molded component 109 using the typical non-foamable resin, then forming the mold cavity expansion portion 110a by moving the first movable portion 140 of the fixed mold 102 and the second movable portion 150 of the movable mold 104, and molding the second molded component 110 using the typical non-foamable resin in the mold cavity expansion portion 110a, but is not limited thereto.

For example, one or both of the first molded component 109 and the second molded component 110 may be molded using the injection press molding method or the injection compression method, which has been described already in the alternative example of the manufacturing method according to the first embodiment, in the above-described manufacturing method according to the second embodiment. In addition, one or both of the first molded component 109 and the second molded component 110 may be molded using the foaming molding method that has been described already in the alternative example of the manufacturing method according to the first embodiment. Further, one of the first molded component 109 and the second molded component 110 may be molded using the injection press molding method or the injection compression method and the other thereof may be molded using the foaming molding method.

Alternative Example of Injection Molding Machine According to Second Embodiment

Although the injection molding machine according to the second embodiment has been described as above, various types of modification or reformation can be added to the injection molding machine according to the second embodiment. Although the description has been given with the injection molding machine according to the second embodiment in which the first movable portion 140 is arranged in the fixed mold 102 and the second movable portion 150 is arranged in the movable mold 104, for example, the second movable portion 150 may be arranged in the fixed mold 102, and the first movable portion 140 may be arranged in the movable mold 104 without being limited thereto.

Figure 10:
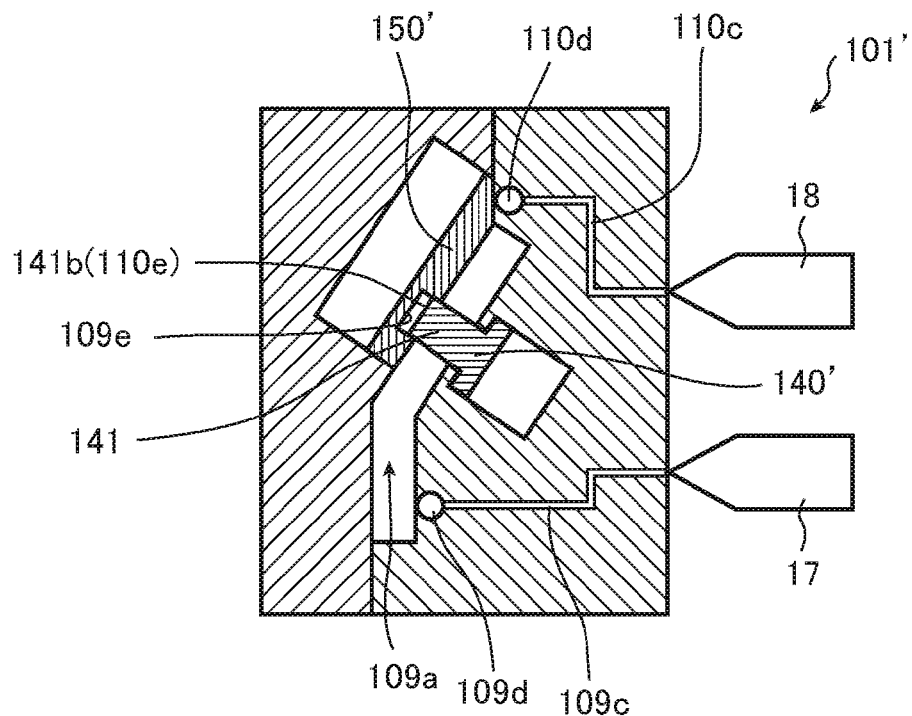
FIG. 10 is a schematic cross-sectional view illustrating an alternative example of the mold for injection molding according to the second embodiment.

In addition, FIGS. 5A, 5B and 6 to 8 illustrate the example in which the first movable portion 140 and the second movable portion 150 are configured to be parallel with the mold opening and closing direction, but each moving direction of the first movable portion 140 and the second movable portion 150 may be appropriately designed in accordance with arrangement of a design surface of a resin molded product to be molded inside a mold without being limited thereto. For example, it is also possible to arrange a first movable portion 140' and a second movable portion 150' to move in a direction of intersecting the mold opening and closing direction as in a mold 101' for injection molding according to another example illustrated in FIG. 10. According to the above-described mold 101' for injection molding of the other example, the stitch-shaped design 110e can be decorated in the direction of intersecting the mold opening and closing direction.

Injection Molding Machine According to Third Embodiment

Figure 11A:
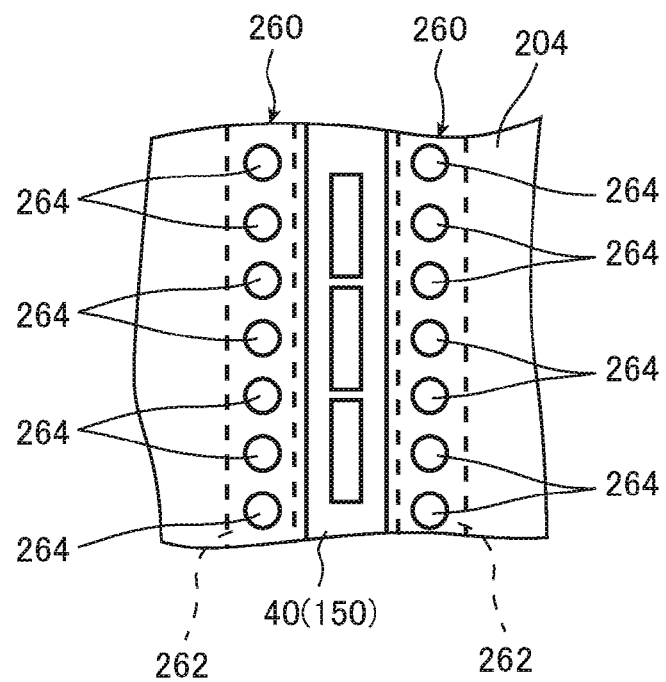
FIG. 11A is a schematic configuration diagram illustrating a state of a mold cavity surface of a non-design-surface-side mold, which is viewed from a design-surface-side mold side, in a mold for injection molding according to a third embodiment.
Figure 11B:
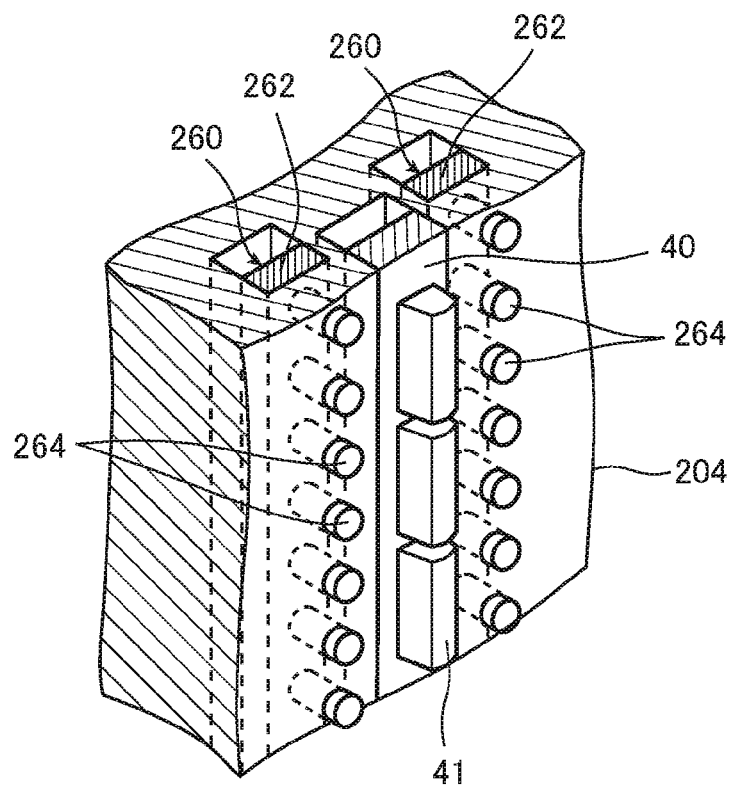
FIG. 11B is a schematic perspective view illustrating an example of the non-design-surface-side mold according to the third embodiment.
Figure 11C:
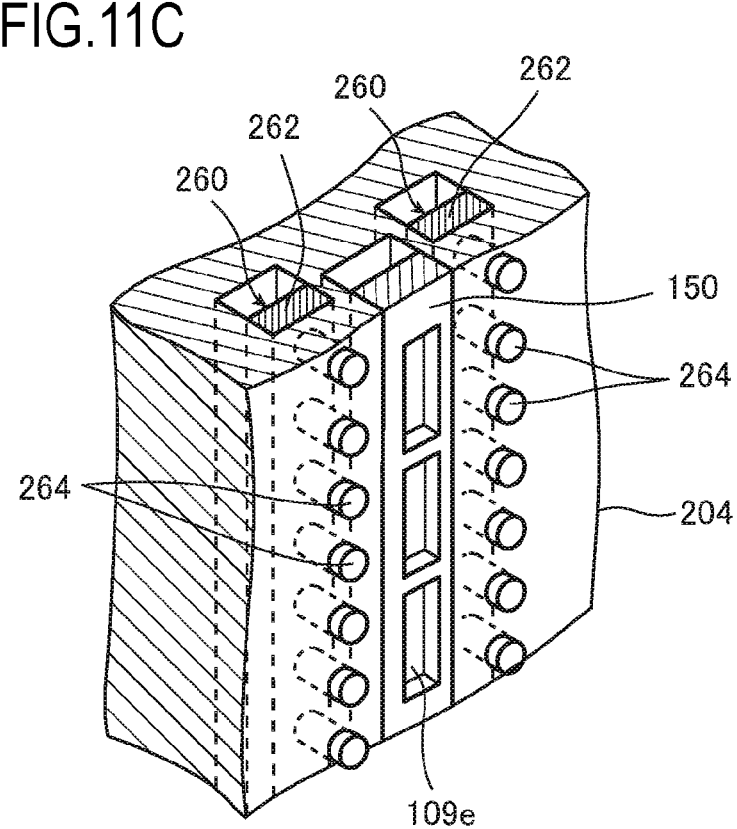
FIG. 11C is a schematic perspective view illustrating another example of the non-design-surface-side mold according to the third embodiment.
Figure 12:
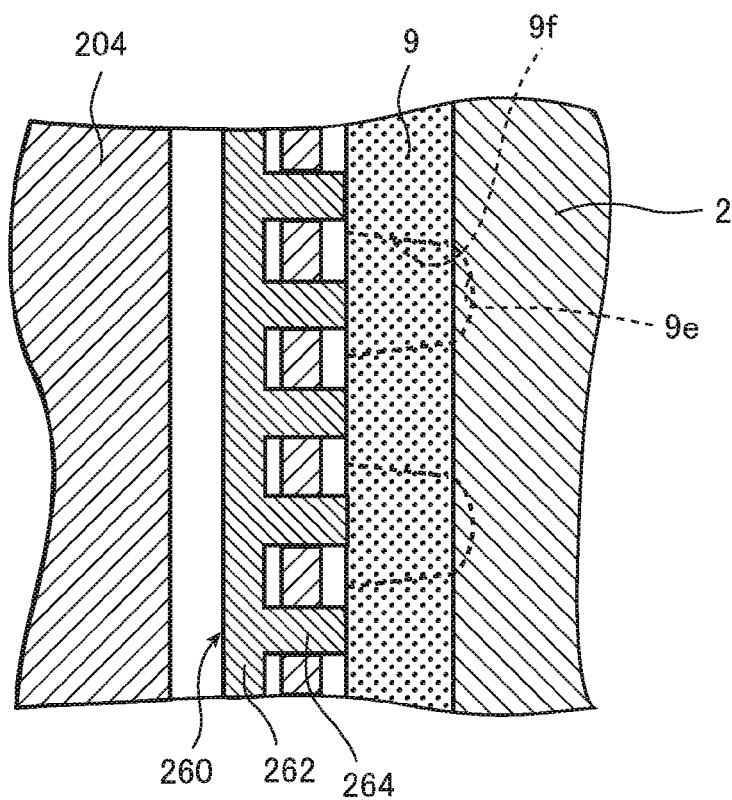
FIG. 12 is a schematic cross-sectional view illustrating a first molded component pressing step in a manufacturing method according to the third embodiment which is performed using the mold for injection molding according to the third embodiment.

Next, an injection molding machine according to a third embodiment will be described with reference to FIGS. 11A to 11C and 12. FIG. 11A is a partially-omitted schematic configuration diagram of a mold cavity surface (inner surface) of a mold (movable mold in the third embodiment) to be arranged on a non-design surface side which is seen from a side of a mold (fixed mold in the third embodiment) to be arranged on a design surface side. FIG. 11B is a partially-omitted schematic configuration diagram illustrating the movable mold which employs a movable portion having the same configuration as the movable portion 40 of the movable mold 4 according to the first embodiment. FIG. 11C is a partially-omitted schematic configuration diagram illustrating the movable mold which employs a second movable portion having the same configuration as the second movable portion 150 of the movable mold 104 according to the second embodiment. FIG. 12 is a partially-omitted schematic configuration diagram illustrating a state in which a first molded component is pressed by a pressing portion.

A difference of the injection molding machine according to the third embodiment from the injection molding machines according to the first and second embodiments is that the pressing portion, configured to press the first molded component at the time of molding a second molded component, in a non-design-surface-side mold (the movable molds 4 and 104 in the first and second embodiments). It is possible to employ the same configuration in the injection molding machine according to the first or second embodiment for the other configuration, and thus, the same reference sign will be used and the detailed description thereof will be omitted.

Similarly to the injection molding machines according to the first and second embodiments, the injection molding machine according to the third embodiment is provided with a mold for injection molding including a fixed platen (not illustrated), a movable platen (not illustrated), the fixed mold 2 or 102 attached to the fixed platen and a movable mold 204 attached to the movable platen, the first injection unit 17, the second injection unit 18, and a mold clamping mechanism (not illustrated).

The movable mold 204 is a non-design-surface-side mold which is configured to form a non-design surface of a resin molded product 220 or 220', which is similar to the movable molds 4 and 104 according to the first and second embodiments. The movable mold 204 includes either the movable portion 40 having the same configuration as the movable portion 40 of the movable mold 4 according to the first embodiment as illustrated in FIG. 11A, or the second movable portion 150 having the same configuration as the second movable portion 150 of the movable mold 104 according to the second embodiment as illustrated in FIG. 11B. Incidentally, when the movable mold 204 includes the movable portion 40, a mold having the same configuration as the fixed mold 2 according to the first embodiment is used as the fixed mold. In addition, when the movable mold 204 includes the second movable portion 150, a mold having the same configuration as the fixed mold 102 according to the second embodiment is used as the fixed mold.

The movable mold 204 according to the third embodiment further includes a pressing portion 260, which is configured to press the first molded component 9 or 109 at the time of molding the second molded component 10 or 110, which is different from the movable molds 4 and 104 according to the first and second embodiments. To be specific, the movable mold 204 includes an internal space that can house the pressing portion 260 in addition to the housing portion of the movable portion 40 or the second movable portion 150 as illustrated in FIGS. 11B, 11C and 12, and the pressing portion 260 is housed inside the internal space. A through-hole is formed in a mold cavity surface of the movable mold 204 to allow a pressing pin 264 of the pressing portion 260 housed inside the internal space to protrude toward the fixed molds 2 and 102 and be inserted therein.

As illustrated in FIG. 11A, the pressing portion 260 is arranged in the vicinity of the movable portion 40 or the second movable portion 150. In the example illustrated in FIG. 11A, the pressing portions 260 are provided on the right and left as a pair so as to sandwich the movable portion 40 or the second movable portion 150. Incidentally, the number of the pressing portions 260 and arrangement thereof can be arbitrarily set as long as it is possible to press the first molded component 9 or 109 at the time of molding the second molded component 10 or 110.

As illustrated in FIGS. 11B, 11C and 12, each of the pressing portions 260 includes a movable plate portion 262, which is housed inside the internal space of the movable mold 204 to be movable in a mold opening and closing direction and a plurality of the pressing pins 264 which are provided to protrude from the movable plate portion 262 toward the fixed molds 2 and 102.

The movable plate portion 262 is configured to be movable in the mold opening and closing direction by arbitrary driving means (not illustrated). This driving means may be configured such that the movable plate portion 262 itself serves as a pressure ram inside a mold or may be an actuator such as a cylinder, and a driving source thereof may be appropriately selected among hydraulic pressure, pneumatic pressure, electricity and the like as long as it is possible to secure a desired driving force.

As illustrated in FIG. 12, each of the pressing pins 264 has a shape and a length in a protruding direction to be capable of protruding from the through-hole of the movable mold 204 when the movable plate portion 262 is moved in a direction (mold closing direction) of moving closer to the fixed molds 2 and 102 (the fixed mold 2 in the example illustrated in FIG. 12), and pressing the first molded component 9 or 109 (the first molded component 9 in the example illustrated in FIG. 12), each of which is held between each of the fixed molds 2 and 102, and the movable mold 204, to the fixed molds 2 and 102. The number of the pressing pins 264 and positions thereof can be arbitrarily set depending on the desired number of stitch-shaped designs 10e or 110e and desired positions thereof. For example, the plurality of pressing pins 264 may be arranged so as to press the vicinity of each end portion of the through-hole portion 9f or 109f of the first molded component 9 or 109 and the vicinity of each central portion thereof.

Manufacturing Method According to Third Embodiment

Next, a description will be given regarding a manufacturing method according to the third embodiment which is performed using the injection molding machine according to the third embodiment with reference to FIG. 12. A difference of the manufacturing method according to the third embodiment from the manufacturing method according to the first or second embodiment is to execute a step of pressing the first molded component 9 or 109 to the fixed molds 2 and 102 using the pressing portion 260 at the time of molding the second molded component 10 or 110. It is possible to employ the same method in the manufacturing method according to the first or second embodiment as a method of molding the first molded component 9 or 109 and the second molded component 10 or 110 in the manufacturing method according to the third embodiment, and thus, the detailed description thereof will be omitted.

In the manufacturing method according to the third embodiment, first, the first molded component 9 or 109 is molded in the first mold cavity 9a or 109a using the same method in the manufacturing method according to the first or second embodiment (a first molding step). Next, the mold cavity expansion portion 10a or 110a is formed using the same method in the manufacturing method according to the first or second embodiment (a second molding preparation step).

In the manufacturing method according to the third embodiment, the first molded component pressing step is executed before this second molding preparation step or in parallel with the second molding preparation step, which is different from the manufacturing methods according to the first and second embodiments. To be specific, the pressing portion 260 is moved in a direction (mold closing direction) of moving closer to the fixed mold 2 or 102 using the driving means (not illustrated), and the first molded component 9 or 109 is pressed toward the fixed mold 2 or 102 using the pressing pin 264 of the pressing portion 260 as illustrated in FIG. 12 (a first molded component pressing step). This first molded component pressing step is continuously executed until the second molding step is completed.

In this state, the second resin 10*b* or 110*b* is injection-filled into the mold cavity expansion portion 10*a* or 110*a* from the second injection unit 18, and the second molded component 10 or 110 is molded through the same step in the manufacturing method according to the first or second embodiment (a second molding step). Accordingly, the resin molded product 220 or 220' formed of the first molded component 9 or 109 and the second molded component 10 or 110 is molded.

Figure 13A:
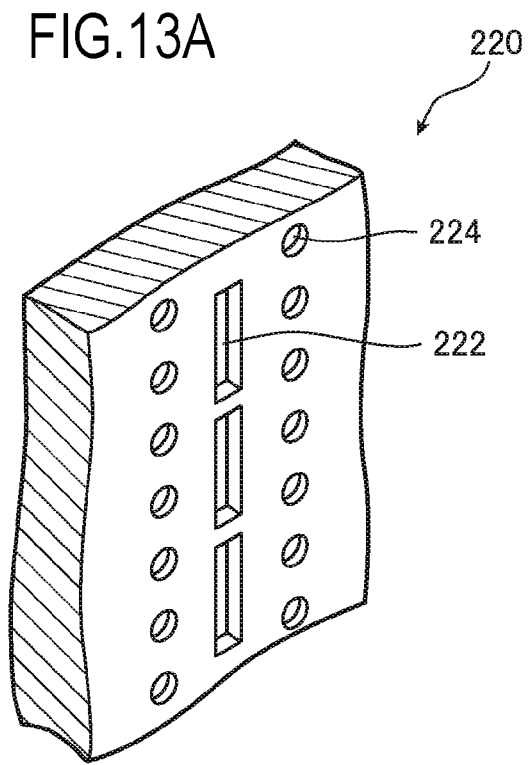
FIG. 13A is a schematic perspective view illustrating an example of a non-design-surface-side configuration of a resin molded product which is manufactured using the manufacturing method according to the third embodiment.
Figure 13B:
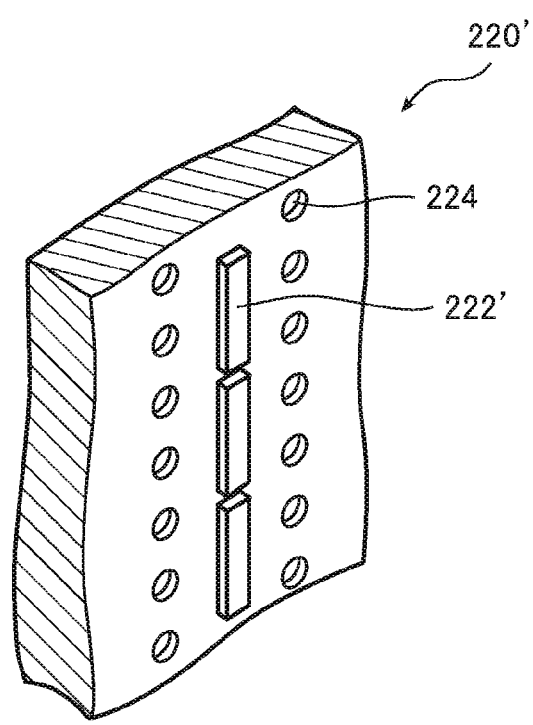
FIG. 13B is a schematic perspective view illustrating another example of the non-design-surface-side configuration of the resin molded product which is manufactured using the manufacturing method according to the third embodiment.

The resin molded product 220 or 220' includes an artificial stitch pattern (seam) formed on the front surface (design surface) similarly to the resin molded products 20, 20', 120 and 120' which are molded using the manufacturing methods according to the first and second embodiments. In addition, a trace 222 of the convex portion 41 of the movable portion 40 and a pressing trace 224 of the pressing pin 264 of the pressing portion 260 remain on a rear surface (non-design surface) of the resin molded product 220 molded using the movable mold 204 of FIG. 11B as illustrated in FIG. 13A. Meanwhile, a trace 222' of the concave portion 109*e* of the second movable portion 150 and the pressing trace 224 of the pressing pin 264 of the pressing portion 260 remain on a rear surface (non-design surface) of the resin molded product 220' molded using the movable mold 204 of FIG. 11C as illustrated in FIG. 13B. These pressing traces 224 are concave portions reaching a rear surface (surface on the non-design surface side) of the first molded component 9 or 109 from the non-design surface.

Thereafter, the resin molded product 220 or 220' is taken outside the injection molding machine by a product take-out means (not illustrated), and the molding cycle is ended. According to the manufacturing method according to the third embodiment, it is possible to successively manufacture the resin molded products 220 and 220' by repeating the above-described steps, which is similar to the manufacturing methods according to the first and second embodiments.

As described above, the resin molded product 220 or 220' is manufactured by molding the first molded component 9 or 109, which forms the design surface of the resin molded product 220 or 220' first, and thereafter, molding the second molded component 10 or 110 to be layered on the non-design surface side of the first molded component 9 or 109 such that the stitch-shaped design 10*e* or 110*e* is exposed to the design surface side via the through-hole portion 9*f* or 109*f* of the first molded component 9 or 109 (that is, can be visibly recognized from the design surface side) in the manufacturing method according to the third embodiment, which is similar to the manufacturing methods according to the first and second embodiments. Thus, it is possible to accurately manufacture the resin molded product including the artificial stitch pattern formed on the design surface thereof according to the manufacturing method according to the third embodiment due to the same reason in the above-described manufacturing method according to the first and second embodiments.

In addition, it is possible to press the first molded component 9 or 109 toward the fixed mold 2 or 102 using the pressing pin 264 of the pressing portion 260 during execution of the second molding step in the manufacturing method according to the third embodiment because the resin molded product 220 or 220' is manufactured in the above-described order. Further, it is possible to sufficiently secure adhesion between the first molded component 9 or 109 and the fixed mold 2 or 102 by pressing the first molded component 9 or 109 toward the fixed mold 2 or 102 in this manner, and thus, it is possible to more reliably prevent the second resin 10*b* or 110*b*, injection-filled into the mold cavity expansion portion 10*a* or 110*a* from flowing between the first molded component 9 or 109 and the fixed mold 2 or 102 through the through-hole portion 9*f* or 109*f* by the resin pressure thereof, and it is possible to prevent a burr from generating around the stitch-shaped design 10*e* or 110*e*. On the contrary, a first member having the cord seam portion is molded first, thereafter, a second member forming a design surface of a resin molded product is molded in a state in which a protruding end portion of the cord seam portion of the first member abuts on a molding surface of a secondary mold portion in the method of manufacturing the resin molded product disclosed in Patent Literature 1. There is a risk that the cord seam portion of the first member is damaged in the above-described method of manufacturing the resin molded product disclosed in Patent Literature 1, and thus, it is difficult to press the first member toward the molding surface of the secondary mold portion at the time of molding the second member. Thus, the method of manufacturing the resin molded product disclosed in Patent Literature 1 has a risk that a resin for the second member enters between the protruding end portion of the cord seam portion of the first member and the molding surface of the secondary mold portion at the time of molding the second member, thereby hindering exposure of the cord seam portion or generating a burr.

Alternative Example of Injection Molding Machine According to Third Embodiment

Figure 14:
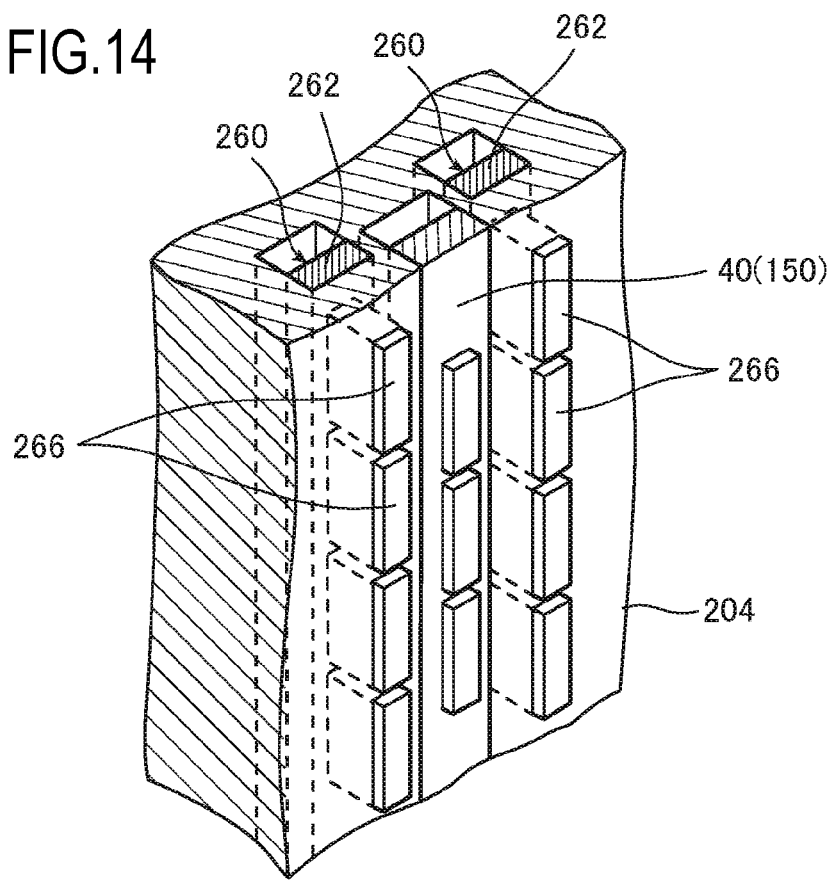
FIG. 14 is a schematic cross-sectional view illustrating an alternative example of the mold for injection molding according to the third embodiment.

Although the injection molding machine according to the third embodiment has been described as above, various types of modification or reformation can be added to the injection molding machine according to the third embodiment. Although the description has been given with the injection molding machine according to the third embodiment in which the pressing portion 260 includes the movable plate portion 262 and the plurality of pressing pins 264, for example, the invention may have any configuration without being limited thereto as long as it is possible to press the first molded component 9 or 109 at the time of molding the second molded component 10 or 110. For example, the pressing pin 264 of the pressing portion 260 may be a pressing block 266 which has a similar or larger size than the through-hole portion 9*f* or 109*f* of the first molded component 9 or 109 as illustrated in an example of FIG. 14 instead of the pin shape with a small diameter as illustrated in FIGS. 11A to 11C and 12. In this case, the pressing block 266 is preferably arranged so as to press the vicinity of each end portion of the through-hole portion 9*f* or 109*f* of the first molded component 9 or 109 and the vicinity of each central portion thereof.

In addition, FIGS. 11A to 11C and 14 illustrate the form in which the pressing portions 260 are provided on the right and left as a pair so as to sandwich the movable portion 40 or the second movable portion 150, but the arrangement of the pressing portion 260 is not limited to the example illustrated in the drawings. For example, the number of the pressing portions 260 provided in the vicinity of the movable portion 40 or the second movable portion 150 may be only one or three or more.

Injection Molding Machine According to Fourth Embodiment

Figure 15A:
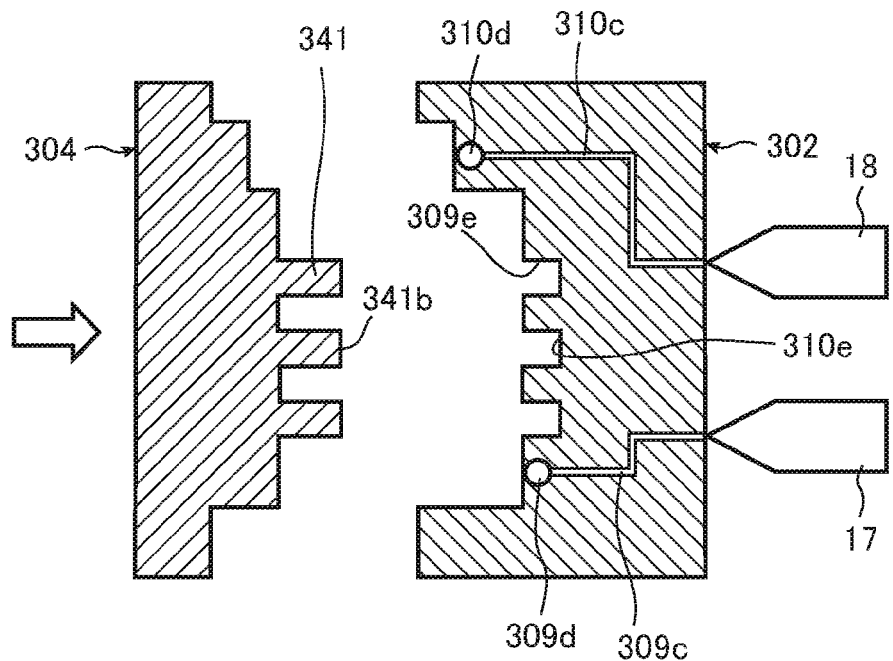
FIG. 15A is a schematic cross-sectional view illustrating each mold opening state of a common mold and a first mold according to a fourth embodiment.
Figure 15B:
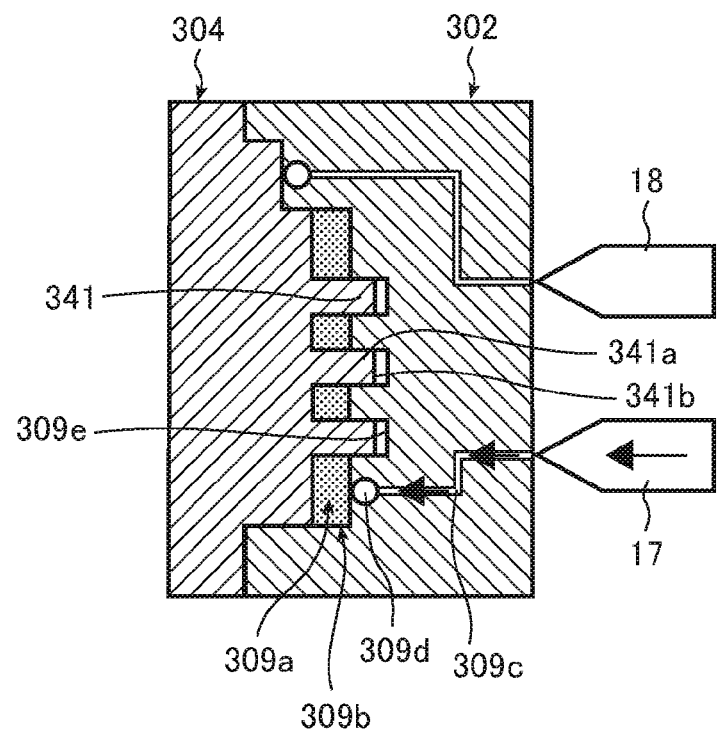
FIG. 15B is a schematic cross-sectional view illustrating a primary injection-filling step in a manufacturing method according to the fourth embodiment which is performed using a mold for injection molding according to the fourth embodiment.
Figure 15C:
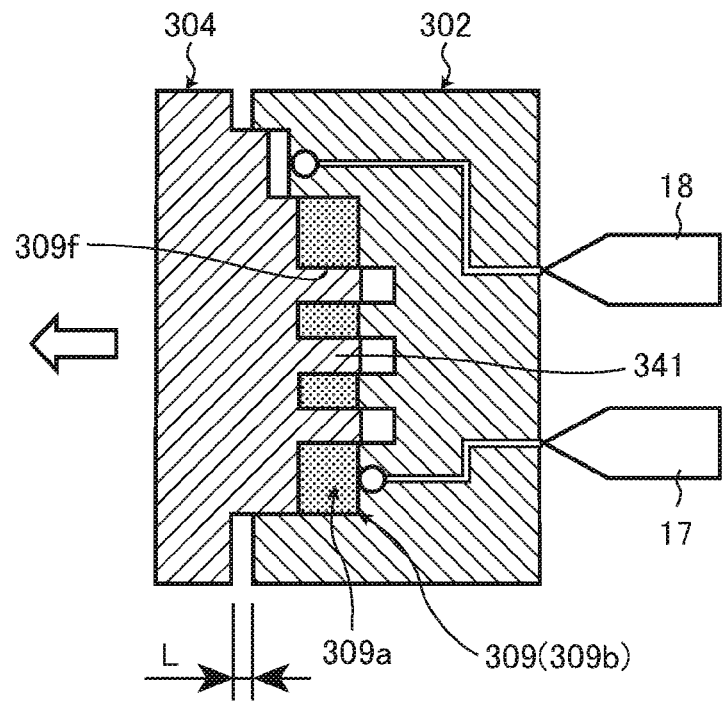
FIG. 15C is a schematic cross-sectional view illustrating a slight mold opening step in the manufacturing method according to the fourth embodiment which is performed using the mold for injection molding according to the fourth embodiment.
Figure 15D:
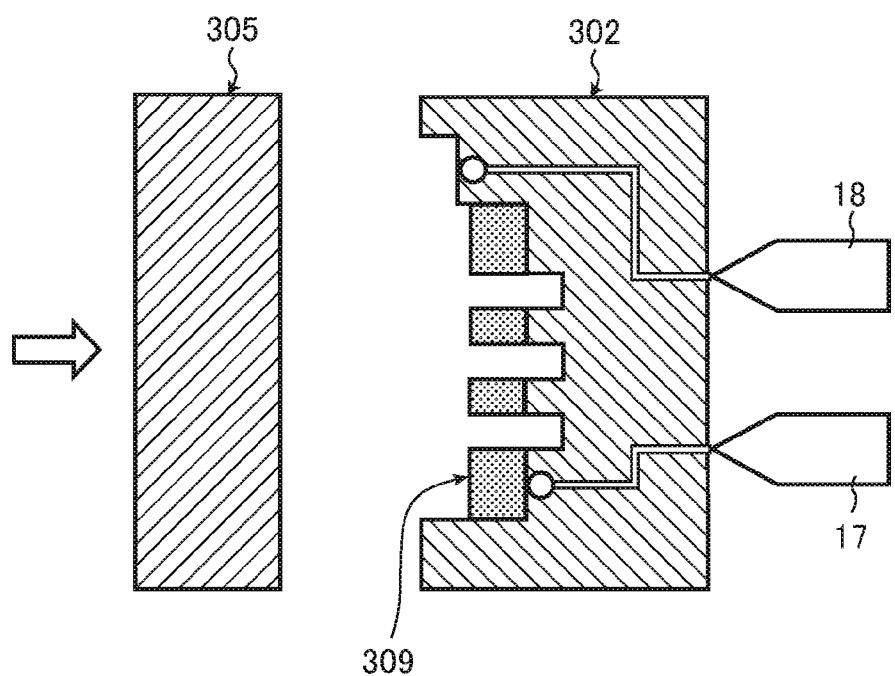
FIG. 15D is a schematic cross-sectional view illustrating a state in which a mold opposing the common mold is switched from the first mold to a second mold in the manufacturing method according to the fourth embodiment which is performed using the mold for injection molding according to the fourth embodiment.
Figure 15E:
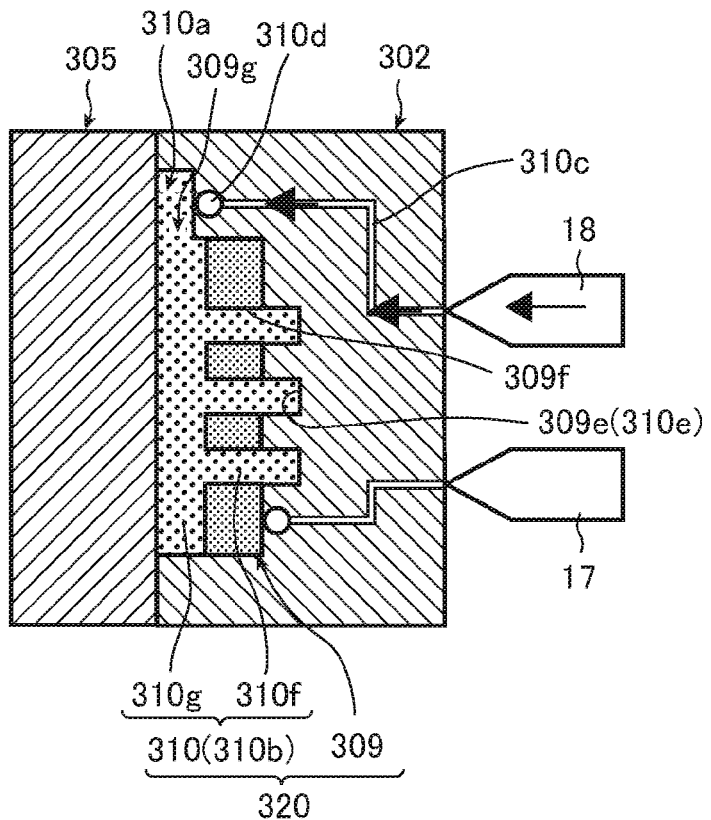
FIG. 15E is a schematic cross-sectional view illustrating a second molding step in the manufacturing method according to the fourth embodiment which is performed using the mold for injection molding according to the fourth embodiment.

Next, an injection molding machine according to a fourth embodiment will be described with reference to FIGS. 15A to 15E. FIG. 15A is a schematic cross-sectional view illustrating a state in which a first mold 304 is arranged to oppose a common mold 302. FIG. 15B is a schematic cross-sectional view illustrating a state in which a primary injection-filling step is performed in a first mold cavity 309a which is formed as the common mold 302 and the first mold 304 are mold-closed. FIG. 15C is a schematic cross-sectional view illustrating a state in which the common mold 302 and the first mold 304 are slightly mold-opened. FIG. 15D is a schematic cross-sectional view illustrating a state in which a second mold 305 is arranged to oppose a common mold 302. FIG. 15E is a schematic cross-sectional view illustrating a state in which a second molding step is performed in a mold cavity expansion portion 310a which is formed as the common mold 302 and the second mold 305 are mold-closed.

A difference of the injection molding machine according to the fourth embodiment from the injection molding machines according to the first to third embodiments is that the mold cavity expansion portion 310a is formed by replacing one mold with another mold instead of moving one or a plurality of movable portions inside a mold.

Incidentally, the first mold cavity 309a is a space which is formed between an inner surface of the common mold 302 and an inner surface of the first mold 304 as the common mold 302 and the first mold 304 are mold-clamped as illustrated in FIG. 15B in the description of the fourth embodiment. Similarly to the first to third embodiments, the first mold cavity 309a includes a design surface imitating a leather surface on a front surface thereof, and a first molded component 309 is molded with a plurality of through-hole portions 309f formed to penetrate from the front surface to a rear surface.

Incidentally, the mold cavity expansion portion (second mold cavity) 310a is a space which is newly formed by replacing the first mold 304 with the second mold 305, which can form a mold cavity having a larger volume than the first mold 304 after molding of the first molded component 309 as illustrated in FIG. 15E in the description of the fourth embodiment. To be specific, the mold cavity expansion portion 310a is configured of spaces inside a plurality of concave portions 309e formed in the common mold 302, spaces inside a plurality of through-hole portions 309f formed in the first molded component 309, and a non-design-surface-side space 309g which is formed between the rear surface (surface on the non-design surface side) of the first molded component 309 and an inner surface of the second mold 305. As illustrated in FIG. 15E, for example, a second molded component 310, which is formed of a non-design-surface portion 310g layered on the rear surface (surface on the non-design surface side) of the first molded component 309 and a stitch portion 310f which is exposed to the front surface (design surface) of the first molded component 309 from the non-design-surface portion 310g via the through-hole portion 309f of the first molded component 309, is molded in the mold cavity expansion portion 310a.

Similarly to the injection molding machines according to the first to third embodiments, the injection molding machine according to the fourth embodiment is provided with a fixed platen (not illustrated), a movable platen (not illustrated), a mold for injection molding which is provided between the fixed platen and the movable platen, the first injection unit 17, the second injection unit 18, and a mold clamping mechanism (not illustrated). In addition, the injection molding machine according to the fourth embodiment is further provided with mold replacing means (not illustrated) which switches a mold opposing the common mold 302. Incidentally, it is possible to employ the same one of the fixed platen, the movable platen, the first injection unit 17, the second injection unit 18, and the mold clamping mechanism of the injection molding machines according to the first to third embodiments as each one of the fixed platen, the movable platen, the first injection unit 17, the second injection unit 18, and the mold clamping mechanism of the injection molding machine according to the fourth embodiment, and thus, the same reference signs will be used and the description thereof will be omitted.

The mold for injection molding according to the fourth embodiment is provided with the common mold (fixed mold) 302 attached to the fixed platen and the first mold (first movable mold) 304 and the second mold (second movable mold) 305 which are attached to the mold replacing means as illustrated in FIGS. 15A and 15D.

The common mold 302 is a design-surface-side mold which is configured to form the design surface of a resin molded product 320 (first molded component 309). A mold cavity surface of the common mold 302 is decorated with the design surface imitating the leather surface and the plurality of concave portions 309e decorated with a stitch-shaped design 310e imitating a seam is formed at certain positions of the design surface, which is similar to the fixed mold 2 according to the first embodiment. The number of the concave portions 309e and positions thereof can be arbitrarily set depending on the desired number of the stitch-shaped design 310e and desired positions thereof. In addition, a back surface (surface on the opposite side of the mold cavity surface) of the common mold 302 is fixed to the fixed platen by various types of fixing means. The common mold 302 includes a first resin flow passage 309c and a second resin flow passage 310c formed as a hot runner, a first gate valve 309d, and a second gate valve 310d, which is similar to the fixed mold 2 according to the first embodiment.

The first mold 304 is a non-design-surface-side mold which is configured to form a surface of the first molded component 309 on a non-design surface side. The first mold 304 is configured such that the first mold cavity 309a, configured to mold the first molded component 309, is formed when being paired with the common mold 302 as illustrated in FIG. 15B. A plurality of convex portions 341 protruding toward the common mold 302 are provided on a mold cavity surface of the first mold 304. In addition, a back surface (surface on the opposite side of the mold cavity surface) of the first mold 304 is fixed to the mold replacing means by various types of fixing means.

Similarly to the convex portion 41 of the movable portion 40 of the movable mold 4 according to the first embodiment, the plurality of convex portions 341 are provided to be equal to the number of the concave portions 309e of the common mold 302, and are arranged at positions to be aligned with the concave portions 309e of the common mold 302 such that the single convex portion 341 is associated with the single concave portion 309e.

As illustrated in FIG. 15B, each of the convex portions 341 has a shape and a length in a protruding direction such that each distal end portion 341a of the convex portions 341 is housed inside each of the concave portions 309e of the common mold 302 in a state in which the common mold 302 and the first mold 304 are mold-clamped. Similarly to the mold 1 for injection molding according to the first embodiment, it is also preferable that each of the convex portions 341 have the length in the protruding direction so as to prevent the distal end surface 341b from abutting on a concave surface of the opposing concave portion 309e, and a clearance of about 5/100 mm (that is, 0.05 mm) be provided between an opening portion of the concave portion 309e and the distal end portion 341a in the mold for injection molding according to the fourth embodiment.

The common mold 302 and the first mold 304 are configured such that each division surface of each mold (also referred to as a mold division surface, a parting surface, and a cut surface) has a share edge structure, and it is possible to vary the volume of the first mold cavity 309a through mold opening and closing operations using a mold opening and closing mechanism (the mold clamping mechanism in the present embodiment) of the injection molding machine.

Here, the share edge structure is also referred to as a clipper structure, a spigot structure or the like, and is a structure that is generally known as a structure of a fitting portion to form the division surface of the mold. To be specific, the share edge structure is a structure that is capable of preventing a molten resin injection-filled into the first mold cavity 309a from leaking to the outside of the mold even when the mold is mold-opened by a certain amount by forming the fitting portion, capable of expanding in the mold opening and closing direction and being inserted and removed while sliding each other, between the common mold 302 and the first mold 304 as illustrated in FIGS. 15B and 15C. Incidentally, it is possible to prevent the molten resin injection-filled into the mold cavity from leaking to the outside of the mold even when the mold is mold-opened to a certain amount even in the case of a mold having a general abutting-type mold division surface instead of the mold having the share edge structure. However, the present embodiment is described assuming the mold having the share edge structure in order to simplify the description.

The second mold 305 is a non-design-surface-side mold which is configured to form a non-design surface of the second molded component 310. The second mold 305 is configured such that the mold cavity expansion portion 310a, configured to mold the second molded component 310, is formed when being paired with the common mold 302 holding the first molded component 309 as illustrated in FIG. 15E. A back surface (surface on the opposite side of the mold cavity surface) of the second mold 305 is fixed to the mold replacing means by various types of fixing means.

The mold replacing means is configured to be capable of switching the mold opposing the common mold 302 from any one of the first mold 304 and the second mold 305 to the other. It is possible to employ various known configurations as the mold replacing means, and for example, it is possible to arbitrarily employ any one among mold slide type mold replacing means, rotary rotation type mold replacing means, and horizontal rotation type mold replacing means.

The mold slide type mold replacing means is a plate member which includes a mold mounting surface opposing the common mold 302 and in which the first mold 304 and the second mold 305 are attached onto the mold mounting surface at a certain interval in a direction orthogonal to the mold opening and closing direction. This mold slide type mold replacing means is attached to the movable platen so as to be movable in the direction orthogonal to the mold opening and closing direction between a first slide position at which the first mold 304 opposes the common mold 302 and a second slide position at which the second mold 305 opposes the common mold 302. According to the mold slide type mold replacing means having the above-described configuration, it is possible to switch the mold opposing the common mold 302 from any one of the first mold 304 and the second mold 305 to the other through movement (slide) in the direction orthogonal to the mold opening and closing direction with respect to the movable platen.

The rotary rotation type mold replacing means is a rotary table member which includes a mold mounting surface opposing the common mold 302, and the first mold 304 and the second mold 305 are attached onto the mold mounting surface at a certain interval in the direction orthogonal to the mold opening and closing direction. This rotary rotation type mold replacing means is attached to the movable platen via a rotation shaft, which is parallel with the mold opening and closing direction so as to be capable of being angularly displaced between a first rotation position at which the first mold 304 opposes the common mold 302 and a second rotation position at which the second mold 305 opposes the common mold 302. According to the rotary rotation type mold replacing means having the above-described configuration, it is possible to switch the mold opposing the common mold 302 from any one of the first mold 304 and the second mold 305 to the other through rotation about the rotation shaft which is parallel with the mold opening and closing direction.

The horizontal rotation type mold replacing means is a rotary platen or a rotary table which is provided between the fixed platen and the movable platen. The rotary platen is a plate member or a prismatic member which includes a first mold mounting surface to which the first mold 304 is attached and a second mold mounting surface to which the second mold 305 is attached. The rotary table is a rotary table member to which the first mold 304 and the second mold 305 can be placed so as to allow the mold cavity surface of the first mold 304 and a mold cavity surface of the second mold 305 face different directions. The rotary platen or the rotary table is configured to rotate about a rotation shaft which is orthogonal to the mold opening and closing direction by various driving mechanisms so as to enable switching of the mold opposing the common mold 302 from any one of the first mold 304 and the second mold 305 to the other.

Incidentally, examples of the mold slide type mold replacing means, the rotary rotation type mold replacing means, and the horizontal rotation type mold replacing means are described in WO 2014/103655, for example. The content described in WO 2014/103655 is incorporated in the present specification as a reference.

The mold for injection molding according to the fourth embodiment is configured such that a mold closing operation, a mold clamping operation, a slight mold opening operation and a mold opening operation between the common mold 302 and the first mold 304 and the mold closing operation, the mold clamping operation, and the mold opening operation between the common mold 302 and the second mold 305 are executed by moving the movable platen in the mold opening and closing direction using the mold clamping mechanism (not illustrated). This mold clamping mechanism is preferably a toggle-type mold clamping mechanism which can execute the mold opening and closing operations and the mold clamping operation. In addition, this toggle-type mold clamping mechanism is more preferably an electric toggle-type mold clamping mechanism employing a linear motion actuator obtained by combining a driving source with a rotation and linear motion converting means such as a servomotor and a ball screw mechanism. It is possible to execute the highly accurate mold opening and closing operations according to such an electric toggle-type mold clamping mechanism.

In addition, the mold for injection molding according to the fourth embodiment is configured such that the first mold cavity 309a is expanded to form the mold cavity expansion portion 310a by replacing the first mold 304 with the second mold 305, which is capable of forming the mold cavity having the larger volume than the first mold 304, after molding of the first molded component 309. That is, the mold for injection molding according to the fourth embodiment is configured to be capable of switching a first mold closing state in which the convex portion 341 of the first mold 304 is present over the common mold 302 from the first mold 304 and a second mold closing state in which the convex portion 341 of the first mold 304 is not present over the common mold 302 from the first mold 304 by switching the mold to be paired with the common mold 302 from the first mold 304 to the second mold 305. Further, the mold for injection molding according to the fourth embodiment is configured such that the first mold cavity 309a, which can mold the first molded component 309 including a design surface and the through-hole portion 309f penetrating from the design surface to a surface on a non-design surface side, is formed between the common mold 302 and the first mold 304 in the first mold closing state. In addition, the mold for injection molding according to the fourth embodiment is configured such that the mold cavity expansion portion 310a, which can mold the second molded component 310 including the non-design-surface portion 310g layered on the non-design surface side of the first molded component 309 and the stitch portion 310f that can be exposed to the first molded component 309 on the design surface side via the through-hole portion 309f of the first molded component 309 from the non-design-surface portion 310g, is formed between the common mold 302 and the second mold 305 in the second mold closing state.

Manufacturing Method According to Fourth Embodiment

Next, a description will be given regarding a manufacturing method according to the fourth embodiment which is performed using the injection molding machine according to the fourth embodiment with reference to FIGS. 15A to 15E. The manufacturing method according to the fourth embodiment is schematically a method of molding the first molded component 309 using a foamable resin, then forming the mold cavity expansion portion 310a by switching the mold to be paired with the common mold 302 from the first mold 304 to the second mold 305, and molding the second molded component 310 using a typical non-foamable resin in the mold cavity expansion portion 310a. Hereinafter, the manufacturing method according to the fourth embodiment will be described in detail.

In the manufacturing method according to the fourth embodiment, first, the movable platen is moved to the fixed platen side by the mold clamping mechanism (not illustrated) as illustrated in FIG. 15B from the mold opening state of FIG. 15A so that the common mold 302 and the first mold 304 are mold-closed, and thereafter, a certain mold clamping force is applied (a mold clamping step). Accordingly, the first mold cavity 309a is formed between the common mold 302 and the first mold 304.

Next, the first resin 309b is injection-filled into the first mold cavity 309a from the first injection unit 17 via the first resin flow passage 309c as illustrated in FIG. 15B, which is similar to the manufacturing methods according to the first to third embodiments (a primary injection-filling step). Here, the first resin 309b is a foamable resin containing a chemical foaming agent. Incidentally, the first resin 309b may be a foamable resin containing a physical foaming agent. In this case, however, the mold for injection molding or the injection molding machine needs to have a configuration for mixing the physical foaming agent into the first resin 309b. It is possible to employ known configurations as such a configuration for mixing of the physical foaming agent, and thus, the description thereof will be omitted.

After the injection-filling of the first resin 309b into the first mold cavity 309a is initiated, the first mold 304 is mold-opened at a certain timing by a slight distance L from the common mold 302 using the mold clamping mechanism (not illustrated) as illustrated in FIG. 15C from the mold clamping state illustrated in FIG. 15B (a slight mold opening step). Through this slight mold opening step, it is possible to expand the volume of the first mold cavity 309a and foam the first resin 309b.

Further, the first resin 309b foaming through the slight mold opening step is cooled and solidified, and accordingly, the first molded component 309, which is a foaming molded body including a foam layer in a surface layer (skin layer) is molded inside the first mold cavity 309a (a first molding step). The first molded component 309 includes the design surface formed on the front surface thereof using the inner surface of the common mold 302. In addition, the plurality of through-hole portions 309f, which penetrate from the front surface (design surface) to the rear surface (surface on the non-design surface side), are formed in the first molded component 309 using the convex portion 341 of the first mold 304.

After the molding of the first molded component 309, the mold opposing the common mold 302 is switched from the first mold 304 to the second mold 305 by the mold clamping mechanism (not illustrated) and the mold replacing means as illustrated in FIG. 15D from the state of FIG. 15C. Incidentally, this mold switching step is performed in a state in which the first molded component 309 is held on the common mold 302.

Thereafter, the movable platen is moved to the fixed platen side by the mold clamping mechanism (not illustrated) as illustrated in FIG. 15E from the mold opening state of FIG. 15D so that the common mold 302 and the second mold 305 are mold-closed, and thereafter, a certain mold clamping force is applied. Accordingly, the mold cavity expansion portion 310a, which is configured of spaces formed by the plurality of concave portions 309e of the common mold 302, spaces formed by the plurality of through-hole portions 309f of the first molded component 309, and the non-design-surface-side space 309g formed between the rear surface (surface on the non-design surface side) of the first molded component 309 and the inner surface of the second mold 305, is formed (a second molding preparation step).

Further, in this state, a second resin 310b is injection-filled into the mold cavity expansion portion 310a from the second injection unit 18 as illustrated in FIG. 15E according to the same step of the manufacturing methods according to the first to third embodiments (a secondary injection-filling step). Accordingly, the second molded component 310 layered on the non-design surface side of the first molded component 309 is molded (a second molding step). The second molded component 310 is configured of the non-design-surface portion 310g, which is layered on the rear surface (surface on the non-design surface side) of the first molded component 309, and the stitch portion 310f which is exposed to the first molded component 309 on the front surface (design surface) side via the through-hole portion 309f of the first molded component 309 from the non-design-surface portion 310g, which is similar to the second molded components 10 and 110 molded using the manufacturing methods according to the first to third embodiments. The stitch-shaped design 310e decorated on the concave portion 309e of the common mold 302 is transferred to a distal end portion of the stitch portion 310f.

Further, the movable platen is moved in the direction of being moved away from the fixed platen by the mold clamping mechanism (not illustrated) after the second molded component 310 is completely cooled and solidified, and accordingly, the common mold 302 and the second mold 305 are mold-opened. Thereafter, the resin molded product 320 formed of the first molded component 309 and the second molded component 310 is taken outside the injection molding machine by product take-out means (not illustrated), and the molding cycle is ended.

According to the manufacturing method according to the fourth embodiment, it is possible to successively manufacture the resin molded product 320 including an artificial stitch pattern (seam) formed on the front surface (design surface) thereof by repeating the above-described steps.

Incidentally, the second molded component 310 may be configured such that the non-design-surface portion 310g is layered entirely on the rear surface (surface on the non-design surface side) of the first molded component 309 (see FIG. 2A) or may be configured such that the non-design-surface portion 310g is layered partially on the rear surface (surface on the non-design surface side) of the first molded component 309 (see FIG. 2B), which is similar to the manufacturing methods according to the first to third embodiments.

Figure 16A:
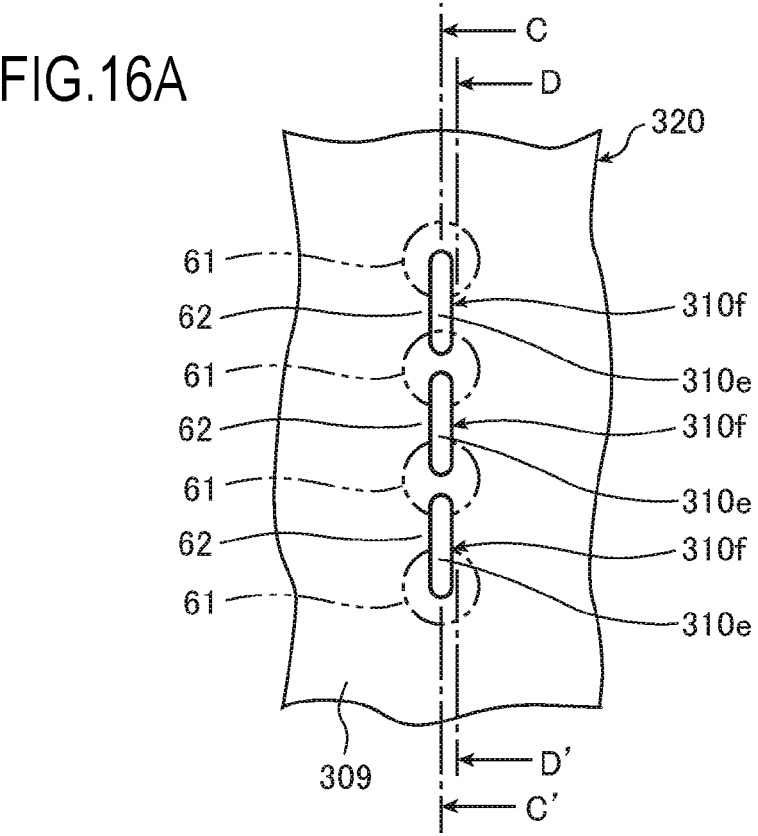
FIG. 16A is a schematic plan view illustrating an example of each shape of a stitch-shaped design and a design surface in the vicinity thereof.
Figure 16B:
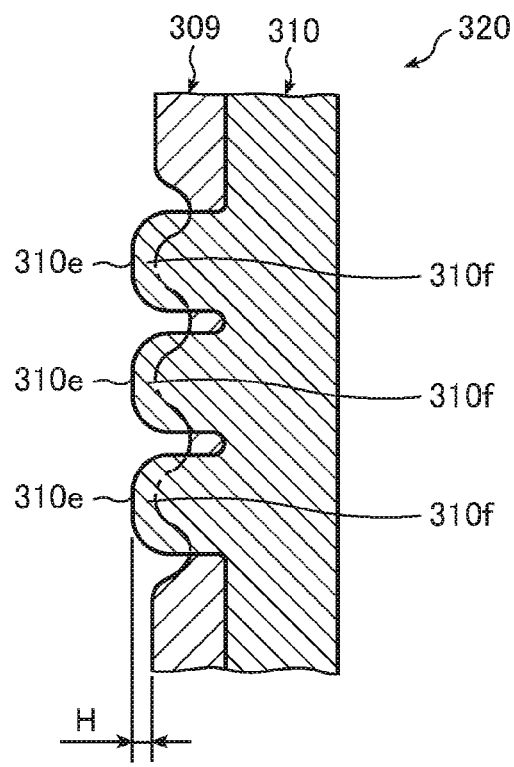
FIG. 16B is a schematic cross-sectional view taken along a line C-C' of FIG. 16A.
Figure 16C:
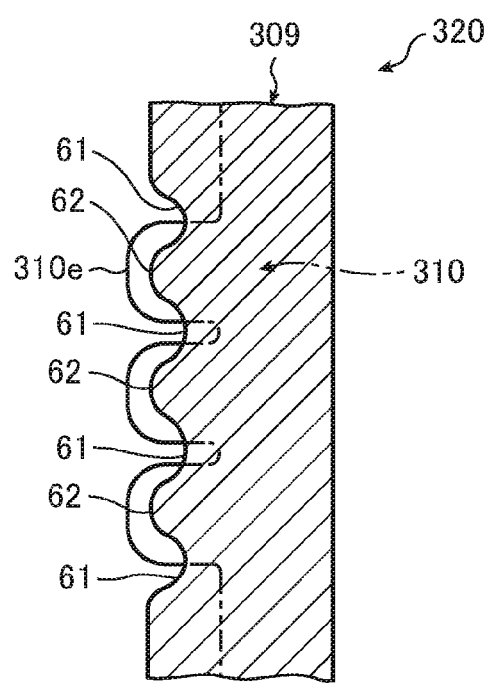
FIG. 16C is a schematic cross-sectional view taken along a line D-D' of FIG. 16A.

In addition, FIGS. 15A to 15E illustrate shapes of stitches as simple concave-convex shapes in order to facilitate understanding, but the valley shape 61 and the mountain shape 62 as illustrated in FIGS. 16A to 16C may be formed on the stitch-shaped design 310e and the design surface in the vicinity thereof as illustrated in FIGS. 16A to 16C. Incidentally, these valley shape 61 and mountain shape 62 are the same as the valley shape 61 and the mountain shape 62 that have been described in the first embodiment, and thus, the description thereof will be omitted. In this manner, it is possible to express the stitch-shaped design 310e like a more genuine one by forming the valley shape 61 and the mountain shape 62 in the vicinity of the stitch-shaped design 310e.

As described above, the resin molded product 320 is manufactured by molding the first molded component 309, which forms the design surface of the resin molded product 320 first, and thereafter, molding the second molded component 310 to be layered on the non-design surface side of the first molded component 309 such that the stitch-shaped design 310e is exposed to the design surface side via the through-hole portion 309f of the first molded component 309 (that is, can be visibly recognized from the design surface side) in the manufacturing method according to the fourth embodiment, which is similar to the manufacturing methods according to the first to third embodiments. Thus, it is possible to accurately manufacture the resin molded product including the artificial stitch pattern formed on the design surface thereof according to the manufacturing method according to the fourth embodiment due to the same reason in the above-described manufacturing method according to the first embodiment.

In addition, it is possible to perform an expansion foaming molding method in the first molding step since the first molded component 309 including the design surface is molded first in the manufacturing method according to the fourth embodiment. Accordingly, it is possible to give a soft feeling analogous to leather to the design surface. On the contrary, the above-described seal is not established in the method of manufacturing the resin molded product of Patent Literature 1 of causing the protruding end portion of the cord seam portion protruding from the first member and the molding surface of the secondary mold portion to form the design surface to abut on each other and sealing a resin flow therebetween, and thus, it is difficult to mold the second member forming the design surface using the expansion foaming molding method which is performed by slightly mold-opening a second mold portion.

Further, the mold cavity expansion portion 310a is not formed by moving the movable portion inside the mold as in the manufacturing methods according to the first to third embodiments, but is formed by switching the mold to be paired with the common mold 302 from the first mold 304 to the second mold 305 in the manufacturing method according to the fourth embodiment. According to the above-described manufacturing method according to the fourth embodiment, it is unnecessary to provide the movable portion inside the mold, and thus, there is no occurrence of a burr caused by the movable portion and further it is possible to simplify the mold structure.

Alternative Example of Manufacturing Method According to Fourth Embodiment

It has been described in the above-described manufacturing method according to the fourth embodiment such that the first molded component 309 is molded using the foamable resin and caused to foam, then the mold cavity expansion portion 310a is formed by switching the mold to be paired with the common mold 302 from the first mold 304 to the second mold 305, and the second molded component 310 is molded using the typical non-foamable resin in the mold cavity expansion portion 310a, but the invention is not limited thereto.

For example, the first molded component 309 may be molded using a typical non-foamable resin in the above-described manufacturing method according to the fourth embodiment, which is similar to the manufacturing methods according to the first to third embodiments. In this case, it is unnecessary to perform the slight mold opening illustrated in FIG. 15C after initiating the injection-filling of the first resin 309b. In addition, both the first molded component 309 and the second molded component 310 may be molded using a foaming molding method, and only the second molded component 310 may be molded using the foaming molding method. Further, one or both of the first molded component 309 and the second molded component 310 may be molded using the injection press molding method or the injection compression method that have been described already in the alternative example of the manufacturing method according to the first embodiment. Further, one of the first molded component 309 and the second molded component 310 may be molded using the injection press molding method or the injection compression method and the other thereof may be molded using the foaming molding method. As an example of these alternative examples, a description will be given regarding a method of molding a first molded component using a typical non-foamable resin and molding a second molded component using an injection press molding method in a manufacturing method according to a fifth embodiment, hereinafter.

Alternative Example of Injection Molding Machine According to Fourth Embodiment

Although the injection molding machine according to the fourth embodiment has been described as above, various types of modification or reformation can be added to the injection molding machine according to the fourth embodiment. Although the description has been given with the injection molding machine according to the fourth embodiment in which the common mold 302 is provided on the fixed platen side, and the first mold 304 and the second mold 305 is provided on the movable platen side via the mold replacing means, for example, the invention is not limited thereto. For example, the first mold 304 and the second mold 305 may be provided on the fixed platen side via the mold replacing means, and the common mold 302 may be provided on the movable platen side. In this case, the first resin flow passage 109c and the first gate valve 109d are provided in the first mold 304, and the second resin flow passage 110c and the second gate valve 110d are provided in the second mold 305.

In addition, the injection molding machine according to the fourth embodiment may be configured such that the common mold 302 is provided with the first movable portion 140 like the fixed mold 102 of the injection molding machine according to the second embodiment, and the mold cavity expansion portion 310a is formed through the switching from the first mold 304 to the second mold 305 and retracting movement (movement in the mold opening direction) of the first movable portion 140 provided in the common mold 302.

Further, it is configured to expand the volume of the first mold cavity 309a by slightly mold-opening the mold for injection molding, which has the share edge structure, using the mold clamping mechanism in the injection molding machine according to the fourth embodiment in order to simplify the description and drawings, but means of expanding the volume of the first mold cavity 309a is not limited thereto. As the above-described means, for example, it is possible to employ a movable portion inside a mold which can arbitrarily control the volume of the first mold cavity 309a, an expansion rate, a volume expansion position holding force, and the like against the resin pressure inside the first mold cavity 309a like the movable portions 40, 140 and 150 employed in the molds for injection molding according to the first to third embodiments.

Further, the description has been given with the injection molding machine according to the fourth embodiment in which the division surfaces of the common mold 302 and the first mold 304 have the share edge structure, but the invention is not limited thereto. For example, the division surfaces of the common mold 302 and the first mold 304 don't need to have the share edge structure in the case of typically molding the first molded component 309 using a typical non-foamable resin instead of molding the first molded component 309 using a particular method such as the foaming molding method, the injection press molding method, and the injection compression method. In addition, the division surfaces of the common mold 302 and the second mold 305 may have the share edge structure in the case of molding the second molded component 310 using a particular method such as the foaming molding method, the injection press molding method, and the injection compression method Further, the division surfaces of the common mold 302 and the first mold 304 may have the share edge structure, and the division surfaces of the common mold 302 and the second mold 305 may have the share edge structure in the case of molding both the first molded component 309 and the second molded component 310 using a particular method such as the foaming molding method, the injection press molding method, and the injection compression method. As an example of these alternative examples, a description will be given regarding a configuration in which division surfaces of a common mold and a second mold have a share edge structure in an injection molding machine according to a fifth embodiment, hereinafter.

Injection Molding Machine According to Fifth Embodiment

Figure 17A:
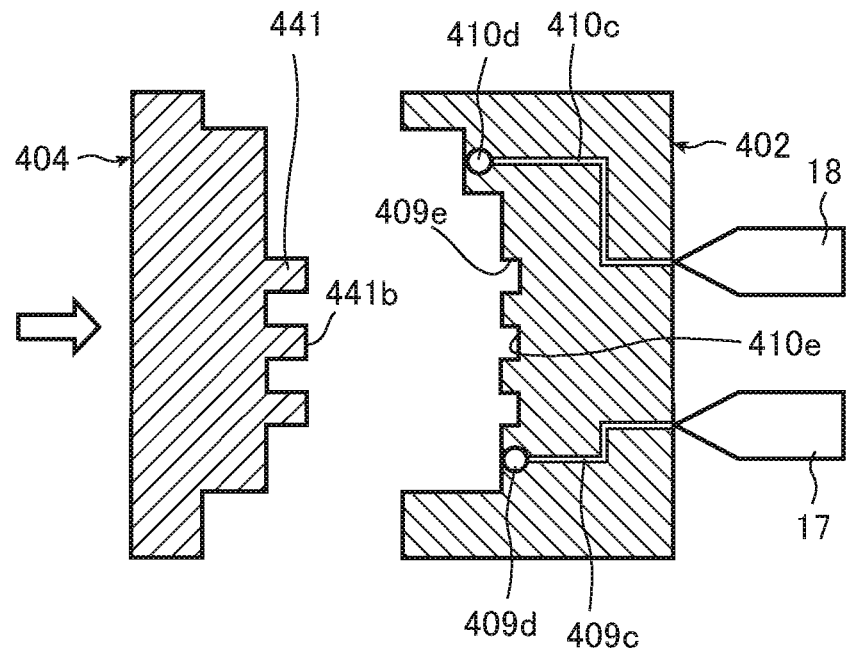
FIG. 17A is a schematic cross-sectional view illustrating each mold opening state of a common mold and a first mold according to a fifth embodiment.
Figure 17B:
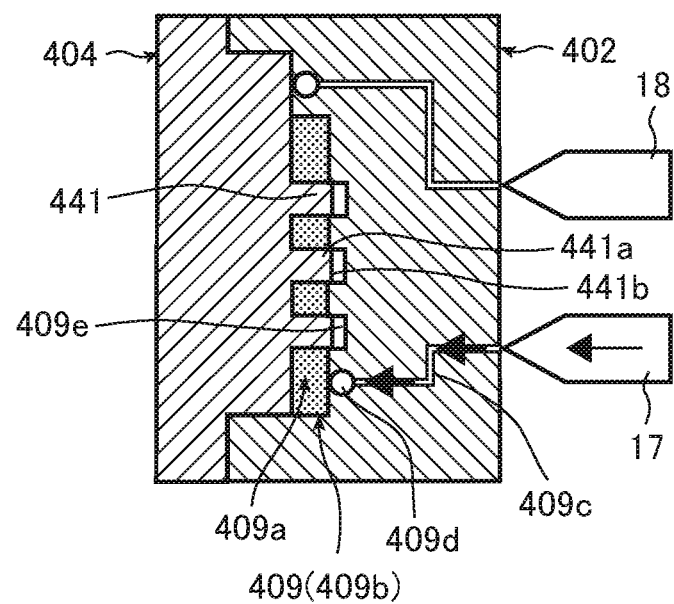
FIG. 17B is a schematic cross-sectional view illustrating a first molding step in a manufacturing method according to the fifth embodiment which is performed using a mold for injection molding according to the fifth embodiment.
Figure 17C:
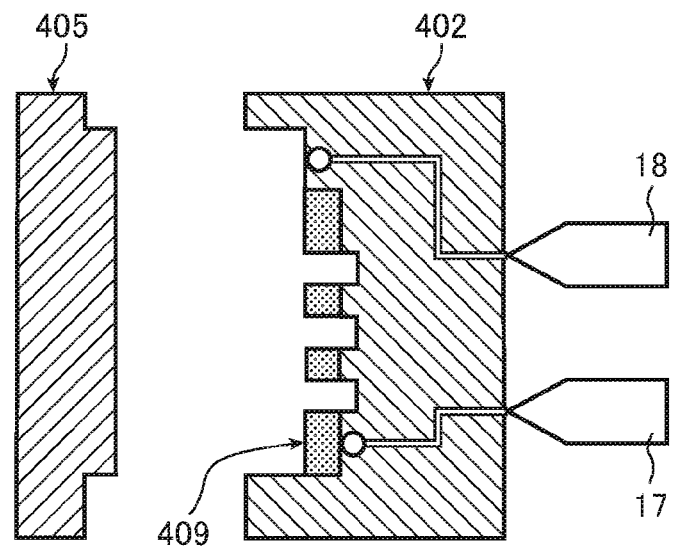
FIG. 17C is a schematic cross-sectional view illustrating a state in which a mold opposing the common mold is switched from the first mold to a second mold in the manufacturing method according to the fifth embodiment which is performed using the mold for injection molding according to the fifth embodiment.
Figure 17D:
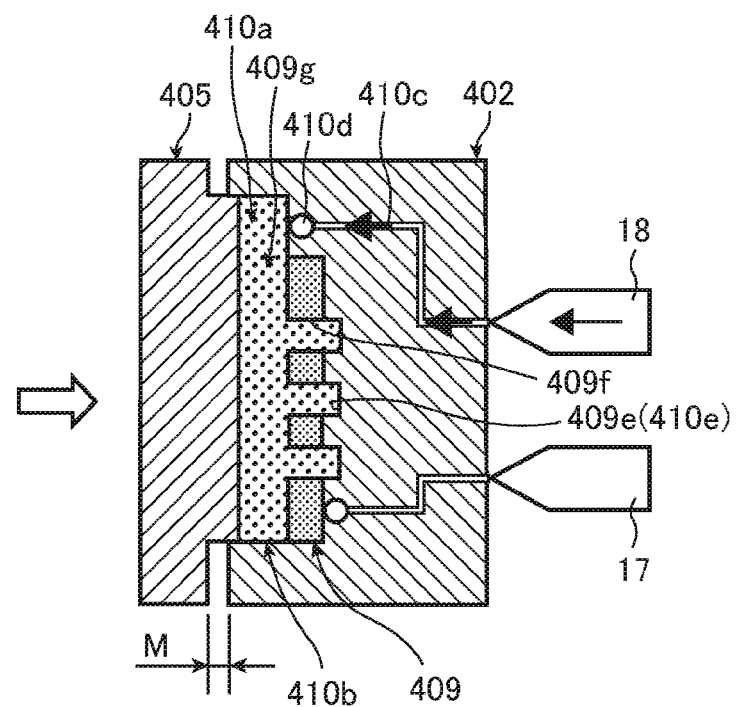
FIG. 17D is a schematic cross-sectional view illustrating a secondary injection-filling step in the manufacturing method according to the fifth embodiment which is performed using the mold for injection molding according to the fifth embodiment.
Figure 17E:
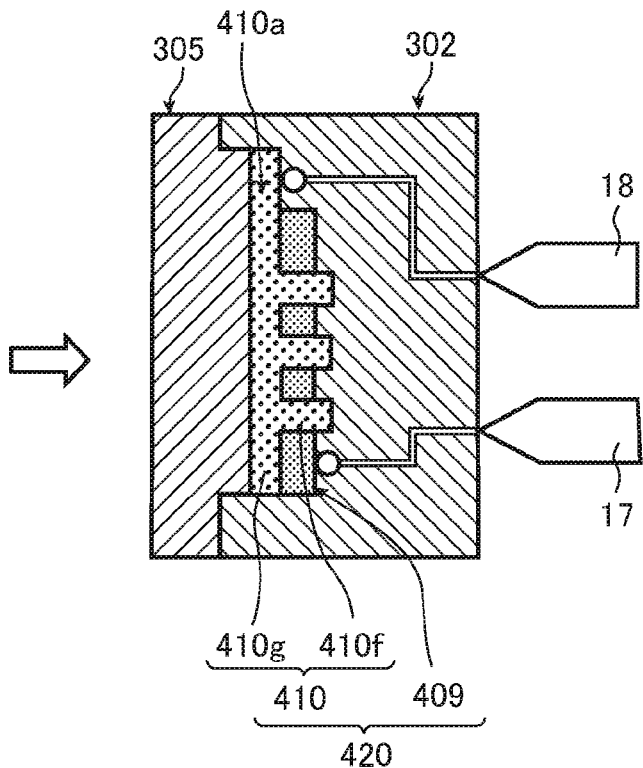
FIG. 17E is a schematic cross-sectional view illustrating a compression step in the manufacturing method according to the fifth embodiment which is performed using the mold for injection molding according to the fifth embodiment.

Next, the injection molding machine according to the fifth embodiment will be described with reference to FIGS. 17A to 17E. FIG. 17A is a schematic cross-sectional view illustrating a state in which a first mold 404 is arranged to oppose a common mold 402. FIG. 17B is a schematic cross-sectional view illustrating a state in which a first molding step is performed in a first mold cavity 409a which is formed as the common mold 402 and the first mold 404 are mold-closed. FIG. 17C is a schematic cross-sectional view illustrating a state in which a second mold 405 is arranged to oppose the common mold 402. FIG. 17D is a schematic cross-sectional view illustrating a state in which a second resin 410b is injection-filled into the mold cavity expansion portion 310a which is formed as the common mold 402 and the second mold 405 are mold-closed to a slight mold opening state. FIG. 17E is a schematic cross-sectional view illustrating a state in which the common mold 402 and the second mold 405 are completely mold-closed.

A difference of the injection molding machine according to the fifth embodiment from the injection molding machine according to the fourth embodiment is that the common mold and the first mold do not have the share edge structure, and the common mold and the second mold have the share edge structure. The other configuration is the same as that of the injection molding machine according to the fourth embodiment, and thus, the detailed description thereof will be omitted.

Incidentally, the first mold cavity 409a is a space which is formed between an inner surface of the common mold 402 and an inner surface of the first mold 404 as the common mold 402 and the first mold 404 are mold-clamped in the description of the fifth embodiment, which is similar to the injection molding machine according to the fourth embodiment. Incidentally, a mold cavity expansion portion (second mold cavity) 410a is a space which is newly formed by replacing the first mold 404 with the second mold 405, which can form a mold cavity having a larger volume than the first mold 404 after molding of a first molded component 409, which is similar to the injection molding machine according to the fourth embodiment.

Similarly to the injection molding machine according to the fourth embodiment, the injection molding machine according to the fifth embodiment is provided with a fixed platen (not illustrated), a movable platen (not illustrated), a mold for injection molding which is provided between the fixed platen and the movable platen, the first injection unit 17, the second injection unit 18, a mold clamping mechanism (not illustrated), and mold replacing means (not illustrated) which switches the mold opposing the common mold 402. In addition, the mold for injection molding according to the fifth embodiment is provided with the common mold (fixed mold) 402 attached to the fixed platen and the first mold (first movable mold) 404 and the second mold (second movable mold) 405 which are attached to the mold replacing means, which is similar to the mold for injection molding according to the fourth embodiment.

The common mold 402 is a design-surface-side mold which is configured to form the design surface of a resin molded product 420 (first molded component 409). A mold cavity surface of the common mold 402 is decorated with a design surface imitating a leather surface and a plurality of concave portions 409e decorated with a stitch-shaped design 410e imitating a seam is formed at certain positions of the design surface, which is similar to the common mold 302 according to the fourth embodiment. In addition, the common mold 402 includes a first resin flow passage 409c and a second resin flow passage 410c formed as a hot runner, a first gate valve 409d, and a second gate valve 410d, which is similar to the common mold 302 according to the fourth embodiment.

The first mold 404 is a non-design-surface-side mold which is configured to form a surface of the first molded component 409 on a non-design surface side. The first mold 404 is configured such that the first mold cavity 409a, configured to mold the first molded component 409, is formed when being paired with the common mold 402, which is similar to the first mold 304 according to the fourth embodiment. In addition, a plurality of convex portions 441 protruding toward the common mold 402 are provided on a mold cavity surface of the first mold 404, which is similar to the first mold 304 according to the fourth embodiment. Incidentally, the plurality of convex portions 441 have the same configuration as the plurality of convex portions 341 according to the fourth embodiment, and thus, the description thereof will be omitted.

The second mold 405 is a non-design-surface-side mold which is configured to form a non-design surface of a second molded component 410. The second mold 405 is configured such that the mold cavity expansion portion 410a, configured to mold the second molded component 410, is formed when being paired with the common mold 402 holding the first molded component 409, which is similar to the second mold 305 according to the fourth embodiment.

Division surfaces of the common mold 402 and the first mold 404 do not have the share edge structure and division surfaces of the common mold 402 and the second mold 405 have the share edge structure in a mold for injection molding according to the fifth embodiment, which is different from the mold for injection molding according to the fourth embodiment. Further, the common mold 402 and the second mold 405 are configured to be capable of varying the volume of the mold cavity expansion portion 410a through mold opening and closing operations using a mold opening and closing mechanism (mold clamping mechanism in the present embodiment) of the injection molding machine.

It is possible to arbitrarily employ various known configurations such as a mold slide type mold replacing unit, a rotary rotation type mold replacing unit, and a horizontal rotation type mold replacing unit as the mold replacing unit, which is similar to the mold replacing unit according to the fourth embodiment.

The mold for injection molding according to the fifth embodiment is configured such that a mold closing operation, a mold clamping operation, and a mold opening operation between the common mold 402 and the first mold 404, and a two-step mold closing operation, the mold clamping operation, and the mold opening operation between the common mold 402 and the second mold 405 are executed by moving the movable platen in the mold opening and closing direction using the mold clamping mechanism (not illustrated). This mold clamping mechanism is preferably a toggle-type mold clamping mechanism which can execute the mold opening and closing operations and the mold clamping operation. In addition, this toggle-type mold clamping mechanism is more preferably an electric toggle-type mold clamping mechanism employing a linear motion actuator obtained by combining a driving source with a rotation and linear motion converting means such as a servomotor and a ball screw mechanism. It is possible to execute the highly accurate mold opening and closing operations according to such an electric toggle-type mold clamping mechanism.

In addition, the mold for injection molding according to the fifth embodiment is configured such that the first mold cavity 409a is expanded to form the mold cavity expansion portion 410a by replacing the first mold 404 with the second mold 405, which is similar to the mold for injection molding according to the fourth embodiment.

Manufacturing Method According to Fifth Embodiment

Next, a description will be given regarding a manufacturing method according to the fifth embodiment which is performed using the injection molding machine according to the fifth embodiment with reference to FIGS. 17A to 17E. The manufacturing method according to the fifth embodiment is schematically a method of molding the first molded component 409 using a typical non-foamable resin, then forming the mold cavity expansion portion 410a by switching the mold to be paired with the common mold 402 from the first mold 404 to the second mold 405, and molding the second molded component 410 using an injection press molding method in the mold cavity expansion portion 410a. Hereinafter, the manufacturing method according to the fifth embodiment will be described in detail.

In the manufacturing method according to the fifth embodiment, first, the first mold cavity 409a is formed between the common mold 402 and the first mold 404 as illustrated in FIG. 17B by mold-clamping the common mold 402 and the first mold 404 using the mold clamping mechanism (not illustrated), which is similar to the manufacturing method according to the fourth embodiment. Thereafter, the first molded component 409 is molded in the first mold cavity 409a according to the same step of the manufacturing methods according to the first to third embodiments (a first molding step). The first molded component 409 includes the design surface formed on the front surface thereof using the inner surface of the common mold 402. In addition, the plurality of through-hole portions 409f, which penetrate from the front surface (design surface) to the rear surface (surface on the non-design surface side), are formed in the first molded component 409 using the convex portion 441 of the first mold 404.

After the molding of the first molded component 409, the mold opposing the common mold 402 is switched from the first mold 404 to the second mold 405 by the mold clamping mechanism (not illustrated) and the mold replacing means as illustrated in FIG. 17C. Incidentally, this mold switching step is performed in a state in which the first molded component 409 is held on the common mold 402.

Thereafter, the movable platen is moved to the fixed platen side by the mold clamping mechanism (not illustrated) as illustrated in FIG. 17D from the mold opening state of FIG. 17C so that the common mold 402 and the second mold 405 are mold-closed. At this time, the common mold 402 and the second mold 405 are not completely mold-closed, but the second mold 405 is moved away from the common mold 402 by a slight distance M such that the mold cavity expansion portion 410a is larger than a desired volume. Further, a certain mold clamping force is applied while holding a state in which the second mold 405 is mold-opened from the common mold 402 by the slight distance M. Accordingly, the mold cavity expansion portion 410a, which is configured of spaces formed by the plurality of concave portions 409e of the common mold 402, spaces formed by the plurality of through-hole portions 409f of the first molded component 409, and the non-design-surface-side space 409g formed between the rear surface (surface on the non-design surface side) of the first molded component 409 and the inner surface of the second mold 405, is formed (a second molding preparation step). Incidentally, the mold cavity expansion portion 410a is not turned into an opening state even in the slight mold opening state illustrated in FIG. 17D since the division surfaces of the common mold 402 and the second mold 405 have the share edge structure.

Further, in this state, the second resin 410b is injection-filled into the mold cavity expansion portion 410a from the second injection unit 18 as illustrated in FIG. 17D according to the same step of the manufacturing methods according to the first to fourth embodiments (a secondary injection-filling step). Next, after initiation of the injection-filling of the second resin 410b, the second mold 405 and the common mold 402 are completely mold-closed at a suitable timing using the mold clamping mechanism (not illustrated), thereby forming a mold clamping state as illustrated in FIG. 17E from the state illustrated in FIG. 17D (a mold clamping compression step). Accordingly, the second molded component 410 layered on the non-design surface side of the first molded component 409 is molded (a second molding step). The second molded component 410 is configured of a non-design-surface portion 410g, which is layered on the rear surface (surface on the non-design surface side) of the first molded component 409, and a stitch portion 410f which is exposed to the first molded component 409 on the front surface (design surface) side via the through-hole portion 409f of the first molded component 409 from the non-design-surface portion 410g, which is similar to the second molded components 10, 110 and 310 molded using the manufacturing methods according to the first to fourth embodiments. The stitch-shaped design 410e decorated on the concave portion 409e of the common mold 402 is transferred to a distal end portion of the stitch portion 410f. According to the above-described second molding step that employs the injection press molding method, it is possible to expect improvement of the transfer property of a more delicate stitch-shaped design, and improvement of the resin filling property into fine cavities having a small distance among neighboring seams as described in the alternative example of the manufacturing method according to the first embodiment.

Further, the movable platen is moved in the direction of being moved away from the fixed platen by the mold clamping mechanism (not illustrated) after the second molded component 410 is completely cooled and solidified, and accordingly, the common mold 402 and the second mold 405 are mold-opened. Thereafter, the resin molded product 420 formed of the first molded component 409 and the second molded component 410 is taken outside the injection molding machine by product take-out means (not illustrated), and the molding cycle is ended.

According to the manufacturing method according to the fifth embodiment, it is possible to successively manufacture the resin molded product 420 including an artificial stitch pattern (seam) formed on the front surface (design surface) thereof by repeating the above-described steps.

Incidentally, the second molded component 410 may be configured such that the non-design-surface portion 410g is layered entirely on the rear surface (surface on the non-design surface side) of the first molded component 409 (see FIG. 2A) or may be configured such that the non-design-surface portion 410g is layered partially on the rear surface (surface on the non-design surface side) of the first molded component 409 (see FIG. 2B), which is similar to the manufacturing methods according to the first to fourth embodiments.

In addition, FIGS. 17A to 17E illustrate shapes of stitches as simple concave-convex shapes in order to facilitate understanding, but the valley shape 61 and the mountain shape 62 as illustrated in FIGS. 16A to 16C may be formed on the stitch-shaped design 410e and the design surface in the vicinity thereof as illustrated in FIGS. 16A to 16C, which is similar to the manufacturing method according to the fourth embodiment.

As described above, the resin molded product 420 is manufactured by molding the first molded component 409, which forms the design surface of the resin molded product 420 first, and thereafter, molding the second molded component 410 to be layered on the non-design surface side of the first molded component 409 such that the stitch-shaped design 410e is exposed to the design surface side via the through-hole portion 409f of the first molded component 409 (that is, can be visibly recognized from the design surface side) in the manufacturing method according to the fifth embodiment, which is similar to the manufacturing methods according to the first to fourth embodiments. Thus, it is possible to accurately manufacture the resin molded product including the artificial stitch pattern formed on the design surface thereof according to the manufacturing method according to the fifth embodiment due to the same reason in the above-described manufacturing method according to the first embodiment.

It is unnecessary to provide the movable portion inside the mold in the manufacturing method according to the fifth embodiment, and thus, there is no occurrence of a burr caused by the movable portion and further it is possible to simplify the mold structure, which is similar to the manufacturing method according to the fourth embodiment.

Alternative Example of Manufacturing Method According to Fifth Embodiment

It has been described in the above-described manufacturing method according to the fifth embodiment such that the first molded component 409 is typically molded using the typical non-foamable resin, then the mold cavity expansion portion 410a is formed by switching the mold to be paired with the common mold 402 from the first mold 404 to the second mold 405, and the second molded component 410 is molded by the injection press molding method in the mold cavity expansion portion 410a, but the invention is not limited thereto, which is similar to the above-described alternative example of the manufacturing method according to the fourth embodiment.

For example, the second molded component 410 may be molded not by the injection press molding method but by an injection compression method in the above-described manufacturing method according to the fifth embodiment. In addition, not only the second molded component 410 but also the first molded component 409 may be molded using the injection press molding method or the injection compression method. Further, one or both of the first molded component 409 and the second molded component 410 may be molded using a foaming molding method. Further, one of the first molded component 409 and the second molded component 410 may be molded using a particular method among the foaming molding method, the injection press molding method, and the injection compression method, and the other may be molded using a typical molding method using a typical non-foamable resin. In addition, both the first molded component 409 and the second molded component 410 may be molded using a typical molding method using a typical non-foamable resin.

Incidentally, when the second molded component 410 is molded using the foaming molding method, first, the first molded component 409 is molded in a typical molding method using a typical non-foamable resin or a particular method among the foaming molding method, the injection press molding method, and the injection compression method. Next, the mold opposing the common mold 402 is switched from the first mold 404 to the second mold 405 in a state in which the first molded component 409 remains in the common mold 402, thereby completely mold-closing the common mold 402 and the second mold 405. Further, the second resin 410b made of the foamable resin is injection-filled into the mold cavity expansion portion 410a formed as above, and thereafter, the second mold 405 is mold-opened from the common mold 402 by the slight distance M using the mold clamping mechanism. Incidentally, a volume of the mold cavity expansion portion 410a in the state of being mold-opened by the slight distance M is set to be a desired volume. Accordingly, it is possible to mold the second molded component 410 using the foaming molding method in the mold cavity expansion portion 410a.

Alternative Example of Injection Molding Machine According to Fifth Embodiment

Although the injection molding machine according to the fifth embodiment has been described as above, various types of modification or reformation can be added to the injection molding machine according to the fifth embodiment, which is similar to the above-described alternative example of the injection molding machine according to the fourth embodiment.

Injection Molding Machine According to Sixth Embodiment

Figure 18:
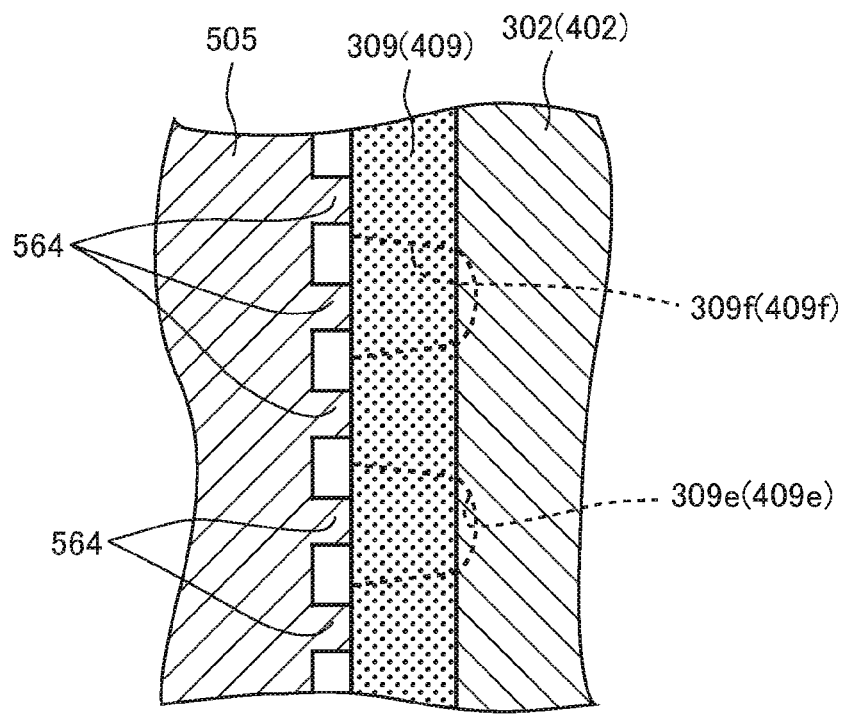
FIG. 18 is a schematic cross-sectional view illustrating a part of a mold for injection molding according to a sixth embodiment.

Next, an injection molding machine according to a sixth embodiment will be described with reference to FIG. 18. FIG. 18 is a partially-omitted schematic configuration diagram illustrating a state in which a first molded component is pressed by a pressing portion.

A difference of the injection molding machine according to the sixth embodiment from the injection molding machines according to the fourth and fifth embodiments is that a pressing portion, configured to press the first molded component at the time of molding a second molded component, is provided on a non-design-surface-side mold (the second molds 305 and 405 in the fourth and fifth embodiments) to be used at the time of molding the second molded component. It is possible to employ the same configuration in the injection molding machines according to the fourth and fifth embodiments for the other configuration, and thus, the same reference sign will be used and the detailed description thereof will be omitted.

Similarly to the injection molding machines according to the fourth and fifth embodiments, the injection molding machine according to the sixth embodiment is provided with a fixed platen (not illustrated), a movable platen (not illustrated), a mold for injection molding which is provided between the fixed platen and the movable platen, the first injection unit 17, the second injection unit 18, a mold clamping mechanism (not illustrated), and mold replacing means (not illustrated) which switches the mold opposing the common mold 302 or 402. In addition, the mold for injection molding according to the sixth embodiment is provided with the common mold (fixed mold) 302 or 402 attached to the fixed platen and the first mold (first movable mold) 304 or 404 and a second mold (second movable mold) 505 which are attached to the mold replacing means, which is similar to the molds for injection molding according to the fourth and fifth embodiment.

The second mold 505 is a non-design-surface-side mold which is configured to form a non-design surface of the second molded component 310 or 410, which is similar to the second molds 305 and 405 according to the fourth and fifth embodiments. The second mold 505 according to the sixth embodiment further includes a pressing portion 560, which is configured to press the first molded component 309 or 409 at the time of molding the second molded component 310 or 410, which is different from the second molds 305 and 405 according to the fourth and fifth embodiments.

As illustrated in FIG. 18, the pressing portion 560 is configured of a plurality of protruding portions 564 provided on a mold cavity surface (inner surface) of the second mold 505. Each of the protruding portions 564 has a shape and a length in a protruding direction so as to enable the first molded component 309 or 409, held between the common mold 302 or 402 and the second mold 505, to be pressed toward the common mold 302 or 402 when the common mold 302 or 402 and the second mold 505 are mold-closed. The number of the protruding portions 564 and positions thereof can be arbitrarily set depending on the desired number of the stitch-shaped designs 310e or 410e and desired positions thereof. For example, the plurality of protruding portions 564 may be provided on the right and left in column so as to sandwich the through-hole portion 309f or 409f of the first molded component 309 or 409, and arranged to press the vicinity of each end portion of the through-hole portion 309f or 409f of the first molded component 309 or 409 and the vicinity of each central portion thereof in each column, which is similar to the plurality of pressing pins 264 according to the third embodiment illustrated in FIG. 11A to FIG. 11C. Incidentally, the number of the pressing portions 560 and arrangement thereof can be arbitrarily set as long as it is possible to press the first molded component 309 or 409 at the time of molding the second molded component 310 or 410.

Manufacturing Method According to Sixth Embodiment

Next, a description will be given regarding a manufacturing method according to a sixth embodiment which is performed using an injection molding machine according to the sixth embodiment with reference to FIG. 18. In the manufacturing method according to the sixth embodiment, first, the first molded component 309 or 409 is molded, and then, the mold opposing the common mold 302 or 402 is switched from the first mold 304 or 404 to the second mold 305 or 405 using the same method in the manufacturing methods according to the fourth and fifth embodiments. Thereafter, the common mold 302 or 402 and the second mold 305 or 405 are mold-closed to form the mold cavity expansion portion 310a or 410a (a second molding preparation step).

In the manufacturing method according to the sixth embodiment, the first molded component 309 or 409 is pressed toward the common mold 302 or 402 by the protruding portion 564 of the pressing portion 560 when the common mold 302 or 402 and the second mold 305 or 405 are mold-closed, which is different from the manufacturing methods according to the fourth and fifth embodiments (a first molded component pressing step). In this state, the second resin 310b or 410b is injection-filled into the mold cavity expansion portion 310a or 410a from the second injection unit 18 to mold the second molded component 310 or 410 (a second molding step). Accordingly, the resin molded product 320 or 420 formed of the first molded component 309 or 409 and the second molded component 310 or 410 is molded. The resin molded product 320 or 420 includes an artificial stitch pattern (seam) formed on the front surface (design surface) similarly to the resin molded products 320 and 420 which are molded using the manufacturing methods according to the fourth and fifth embodiments. Meanwhile, a pressing trace of the protruding portion 564 of the pressing portion 560 remains on the rear surface (the non-design surface) of the resin molded products 320 and 420 molded using the manufacturing method according to the sixth embodiment, which is different from the resin molded products 320 and 420 molded using the manufacturing methods according to the fourth and fifth embodiments. This pressing trace is a concave portion reaching a rear surface (surface on the non-design surface side) of the first molded component 309 or 409 from the non-design surface.

Thereafter, the resin molded product 320 and 420 is taken outside the injection molding machine by product take-out means (not illustrated), and the molding cycle is ended. According to the manufacturing method according to the sixth embodiment, it is possible to successively manufacture the resin molded products 320 and 420 by repeating the above-described steps, which is similar to the manufacturing methods according to the fourth and fifth embodiments.

As described above, the resin molded product 320 or 420 is manufactured by molding the first molded component 309 or 409, which forms the design surface of the resin molded product 320 or 420 first, and thereafter, molding the second molded component 310 or 410 to be layered on the non-design surface side of the first molded component 309 or 409 such that the stitch-shaped design 310e or 410e is exposed to the design surface side via the through-hole portion 309f or 409f of the first molded component 309 or 409 in the manufacturing method according to the sixth embodiment, which is similar to the manufacturing methods according to the first to fifth embodiments. Thus, it is possible to accurately manufacture the resin molded product including the artificial stitch pattern formed on the design surface thereof according to the manufacturing method according to the sixth embodiment due to the same reason in the above-described manufacturing method according to the first embodiment.

In addition, it is possible to press the first molded component 309 or 409 toward the common mold 302 or 402 using the pressing portion 560 during execution of the second molding step in the manufacturing method according to the sixth embodiment, which is similar to the manufacturing method according to the third embodiment. Accordingly, it is possible to sufficiently secure adhesion between the first molded component 309 or 409 and the common mold 302 or 402, and thus, it is possible to more reliably prevent the second resin 310b or 410b, injection-filled into the mold cavity expansion portion 310a or 410a from flowing between the first molded component 309 or 409 and the common mold 302 or 402 through the through-hole portion 309f or 409f by the resin pressure thereof, and it is possible to prevent a burr from generating around the stitch-shaped design 310e or 410e, which is similar to the manufacturing method according to the third embodiment.

Alternative Example of Injection Molding Machine According to Sixth Embodiment

Although the injection molding machine according to the sixth embodiment has been described as above, various types of modification or reformation can be added to the injection molding machine according to the sixth embodiment. Although the description has been given with the injection molding machine according to the sixth embodiment in which the pressing portion 560 is configured of the plurality of protruding portions 564 provided on the mold cavity surface (inner surface) of the second mold 505, for example, the invention may have any configuration without being limited thereto as long as it is possible to press the first molded component 309 or 409 at the time of molding the second molded component 310 or 410.

For example, the pressing portion 560 may be housed inside an internal space formed in the second mold 505 and include a movable plate portion, which is housed to be movable in the mold opening and closing direction by arbitrary driving means, and a plurality of pressing pins or pressing blocks which are provided to protrude toward the common mold 302 or 402 from the movable plate portion and configured to be capable of protruding and being inserted through a through-hole formed in the second mold 505, which is similar to the pressing portion 260 according to the third embodiment.

Figure 19:
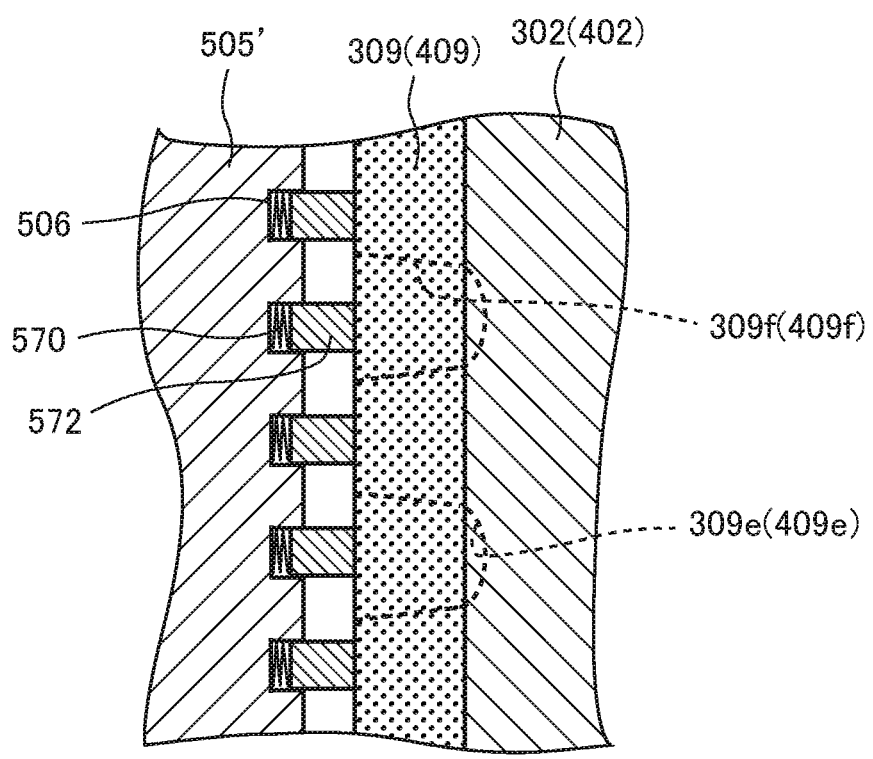
FIG. 19 is a schematic cross-sectional view illustrating an alternative example of the mold for injection molding according to the sixth embodiment.

In addition, the pressing portion 560 may be provided with a coil spring 570, which is arranged inside a concave portion 506 formed on a mold cavity surface (inner surface) of a second mold 505', and a pressing pin 572 which is biased toward the common mold 302 or 402 from the concave portion 506 by the coil spring 570 for example, as illustrated in FIG. 19.

In this manner, the pressing pin 572 is biased toward the common mold 302 or 402 by the coil spring 570, and accordingly, it is possible to continuously press the first molded component 309 or 409 toward the common mold 302 or 402 even when the first molded component 309 or 409 is compressed by the resin pressure at the time of injection-filling the second resin 310b or 410b. That is, when the first molded component 309 or 409 is molded using the foaming molding method, for example, there is a possibility that the first molded component 309 or 409 is compressed by the resin pressure at the time of injection-filling the second resin 310b or 410b due to the first molded component 309 or 409 has pliability. When the first molded component 309 or 409 is deformed in this manner, there is a risk that a pressing force decreases in the configuration of the protruding portion 564 according to the third embodiment which is formed on the mold cavity surface (inner surface) of the second mold 505 in an integrated manner. On the contrary, the pressing pin 572 illustrated in FIG. 19 is biased toward the common mold 302 or 402 by the coil spring 570, and thus, it is possible to suppress the decrease of the pressing force even when the first molded component 309 or 409 is deformed.

REFERENCE SIGNS LIST 1, 1', 101, 101' mold for injection molding
2, 102, 302, 402 design-surface-side mold (fixed mold or common mold)
4, 104, 204, 304, 305, 404, 405, 505 non-design-surface-side mold (movable mold, first mold, or second mold)
9, 109, 309, 409 first molded component
9a, 109a, 309a, 409a first mold cavity
9b, 109b, 309b, 409b first resin
9e, 109e, 309e, 409e concave portion
9f, 109f, 309f, 409f through-hole portion
9g, 109g, 309g, 409g non-design-surface-side space
10, 110, 310, 410 second molded component
10a, 110a, 310a, 410a mold cavity expansion portion
10b, 110b, 310b, 410b second resin
10f, 110f, 310f, 410f stitch portion
10g, 110g, 310g, 410g non-design-surface portion
17 first injection unit
18 second injection unit
20, 20', 120, 120', 220, 220', 320, 420 resin molded product
40, 40' movable portion
41, 141, 341, 441 convex portion
140, 140' first movable portion
150, 150' second movable portion
260, 560 pressing portion

The invention claimed is:

1. A mold for injection molding that is used for manufacturing a resin molded product having a stitch pattern on a design surface, the mold comprising:
a design-surface-side mold which is capable of forming the design surface of the resin molded product
a non-design-surface-side mold which is capable of forming a mold cavity with the design-surface-side mold; and
a driving unit, wherein
any one of the design-surface-side mold and the non-design-surface-side mold includes a movable portion in which a convex portion protrudes toward the other one of the design-surface-side mold and the non-design-surface-side mold,
the other one of the design-surface-side mold and the non-design-surface-side mold has a concave portion capable of being inserted at a distal end portion of the convex portion of the movable portion,
the movable portion is movable between an advancement limit position where the distal end portion of the convex portion has been inserted within the concave portion and a withdrawal position where the distal end portion of the convex portion has been pulled out from the concave portion,
the driving unit, by moving the movable portion to the advancement limit position, forms between the design-surface-side mold and the non-design-surface-side mold a first mold cavity which is for molding a first molded component that includes a design surface and a through-hole portion penetrating from the design surface through to a surface on a non-design surface side, and, by moving the movable portion to the withdrawal position, expands the first mold cavity and forms between the design-surface-side mold and the non-design-surface-side mold a mold cavity expansion portion which is for molding a second molded component that includes a non-design-surface portion layered on the non-design surface side of the first molded component and a stitch portion capable of being exposed on a design surface side of the first molded component via the through-hole portion of the first molded component from the non-design-surface portion.

2. The mold for injection molding according to claim 1, wherein
the non-design-surface-side mold includes a pressing portion which presses the first molded component toward the design-surface-side mold at the time of molding the second molded component.

3. The mold for injection molding according to claim 1, wherein
the design-surface-side mold includes a first movable portion which is the movable portion,
the non-design-surface-side mold includes a second movable portion in which the concave portion,
by the first movable portion moving closer to the non-design-surface-side mold and the second moveable portion moving closer to the design-surface-side mold, the first mold cavity is formed between the design-surface-side mold and the non-design-surface-side mold, and
by the first movable portion moving away from the non-design-surface-side mold and the second movable portion moving away from the design-surface-side mold, the first mold cavity is expanded, and the mold cavity expansion portion is formed between the design-surface-side mold and the non-design-surface-side mold.

4. The mold for injection molding according to claim 3, wherein
the non-design-surface-side mold includes a pressing portion which presses the first molded component toward the design-surface-side mold at the time of molding the second molded component.

5. A mold for injection molding that is used for manufacturing a resin molded product having a stitch pattern on a design surface, the mold comprising:
a design-surface-side mold which is capable of forming the design surface of the resin molded product
a non-design-surface-side mold which is capable of forming a mold cavity with the design-surface-side mold, and
a mold replacing unit, wherein
the non-design-surface-side mold includes:
a first mold which includes a convex portion projecting toward the design-surface-side mold and which, when paired with the design-surface-side mold, forms a first mold cavity which is for molding a first molded component that includes a design surface and a through-hole portion penetrating from the design surface through to a surface on a non-design surface side; and a second mold which, when paired with the design-surface-side mold instead of the first mold, forms a mold cavity expansion portion which is for molding a second molded component that includes a non-design-surface portion layered on the non-design surface side of the first molded component and a stitch portion capable of being exposed on a design surface side of the first molded component via the through-hole portion of the first molded component from the non-design-surface portion, and the design-surface-side mold has formed therein a concave portion capable of being inserted a distal end portion of the convex portion of the first mold, and the mold replacing unit is configured to be capable of switching the mold to be paired with the design-surface-side mold from the first mold to the second mold.

6. The mold for injection molding according to claim 5, wherein the second mold includes a pressing portion which presses the first molded component toward the design-surface-side mold at the time of molding the second molded component.

7. An injection molding machine comprising:

the mold for injection molding according to claim 1;

a fixed platen which is capable of mounting any one of the design-surface-side mold and the non-design-surface-side mold;

a movable platen which is capable of mounting the other one of the design-surface-side mold and the non-design-surface-side mold, and is provided to be capable of moving closer to or moving away from the fixed platen along a mold opening and closing direction;

a first injection unit which is capable of injection-filling a first resin into the first mold cavity; and a second injection unit which is capable of injection-filling a second resin into the mold cavity expansion portion.

8. An injection molding machine comprising:

the mold for injection molding according to claim 5;

a fixed platen which is capable of mounting any one of the design-surface-side mold and the non-design-surface-side mold;

a movable platen which is capable of mounting the other one of the design-surface-side mold and the non-design-surface-side mold, and is provided to be capable of moving closer to or moving away from the fixed platen along a mold opening and closing direction;

a first injection unit which is capable of injection-filling a first resin into the first mold cavity; and a second injection unit which is capable of injection-filling a second resin into the mold cavity expansion portion.

* * * * *